US011827722B2

(12) United States Patent
Tripathi et al.

(10) Patent No.: US 11,827,722 B2
(45) Date of Patent: Nov. 28, 2023

(54) CELLULOSE ACETATE AEROGELS

(71) Applicant: North Carolina State University, Raleigh, NC (US)

(72) Inventors: Anurodh Tripathi, Raleigh, NC (US); Saad A. Khan, Raleigh, NC (US); Orlando J. Rojas, Raleigh, NC (US); Gregory N. Parsons, Raleigh, NC (US); Jeremy Kenneth Steach, Kingsport, TN (US); Jos Simon de Wit, Kingsport, TN (US); S. M. Bedarul Islam, Kingsport, TN (US); Jacob Donald Goodrich, Kingsport, TN (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 17/356,085

(22) Filed: Jun. 23, 2021

(65) Prior Publication Data

US 2021/0380725 A1     Dec. 9, 2021

Related U.S. Application Data

(63) Continuation of application No. 16/071,646, filed as application No. PCT/US2017/014607 on Jan. 23, 2017, now abandoned.

(60) Provisional application No. 62/281,364, filed on Jan. 21, 2016.

(51) Int. Cl.
| | |
|---|---|
| *C08B 15/00* | (2006.01) |
| *C08J 9/28* | (2006.01) |
| *C08L 1/14* | (2006.01) |
| *C08L 1/12* | (2006.01) |
| *C08J 9/36* | (2006.01) |

(52) U.S. Cl.
CPC .............. *C08B 15/005* (2013.01); *C08J 9/28* (2013.01); *C08J 9/36* (2013.01); *C08L 1/12* (2013.01); *C08L 1/14* (2013.01); *C08J 2201/026* (2013.01); *C08J 2201/0484* (2013.01); *C08J 2205/022* (2013.01); *C08J 2205/024* (2013.01); *C08J 2205/026* (2013.01); *C08J 2207/00* (2013.01); *C08J 2301/12* (2013.01)

(58) Field of Classification Search
CPC .... C08B 15/005; C08J 9/28; C08J 9/36; C08J 2201/026; C08J 2201/0484; C08J 2205/022; C08J 2205/024; C08J 2205/026; C08J 2207/00; C08J 2301/12; C08L 1/12; C08L 1/14
See application file for complete search history.

(56) References Cited

U.S. PATENT DOCUMENTS

| | | | |
|---|---|---|---|
| 3,770,575 A | 11/1973 | Ball | |
| 4,519,918 A | 5/1985 | Ericsson et al. | |
| 4,537,877 A | 8/1985 | Ericsson | |
| 4,925,343 A | 5/1990 | Raible et al. | |
| 5,186,831 A | 2/1993 | DePetris | |
| 5,436,160 A | 7/1995 | Varadaraj et al. | |
| 5,585,319 A | 12/1996 | Saitoh et al. | |
| 5,716,839 A | 2/1998 | Varadaraj et al. | |
| 5,811,290 A | 9/1998 | Varadaraj et al. | |
| 6,391,120 B1 | 5/2002 | Silva | |
| 6,500,947 B1 | 12/2002 | West et al. | |
| 8,691,883 B2 | 4/2014 | Cho et al. | |
| 2006/0216219 A1 | 9/2006 | Defriend et al. | |
| 2009/0099541 A1 | 4/2009 | Qin et al. | |
| 2011/0105636 A1 | 5/2011 | Kim et al. | |
| 2013/0018112 A1* | 1/2013 | Thielemans | ........... C08J 9/0066 977/773 |
| 2015/0114907 A1 | 4/2015 | Gong et al. | |
| 2019/0126238 A1 | 5/2019 | Shibata et al. | |
| 2019/0309144 A1 | 10/2019 | Hsieh et al. | |

FOREIGN PATENT DOCUMENTS

| | | |
|---|---|---|
| CN | 104710647 A * | 6/2015 |
| WO | WO 2014/178797 A1 | 11/2014 |

OTHER PUBLICATIONS

Abdullah et al., "Physicochemical and sorption characteristics of Malaysian *Ceiba pentandra* (L.) Gaertn. as a natural oil sorbent," J Hazard Mater, 2010, 177(1-3): 683-691.
Adebajo et al., "Acetylation of raw cotton for oil spill cleanup application: An FTIR and C-13 MAS NMR spectroscopic investigation," Spectrochim. Acta Part A—Molec. Biomolec. Spectrosc., 2004, 60(10): 2315-2321.
Adebajo et al., "Porous materials for oil spill cleanup: A review of synthesis and absorbing properties," J. Porous Mater., 2003, 10, 159-170.
Aguilera et al., "Review of the effects of exposure to spilled oils on human health," J. Appl. Toxicol., 2010, 30(4): 291-301.
Ahmad et al., "Adsorption of residue oil from palm oil mill effluent using powder and flake chitosan: Equilibrium and kinetic studies," Water Res., 2005, 39(12): 2483-2494.

(Continued)

*Primary Examiner* — John M Cooney

(74) *Attorney, Agent, or Firm* — Michael Best & Friedrich LLP

(57) ABSTRACT

Mechanically strong, biodegradable and reusable aerogels are disclosed, which can be made with a cross-linked cellulose ester, and which exhibit a low density and high porosity. The aerogels disclosed herein may be used as sorbent materials and can be modified with a hydrophobic and/or oleophilic agent.

17 Claims, 49 Drawing Sheets

(56) References Cited

OTHER PUBLICATIONS

Ahmad et al., "Residual oil and suspended solid removal using natural adsorbents chitosan, bentonite and activated carbon: A comparative study," Chem. Eng. J., 2005, 108(1-2): 179-185.
Aisien et al., "Comparative absorption of crude oil from fresh and marine water using recycled rubber," J. Environ. Eng.—ASCE, 2006, 132(9): 1078-1081.
Aksu, "Application of biosorption for the removal of organic pollutants: A review," Process Biochem., 2005, 40(3-4): 997-1026.
Aldhous et al., "Beware long-term damage when cleaning up oil spills," The New Scientist, 2010, 206(2765): 10, 2 pages.
Alimahmoodi et al., "Optimization of the anaerobic treatment of a waste stream from an enhanced oil recovery process," Bioresour. Technol., 2011, 102(2): 690-696.
Al-Marzouqi et al., "A novel absorbent-skimmer technology for cleaning oil spills, " WIT Transactions on the Built Environment, 2003, 70:205-214.
Altmann et al., "Neurobehavioral and neurophysiological outcome of chronic low-level tetrachloroethene exposure measured in neighborhoods of dry cleaning shops," Environ. Res., 1995, 69(2): 83-89.
Annunciado et al., "Experimental investigation of various vegetable fibers as sorbent materials for oil spill," Mar. Pollut. Bull, 2005, 50, 1340-1346.
Atlas et al., "Oil biodegradation and bioremediation: A tale of the two worst spills in U.S. history," Environmental Science & Technology, 2011, 45(16): 6709-6715.
Aulin et al., "Aerogels from nanofibrillated cellulose with tunable oleophobicity," Soft Matter, 2010, 6(14):3298-3305.
Aulin et al., "Wetting kinetics of oil mixtures on fluorinated model cellulose surfaces," J. Colloid Interface Sci., 2008, 317(2): 556-567.
Aurell et al., "Aerostat sampling of PCDD/PCDF emissions from the Gulf oil spill in situ burns," Environmental Science and Technology, 2010, 44(24): 9431-9437.
Baltazar-Y-Jimenez et al., "Surface modification of lignocellulosic fibres in atmospheric air pressure plasma," Green Chem., 2007, 9(10): 1057-1066.
Bayat et al., "Oil spill cleanup from sea water by sorbent materials," Chem Eng. Technol., 2005, 28(12): 1525-1528.
Bayer et al., "Water-repellent cellulose fiber networks with multifunctional properties," ACS Appl. Mater. Interfac., 2011, 3(10): 4024-4031.
Berninger et al., "An initial probabilistic hazard assessment of oil dispersants approved by the United States National Contingency Plan," Environ. Toxic. Chem., 2011, 30(7): 1704-1708.
Biermann et al., "Hydrophilicity and lipophilicity of cellulose crystal surfaces," Angew. Chemie-Intl. Ed., 2001, 40(20): 3822-3825.
Bobra et al., "When oil spills emulsify," Chemtech, 1992, 22, 236-241.
Bobra, M. (May 1992). "Solubility behaviour of petroleum oils in water," Environment Canada, Environmental Protection Directorate, River Road Environmental Technology Centre, Ottawa, ON, Report series (River Road Environmental Technology Centre), EE-130. TD171.5.C2 R476 No. 130, 42 pages. Online access: http://www.boemre.gov/tarprojects/120/120AX.PDF.
Bolto et al., "Organic polyelectrolytes in water treatment," Water Res., 2007, 41(11): 2301-2324.
Briscoe et al., "Separation of emulsions using fibrous fabric," Colloids Surf. A—Physicochem. Eng. Aspects, 2000, 163(2-3): 151-164.
Browers, "Understanding sorbents for cleaning up spills," Plant Eng., 1982, 36(6): 219-221.
Brugnara et al., "Wettability of porous materials. I: The use of Wilhelmy experiment: The cases of stone, wood and non-woven fabric," In: Mittal, K. L. (ed.), Contact Angle, Wettability and Adhesion, VSP—an imprint of Brill, 2006, vol. 4, 115-141.
Brunauer et al., "Adsorption of gases in multimolecular layers," J. Amer. Chem. Soc., 1938, 60, 309-319.
Buckley et al., "Crude oil and asphaltene characterization for prediction of wetting alteration," J. Petroleum Sci. Eng., 2002, 33(1-3): 195-202.
Buckley, "Wetting alteration of solid surfaces by crude oils and their asphaltenes," Revue Inst. Fracais Petrole, 1998, 53(3): 303-312.
Burton et al., "Birds of the Severn Estuary and Bristol Channel: Their current status and key environmental issues," Marine Pollut. Bull., 2010, 61(1-3), 115-123.
Cambiella et al., "Treatment of oil-water emulsions: Performance of a sawdust bed filter," J. Hazard Mater., 2006, 131(1-3): 195-199.
Carmody et al., "Adsorption of hydrocarbons on organo-clays-Implications for oil spill remediation," J. Colloid Interface Sci., 2007, 305(1): 17-24.
Carmody et al., "Selected adsorbent materials for oil-spill cleanup—A thermoanalytical study," J. Thermal Anal. Calorim., 2008, 91(3): 809-816.
Carmody et al., "Surface characterisation of selected sorbent materials for common hydrocarbon fuels," Surface Sci., 2007, 601(9): 2066-2076.
Carrillo et al., "Capillary flooding of wood with microemulsions from Winsor I systems," J. Colloid Interface Sci., 2012, 381(1): 171-179.
Carro et al., "Final disposal of the wastes associated with the oil spill of the tanker prestige through its stabilization with quicklime and granite fines," Soil Sediment Contam., 2008, 25 pages.
Cassie et al., "Wettability of porous surfaces," Trans. Faraday Soc., 1944, 40, 546-551.
Cervin et al., "Ultra porous nanocellulose aerogels as separation medium for mixtures of oil/water liquids," Cellulose, 2012, 19(2): 401-410.
Chapman et al., "The use of chemical dispersants to combat oil spills at sea: A review of practice and research needs in Europe," Marine Pollut. Bull., 2007, 54(7): 827-838.
Chin et al., "Fabrication of hydrophobic and magnetic cellulose aerogel with high oil absortion capacity," Materials Letters, 2014, 115:241-243.
Choi et al., "A polydimethylsiloxane (PDMS) sponge for the selective absorption of oil from water," ACS Appl Mater. Interfaces, 2011, 3(12): 4552-4556.
Choi et al., "Cleanup of agrochemical spills using cotton sorbents," J. Environ. Sci. Health. Part A—Environ. Sci. Eng. Toxic Hazard. Subt. Control., 1994, 29(10): 2151-2168.
Choi et al., "Cotton nonwovens as oil spill cleanup sorbents," Textile Res. J., 1993, 63, 211-218.
Choi et al., "Differential sorption of 1-methylcyclopropene to fruit and vegetable tissues, storage and cell wall polysaccharides, oils, and lignins," Postharvest Biology Technol., 2009, 52(1): 62-70.
Choi et al., "Natural sorbents in oil spill cleanup," Environ. Sci. Technol., 1992, 26(4): 772-776.
Choi, "Needlepunched cotton nonwovens and other natural fibers as oil cleanup sorbents," J. Environ. Sci. Heath. Pt. A—Environ. Sci. Eng. Toxic Hazard Subst. Control, 1996, 31(6): 1441-1457.
Chouchene et al., "Combined process for the treatment of olive oil mill wastewater: Absorption on sawdust and combustion of the impregnated sawdust," Bioresour. Technol., 2010, 101(18): 6962-6971.
Chouchene et al., "Energetic valorisation of olive mill wastewater impregnated on low cost absorbent: Sawdust versus olive solid waste," Energy, 2012, 39(1): 74-81.
Claesson et al., "Short-range interactions between non-ionic surfactant layers," Physical Chemistry Chemical Physics, 2006, 8(47): 5501-5514.
Cojocaru et al., "Peat-based sorbents for the removal of oil spills from water surface: Application of artificial neural network modeling," Colloids Surf. A—Physicochem. Eng. Aspects, 2011, 384(1-3): 675-684.
Correa et al., "The San Rafael de Laya oil spill: A case of cleanup and remediation in Venezuela," 1997 Intl. Oil Spill Conf.: Improving Environ. Protec., Ft. Lauderdale, FL, Apr. 7-10, 1997, 932-935.
Coz et al., "Management scenarios for olive oil mill waste based on characterization and leaching tests," J. Chem. Technol. Biotech., 2011, 86(12): 1542-1547.
CRRC "The future of dispersant use in oil spill response initiative," Report from the Coastal Response Research Center, Research

(56) References Cited

OTHER PUBLICATIONS

Planning Incorporated, National Oceanic and Atmospheric Administration (NOAA), 2012, 252 pages, downloaded Mar. 2013, http://www.crrc.unh.edu/workshops/dispersant_future_11/Dispersant_Initiative_FINALREPORT.pdf.
Cumo et al., "Best available techniques for oil spill containment and clean-up in the Mediterranean Sea," Water Resources Management IV, WIT Trans. Ecology Environ., 2007, 103, 527-535.
Cunha et al., "Preparation of highly hydrophobic and lipophobic cellulose fibers by a straightforward gas-solid reaction," J. Colloid Interface Sci., 2010, 344(2): 588-595.
Curbelo et al., "Oil removal in produced water by adsorption using expanded and hydrophobized vermiculite as adsorbent," Afinidad, 2006, 62(521): 35-39.
Daiminger et al., "Novel techniques for oil-water separation," J. Membrane Sci., 1995, 99(2): 197-203.
Dankovich et al., "Surface modification of cellulose with plant triglycerides for hydrophobicity," Cellulose, 2007, 14(5): 469-480.
Dave et al., "Remediation technologies for marine oil spills: A critical review and comparative analysis," Amer. J. Environ. Sci., 2011, 7(5): 423-440.
Delaune et al., "Projected impact of Deepwater Horizon oil spill on US Gulf Coast wetlands," Soil Sci. Soc. Amer., 2011, J. 75(5): 1602-1612.
Delery et al., "Assessment of population exposure to tetrachloroethylene emissions from French dry-cleaning facilities and their associated health risks," Environ. Risq. Sante, 2008, 7(5): 331-340 (English abstract included).
Denesuk et al., "Dynamics of incomplete wetting on porous materials," J. Colloid Interface Sci., 1994, 168(1): 142-151.
Deschamps et al., "Oil removal from water by selective sopriton on hydrophobic cotton fibers. 1. Study of sorption properties and comparison with other cotton fiber-based sorbents," Environ. Sci. Technol., 2003, 37, 1013-1015.
Deschamps et al., "Oil removal from water by sorption of hydrophobic cotton fibers. 2. Study of sorption properties in dynamic mode," Environ. Sci. Technol., 2003, 37(21): 5034-5039.
Diersch et al., "Modeling unsaturated flow in absorbent swelling porous media: Part 1. Theory," Transport in Porous Media, 2010, 83(3): 437-464.
Dill et al., "Modeling water, the hydrophobic effect, and ion solvation," Ann. Rev. Biophys. Biomol. Struc. (Ser.: Ann. Rev. Biophys.), 2005, 34, 173-199.
Dimov et al., "Deposition of oil drops on a glass substrate in relation to the process of washing," J. Colloid Interface Sci., 2000, 224(1): 116-125.
Ding et al., "ß-cyclodextrin-based oil-absorbents: Preparation, high oil absorbency and reusability," Carbohydrate Polymers, 2011, 83(4): 1990-1996.
Djikaev et al., "The variation of the number of hydrogen bonds per water molecule in the vicinity of a hydrophobic surface and its effect on hydrophobic interactions," Curr. Opin. Colloid Interface Sci., 2011, 16(4): 272-284.
Drummond et al., "Fundamental studies of crude oil-surface water interactions and its relationship to reservoir wettability," J. Petroleum Sci. Eng., 2004, 45(1-2): 61-81.
Dubey et al., "Oil uptake by wood during heat-treatment and post-treatment cooling, and effects on wood dimensional stability," Eur. J. Wood Wood Prods., 2012, 70(1-3): 183-190.
Ena et al., "An eco-compatible process for the depuration of wastewater from olive mill industry," Water Sci. Technol., 2009, 60(4): 1055-1063.
Eriksson et al., "Cellulose thin films: Degree of cellulose ordering and its influence on adhesion," Biomacromol., 2007, 8(3): 912-919.
Evans et al., "In situ burning of oil spills," J. Res. Nat. Inst. Standards Technol., 2001, 106(1): 231-278.
Faghihnejad et al., "Hydrophobic interactions between polymer surfaces: Using polystyrene as a model system," Soft Matter, 012, Issue 9, 2746-2759.
Fazal et al., "The effects of surface phenomena on the spreading of oil on water," Massachusetts Inst. Technol., Report No. MITSG, 1979, 79-31.
Feng et al., "Advanced Fabrication and Oil Absorption Properties of Super-hydrophobic Recycled Cellulose Aerogels," Chemical Engineering Journal, Jun. 2015, 270: 168-175.
Fingas et al., "Review of solidifiers," In: Oil Spill Science and Technology, 2011, Ch. 22, pp. 713-733.
Fingas, "In-situ burning," Chapter 10, in: Oil Spill Science and Technology, Jan. 2017, pp. 483-676.
Fingas, "Introduction to oil chemistry and properties," In: Proceedings of the Thirty-fifth Arctic and Marine Oil Spill Program Technical Seminar, Environment Canada, Ottawa, Ontario, Feb. 2015, pp. 53-77.
Fingas, "Vegetable oil spills: Oil properties and behavior," In: Proceedings of the Thirty-fifth Arctic and Marine Oil Spill Program Technical Seminar, Environment Canada, Ottawa, Ontario, Feb. 2015, pp. 79-91.
Fischer et al., "Cellulose-based aerogels," Polymer (Guildf), 2006, 47, 7636-7645.
Fox et al., "Wetting properties of organic liquids on high energy surfaces," J. Phys. Chem., 1955, 59(10): 1097-1106.
Fröberg et al., "Surface forces and measuring techniques," International Journal of Mineral Processing, 1999, 56, 1-30.
Frontera et al., "Cation-pi and anion-pi interactions," Wiley Interdisciplinary Reviews—Computational Molecular Science, 2011, 1(3): 440-459.
Fuller, "Use of floating absorbents and gelling techniques for combating oil spills on water," J. Inst. Petrol., 1971, 57(553): 35-43.
Furutaka et al., "Infrared spectroscopic study of water-aromatic hydrocarbon mixtures at high temperatures and pressures," Bull. Chem. Soc. Japan, 2001, 74(10): 1775-1788.
Gane, "Absorption properties of coatings: A selected overview of absorption criteria derived from recent pore network modelling," J. Dispersion Sci. Technol., 2004, 25(4): 389-408.
Gao et al., "Availability of chemically modified wheat straw application on oil spill clean up," Application of Chemical Engineering, Pts. 1-3, Book Series: Advanced Materials Research, 2011, vol. 236-238, 301-304.
Gao et al., "Synthesis and characteristics of graft copolymers of poly(butyl acrylate) and cellulose fiber with ultrasonic processing as a material for oil absorption," BioResources, 2012, 7(1): 135-147.
Gao et al., "Synthesis and oil absorption of chemical modified wood waste materials," Selected Proceedings of the Fifth International Conference on Waste Management and Technology (ICWMT 5), 2010, 244-247.
Gertler et al., "Microbial consortia in mesocosm bioremediation trial using oil sorbents, slow-release fertilizer and bioaugmentation," FEMS Microbiol. Ecol., 2009, 69(2): 288-300.
Ghaly et al., "In-vessel bioremediation of oil-contaminated peat," Energy Sources, 2001, 23(4): 305-325.
Ghannam, "Spreading behavior of crude oil over limestone substrate," J. Colloid Interface Sci., 2003, 262(2): 435-441.
Gold et al., "Systematic literature review of uses and levels of occupational exposure to tetrachloroethylene," J. Occup. Environ. Hyg., 2008, 5(12): 807-839.
Good et al., "Hydrogen bonding and the interfacial component of adhesion: Acid/base interactions of corona-treated polypropylene," J. Adhesion, 1996, 59(1-4): 25-37.
Gouin, "The wetting problem of fluids on solid surfaces. Part 1: The dynamics of contact lines," Continuum Mechanics Thermodyn., 2003, 15(6): 581-596.
Gouin, "The wetting problem of fluids on solid surfaces. Part 2: The contact angle hysteresis," Continuum Mechanics Thermodyn., 2003, 15(6): 597-611.
Gouin, "The wetting problem of fluids on solid surfaces: Dynamics of lines and contact angle hysteresis," J. Physique IV 11(PR6), 2001, 261-269.
Gruber et al., "Interactions of synthetic cationic polymers with fibers and fillers. Part 1. The effect of adsorption," Wochenbl. Papierfabr., 1996, 124(1): 4-6, 8, 10-11.
Gui et al., "Carbon nanotube sponges," Advanced Materials, 2010, 22, 617-621.

(56) References Cited

OTHER PUBLICATIONS

Gupta et al., "Absorbent characteristics of nonwovens containing cellulosic fibers," Inda, Inj., 1995, 7(1): 34-43.
Gupta, "The effect of structural factors on the absorbent characteristics of nonwovens," Tappi J., 1988, 71(8): 147-152.
Gurav et al., "Silica Aerogel: Synthesis and Applications," J. Nanomater., 2010, vol. 2010, pp. 1-11.
Hamaker, "The London-van der Waals attraction between spherical particles," Physica, 1937, 4(10): 1058-1072.
Hammer et al., "The search for the hydrophobic force law," Faraday Disc., 2010, 146, 299-308.
Haussard et al., "Separation of hydrocarbons and lipid from water using treated bark," Water Res., 2003, 37(2): 362-374.
He et al., "Oil-absorbent beads containing ß-cyclodextrin moieties: Preparation via suspension polymerization and high oil absorbency," Polymers Adv. Technol., 2012, 23(4): 810-816.
Hejazi et al., "Wetting transitions in two-, three-, and four-phase systems," Langmuir, 2012, 28(4): 2173-2180.
Hellmich, "Deepwater horizon oil spill response and cleanup," EM: Air and Waste Management Association's Magazine for Environmental Managers, 2011, pp. 24-27.
Hiberty et al., "Some answers to frequently asked questions about the distortive tendencies of π-electronic system," Theor. Chem. Accounts, 2005, 114(1-3): 169-181.
Hlavacek, "Break-up of oil-in-water emulsions induced by permeation through a microfiltration membrane," J. Membrane Sci., 1995, 102, 1-7.
Hodgson, "A review of paper sizing using alkyl ketene dimer versus alkenyl succinic anhydride," Appita, 1994, 47(5): 402-406.
Hong et al., "The effects of intermittent permeate flow and crossflow on membrane coalescence of oil-in-water emulsions," Desalination, 2002, 144(1-3): 185-191.
Hori et al., "Excellent oil absorbent kapok [Ceiba pentandra (L.) Gaertn.] fiber: Fiber structure, chemical characteristics, and application," J. Wood Sci., 2000, 46(5): 401-404.
Huang et al., "Performance and mechanism of hydrophobic-oleophilic kapok filter for oil/water separation," Desalination, 2006, 190(1-3): 295-307.
Hubbe et al., "Cellulosic substrates for removal of pollutants from aqueous systems: A Review. 3. Spilled oil and emulsified organic liquids," BioResources, 2013, 8(2): 3038-3097.
Hubbe et al., "Application of cellulosic fiber materials for the remediation of petroleum spills in water," Proceedings, 4th Intl. Conf. Pulping, Papermaking and Biotechnol., Nov. 7-9, 2012, Nanjing, China, pp. 854-859.
Hubbe et al., "Cellulosic substrates for removal of pollutants from aqueous systems: A review. 1. Metals," BioResources, 2011, 6(2), 2161-2287.
Hubbe et al., "Cellulosic substrates for removal of pollutants from aqueous systems: A review. 2. Dyes," BioResources, 2012, 7(2), 2592-2687.
Hubbe et al., "Composting as a way to convert cellulosic biomass and organic waste into high-value soil amendments: A review," BioResources, 2010, 5(4): 2808-2854.
Hubbe et al., "Consequences of the nanoporosity of cellulosic fibers on their streaming potential and their interactions with cationic polyelectrolytes," Cellulose, 2007, 14(6): 655-671.
Husseien et al., "A comprehensive characterization of corn stalk and study of carbonized corn stalk in dye and gas oil sorption," J. Anal. Appl. Pyrolysis, 2009, 86(2): 360-363.
Husseien et al., "Availability of barley straw application on oil spill clean up," Intl. J. Environ. Scie. Technol., 2009, 6(1): 123-130.
Hussein et al., "Oil spill sorption using carbonized pith bagasse. Application of carbonized pith bagasse as loose fiber," Global Nest J., 2009, 11(4): 440-448.
Hutchinson al., "Some applications of viscometry from studies on the absorption of vegetable oils and solvents by paper substrates," J. Coatings Technol. Res., 2008, 5(3): 365-376.
Ibrahim et al., "Removal of emulsified food and mineral oils from wastewater using surfactant modified barley straw," Bioresour. Technol., 2009, 100, 5744-5749.
Iglesias et al., "Wave energy and nearshore hot spots: The case of the SE Bay of Biscay," Renewable Energy, 2010, 35(11): 2490-2500.
Inagaki et al., "Heavy oil sorption and recovery by using carbon fiber felts," Carbon, 2002, 40, 1487-1492.
Inagaki et al., "Sorption and recovery of heavy oils using fir fibers carbonized and their recycling," Carbon, 2002, 40, 105-111.
Jacob et al., "Contact angle titrations of pulp fiber furnishes," Tappi J., 1993, 76(5): 133-137.
Jeguirim et al., "A new valorisation strategy of olive mill wastewater: Impregnation on sawdust and combustion," Resources, Conservation and Recycling, 2012, 59, 4-8.
Ji et al., "Bacterial and granular sludge characteristics in an ultrahigh-temperature upflow anaerobic sludge blanket reactor treating super heavy oil-containing wastewater," Environ. Eng. Sci., 2011, 28(2): 129-137.
Jiang et al., "Amphiphilic superabsorbent cellulose nanofibril aerogels," J. Mater. Chem. A, 2014, vol. 2, 6337-6342.
Jiang et al., "Super water absorbing and shape memory nanocellulose aerogels from TEMPO-oxidized cellulose nanofibrils via cyclic freezing-thawing," J. Mater. Chem. A, 2014, vol. 2, 350-359.
Jin et al., "Oil absorptive polymers: Where is the future?" Polym.-Plastic Technol. Eng., 2012, 51(2): 154-159.
Jin et al., "Superhydrophobic and superoleophobic nanocellulose aerogel membranes as bioinspired cargo carriers on water and oil," Langmuir, 2011, 27(14): 1930-1934.
Johansen et al., "DeepSpill—Field study of a simulated oil and gas blowout in deep water," Spill Sci. Technol. Bull., 2003, 8(5-6): 433-443.
Johnson et al., "Removal of oil from water surfaces by sorption on unstructured fibers," Environ. Sci. Technol., 1973, 7(5): 439-443.
Johnson et al., "Wettability and contact angles," Surface and Colloid Science, 1969, vol. 2, pp. 85-153.
Juang et al., "Application of batch ultrafiltration to the separation of w/o emulsion in liquid surfactant membrane process," J. Membrane Sci., 1994, 96(3): 193-203.
Justino et al., "Olive oil mill wastewaters before and after treatment: A critical review from the ecotoxicological point of view," Ecotoxicology, 2012, 21(2): 615-629.
Kadla et al., "Cellulose structure: A review," Cellulose Chem. Technol., 2000, 34(3-4): 197-216.
Khan et al., "Use of biomass sorbents for oil removal from gas station runoff," Chemosphere, 2004, 57, 681-689.
Kilpatrick, "Water-in-crude oil emulsion stabilization: Review and unanswered questions, "Energy Fuels, 2012, 26(7): 4017-4026.
Knudsen, "Milkweed floss fiber for improving nonwoven products," In: Tappi Nonwovens Conf., Tappi Press, Atlanta, 1990.
Kocherginsky et al., "Demulsification of water-in-oil emulsions via filtration through a hydrophilic polymer membrane," J. Membrane Sci., 2003, 220(102): 117-128.
Kokal, "Crude-oil emulsions: A state-of-the-art review," SPE Production & Facilities, 2005, 20(1): 5-13.
Koltuneiwicz et al., "Process factors during removal of oil-in-water emulsions with cross-flow microfiltration," Desalination, 1996, 105, 79-89.
Korhonen et al., "Hydrophobic nanocellulose aerogels as floating, sustainable, reusable, and recyclable oil absorbents," ACS Appl. Mater. Interfaces, 2011, 3(6): 1813-1816.
Kriipsalu et al., "Remediation of an oily leachate pond in Estonia," Waste Manag. Res., 2005, 23(6): 541-549.
Kristanti et al., "Bioremediation of crude oil by white rot Fungi polyporus sp. S133," J. Microbiol. Biotechnol., 2011, 21(9): 995-1000.
Kropp et al., "A review of the occurrence, toxicity, and biodegradation of condensed thiophenes found in petroleum," Can. J. Microbiol., 1998, 44(7): 605-622.
Kumagai et al., "Oil adsorbent produced by the carbonization of rice husks," Waste Manag., 2007, 27(4): 554-561.

(56) References Cited

OTHER PUBLICATIONS

Lee et al., "Effect of grinding and extraction of lignocellulosic fiber on oil sorption," Eco-Materials Processing and Design VIII, Book Series: Materials Science Forum, 2007, vol. 544-545, pp. 553-556.
Lee et al., "Image analysis: A novel technique to determine the efficiency of wiping cloths," Fibers Polymers, 2006, 7(1): 73-78.
Lee et al., "The breakage behavior of liquid membrane emulsion in a packed bed," Hydrometallurgy, 1993, 32(2): 233-245.
Li et al., "Recovery of linseed oil dispersed within an oil-in-water emulsion using hydrophilic membrane by rotating disk filtration system," J. Membrane Sci., 2009, 342(1-2): 70-79.
Likon et al., "Papermill industrial waste as a sustainable source for high efficiency absorbent production," Waste Manag., 2011, 31(6): 1350-1356.
Lim et al., "Evaluation of hydrophobicity/oleophilicity of kapok and its performance in oily water filtration: Comparison of raw and solvent-treated fibers," Industrial Crops Prod., 2007, 26(2): 125-134.
Lim et al., "Evaluation of kapok (*Ceiba pentandra* (L.) Gaertn.) as a natural hollow hydrophobic-oleophilic fibrous sorbent for oil spill cleanup," Chemosphere, 2007, 66(5): 955-963.
Lim et al., "In situ oil/water separation using hydrophobic-oleophilic fibrous wall: A lab-scale feasibility study for groundwater cleanup," J. Hazardous Mater., 2006, B137, 820-826.
Lin et al., "Using a composite material containing waste tire powder and polypropylene fiber cut end to recover spilled oil," Waste Manag., 2010, 30(2): 263-267.
Longo et al., "Degradation study of polypropylene (PP) and bioriented polypropylene (BOPP) in the environment," Mater. Res. Ibero-Amer. J. Mater., 2011, 14(4): 442-448.
Lu et al., "Nanomechanics of cation-π interactions in aqueous solution," Angewandte Chemie International Edition, 2013, 52(14): 3944-3948.
Lucas, "Rate of capillary assension of liquids," Kolloid Z., 1918, 23, 15-22.
Ludwick et al., "Chemical and engineering modification of bagasse for oil absorption," Proceedings of the 2002 National Conference on Environmental Science and Technology, 2003, 313-321.
Ma et al., "Hydrophobic and nanoporous chitosan-silica composite aerogels for oil absorption," J. Appl. Polym. Sci., Apr. 2015, 132(15): 41770, 11 pages.
Mahadevi et al., "Cation-π interaction: Its role and relevance in chemistry, biology, and material science," Chem. Rev. 2012, 113(3): 2100-2138.
Mann et al., "Polarized infrared spectra of cellulose-1," J. Polymer Sci., 1958, 27(115): 595-596.
Masoodi et al., "Darcy's law-based model for wicking in paper-like swelling porous media" AIChE J., 2010, 56(9): 2257-2267.
Masoodi et al., "Darcy's law-based numerical simulation for modeling 3D liquid absorption into porous wicks," AIChE J., 2011, 57(5): 1132-1143.
Masoodi et al., "Effect of externally applied liquid pressure on wicking in paper wipes," J. Engineered Fibers Fabrics, 2010, 5(3): 49-66.
Mathavan et al., "Coalescence/filtration of an oil-in-water emulsion in a peat bed," Water Res., 1992, 26, 91-98.
Matsumoto et al., "Visualization of filtration phenomena of a suspended solution including O/W emulsion or solid particle and membrane separation properties of the solution," Water Res., 1999, 33, 929-936.
Maurin et al., "A feasibility study on the use of chemically modified sawdusts bearing fatty alkyl chains for removal of oleic acid and olive-oil from water," Holz Roh Werkstoff, 1999, 57(4): 265-266.
McCarthy et al., "Effects of drying on ASA esterification and sizing," Tappi J., 1986, 25 pages.
McHale, "Cassie and Wenzel: Were they really so wrong?" Langmuir, 2007, 23, 8200-8205.
Meyer et al., "Recent progress in understanding hydrophobic interactions," Proc. Nat. Acad. Sci. USA, 2006, 103(43): 15739-15746.
Michel et al., "Oil Spill Dispersants. Efficacy and Effects," Natural Research Council of the National Academies, The National Academies Press, Washington, DC, 2010, 2 pages.
Milne et al., "The Cassie equation: How it is meant to be used," Adv. Colloid Interface Sci., 2012, 170(1-2): 48-55.
Miyata, "Oil sorbency of sorbents prepared from Kenaf (*Hibiscus cannabinus* L.) plants," Sen-I Gakkaishi, 1999, 55(12): 576-583.
Moellmann et al., "Importance of London dispersion effects for the packing of molecular crystals: A case study for intramolecular stacking in a bis-thiophene derivative," Phys. Chem. Chem. Phys., 2010, 12(30): 8500-8504.
Mohan et al., "Antifouling Coating of Cellulose Acetate Thin Films with Polysaccharide Multilayers," Carbohydr. Polym., Feb. 2015, vol. 116, pp. 149-158.
Mohan et al., "Bioremediation of petroleum sludge under anaerobic microenvironment: Influence of biostimulation and bioaugmentation," Environ. Eng. Manag. J., 2011, 10(11): 1609-1616.
Moura et al., "Catalytic growth of carbon nanotubes and nanofibers on vermiculite to produce floatable hydrophobic "nanosponges" for oil spill remediation," Applied Catalysis B: Environmental, 2009, 90, 436-440.
NAS, "Oil in the Sea III: Inputs, Fates and Effects," National Academy of Sciences, National Academy Press, Washington, DC, 2003, 277 pages.
Natarajan et al., "Understanding molecular interactions of asphaltenes in organic solvents using a surface force apparatus," J. Phys. Chem. C, 2011, 115, 16043-16051.
National Commission, "The story of the Louisiana berms project," National Commission on the BP Deepwater Horizon Oil Spill and Offshore Drilling, Washington, DC, 2011, 44 pages.
Nduka et al., "Comparison of the mopping ability of chemically modified and unmodified biological wastes on crude oil and its lower fractions," Bioresour. Technol., 2008, 99(16): 7902-7905.
Nenkova, "Study of the sorption properties of lignin-derivatized fibrous composites for the remediation of oil polluted receiving waters," BioResources, 2007, 2(3): 408-418.
Neumann et al., "Thermodynamics of contact angles. 1. Heterogeneous solid surfaces," J. Colloid Interface Sci., 1972, 38, 341-358.
NOAA, "NOAA's oil spill response. Shoreline cleanup and assessment technique," U.S. Dept. of Commerce, National Oceanic and Atmospheric Administration, Silver Spring, MD, NOAA fact sheet, 2010.
NOAA, "NOAA's oil spill response. Using boom in response to oil spills," U.S. Dept. of Commerce, National Oceanic and Atmospheric Administration, Silver Spring, MD, NOAA fact sheet, 2010, 2 pages.
NRC, "Oil Spill Dispersants, Efficacy and Effects" National Research Council of the National Academies, The National Academies Press, Washington DC, 2005, 397 pages.
NRC, "Spills of Emulsified Fuels. Risks and Response," National Research Council of the National Academies, The National Academies Press, Washington DC, 2001, 117 pages.
O'Fagain, "Enzyme stabilization—Recent experimental progress," Enz. Microb. Technol., 2003, 33(2-3): 137-149.
Oh et al., "Use of microorganism-immobilized polyurethane foams to absorb and degrade oil on water surface," Appl. Microbiol. Biotechnol., 2000, 54(3): 418-423.
Oliveira et al., "Hydrogels of cellulose acetate crosslinked with pyromellitic dianhydride: Part I: Synthesis and swelling kinetics," Quim. Nova, 2013, 36(1): 102-106.
Oliver et al., "The apparent contact angle of liquids on finely-grooved solid surfaces—A SEM study," J. Adhesion, 1977, 8(3): 223-234.
Orupold et al., "Leaching behaviour of oil shale semicoke: Compliance with the waste acceptance criteria for landfills," Oil Shale, 2008, 25(2): 267-275.
Pasichnyk et al., "Simulating Van der Waals interactions in water/hydrocarbon-based complex fluids," J. Phys. Chem. B, 2008, 112(6): 1761-1764.
Pasila, "A biological oil absorption filter," Mar. Pollut. Bull., 2004, 49, 1006-1012.
Pate, "Cotton: A renewable resource for oil spill cleanups," Nonwovens Industry, 1992, 6, 32-35.

(56) References Cited

OTHER PUBLICATIONS

Payne et al., "Oil spills abatement: Factors affection oil uptake by cellulosic fibers," Environ. Sci. Technol., 2012, 46, 7725-7730.

Penela-Arenaz et al., "Effects of the Prestige oil spill on the biota of NW Spain: 5 years of learning," Adv. Marine Biol., 2009, 56, 365-396.

Perkovic et al., "Oil spill modeling and combat," Maritime Industry, Ocean Engineering and Coastal Resources, vols. 1 and 2, Book Series: Proceedings and Monographs in Engineering Water and Earth Sciences, 2008, 1161-1169.

Perwuelz et al., "Study of wetting at the silicone oil/water/fibre interface," Colloids Surf. A—Physicochem. Eng. Aspects, 1999, 147(3): 317-329.

Phifer et al., "Characterization of polypropylene and polyester meltblown materials used for food oil absorption," J. Food Sci., 1992, 57(1): 213-216.

Piao et al., "From hydrophilicity to hydrophob-icity: A critical review: Part I. Wettability and surface behavior," Wood Fiber Sci., 2010, 42(4): 490-510.

Pokhrel et al., "Treatment of pulp and paper mill wastewater—A review," Sci. Total Environ., 2004, 333, 37-58.

Prince et al., "Bioremediation as an oil spill response tool," Environ. Technol., 1999, 20(8): 891-896.

Radetic et al., "Recycled wool-based nonwoven material as an oil sorbent," Environ. Sci. Technol., 2003, 37(5): 1008-1012.

Rajakovic et al., "Efficiency of oil removal from real wastewater with different sorbent materials," J. Hazard. Mater., 2007, 143, 494-499.

Rajaković-Ognjanović et al., "Governing factors for motor oil removal from water with different sorption materials," J. Hazard. Mater., 2008, 154, 558-563.

Rao et al., "Adsorption and desorption of organic liquids in elastic superhydrophobic silica aerogels," J. Colloid Interface Sci., 2007, 305, 124-132.

Rastegar et al., "Optimization of petroleum refinery effluent treatment in a UASB reactor using response surface methodology," J. Hazard. Mater., 2011, 197, 26-32.

Rattanawong et al., "Sorption of oil emulsified in water on oil palm fibers," Korean J. Chem. Eng., 2007, 24(1): 67-71.

Rengasamy et al., "Study of oil sorption behavior of filled and structured fiber assemblies made from polypropylene, kapok and milkweed fibers," Journal of Hazardous Materials, 2011, 186(1): 526-532.

Rethmeier et al., "Lignite based oil binder mats: A new absorbent strategy and technology," Spill Sci. Technol. Bull., 2003, 8(5-6): 565-567.

Reynolds et al., "Hydrophobic aerogels for oil-spill clean up—Synthesis and characterization," J. Non-Crystalline Solids, 2001, 292, 127-137.

Ribeiro et al., "A dried hydrophobic aquaphyte as an oil filter for oil/water emulsions," Spill Sci. Technol. Bull., 2003, 8(5-6): 483-489.

Ribeiro et al., "Emulsified oil biosorption onto non-living biomass of *Salvinia* sp.," REWAS'99 Global Symposium on Recycling, Waste Treatment and Clean Technology, 1999, vols. I-III, pp. 2249-2257.

Ribeiro et al., "Sorption of oils by nonliving biomass of a *Salvinia* sp.," Enviorn. Sci. Technol., 2000, 34(24): 5201-5205.

Rigacci, "Cellulosic aerogels for energy applications," ACS—American Chemical Society, 2008, 2 pages.

Roberts et al., "Induced dipoles and the heat of adsorption of argon on ionic crystals," Trans Faraday Soc., 1938, 34, 1346-1349.

Rodriguez-Valverde et al., "Wetting on axially-patterned heterogeneous surfaces," Advan. Colloid Interface Sci., 2008, 138(2), 84-100.

Rojo et al., "Comprehensive elucidation of the effect of residual lignin on the physical, barrier, mechanical and surface properties of nanocellulose films," Green Chemistry, Mar. 2015, vol. 17, Issue 3, pp. 1853-1866.

Rojo, "Degradation of alkanes by bacteria," Environ. Microbiol., 2009, 11(10): 2477-2490.

Roman, "Model cellulosic surfaces: History and recent advances," Model Cellulosic Surfaces, ACS Symposium Ser., 2009, vol. 1019, 3-53.

Rosales et al., "A laboratory screening study on the use of solidifiers as a response tool to remove crude oil slicks on seawater," Chemosphere, 2010, 80(4): 389-395.

Rosenholm, "Critical comparison of molecular mixing and interaction models for liquids, solutions and mixtures," Advan. Colloid Interface Sci., 2010, 156(1-2): 14-34.

Saez-Navarrete et al., "An exploratory study of peat and sawdust as enhancers in the (bio)degradation of n-dodecane," Biodegrad., 2008, 19(4): 527-534.

Sai et al., "Surface Modification of Bacterial Cellulose Aerogels' Web-like Skeleton for Oil/Water Separation," ACS Applied Materials & Interfaces, Mar. 2015, 7(13): 7373-7381.

Said et al., "Usefulness of raw bagasse for oil absorption: A comparison of raw and acylated bagasse and their components," Bioresour. Technol., 2009, 100(7): 2219-2222.

Saito et al., "Development and water tank tests of sugi bark sorbent (SBS)," Spill Sci. Technol. Bull., 2003, 8(5-6): 475-482.

Samokhvalov, "Heterogeneous photocatalytic reactions of sulfur aromatic compounds," Chemphyschem, 2011, 12(16): 2870-2885.

Sathasivam et al., "Adsorption kinetics and capacity of fatty acid-modified banana trunk fibers for oil in water," Water Air Soil Pollution, 2010, 213(1-4): 413-423.

Sayed et al., "Investigation of the effectiveness of some adsorbent materials in oil spill clean-ups," Desalination, 2006, 194(1-3): 90-100.

Schatzberg, "Investigations of Sorbents for Removing Oil Spills from Water," US Coast Guard Report No. 724110.1/2/1, US Coast Guard Headquarters, Washington, DC, 1971, 164 pages.

Scherr et al., "Changes in bacterial communities from anaerobic digesters during petroleum hydrocarbon degradation," J. Biotechnol., 2011, pp. 391-399.

Scott et al., "Use of oil sorbent materials for small herbicide spills," Bull Environ. Contam. Toxicol., 1979, 23, 123-128.

Sehaqui et al., "High-porosity aerogels of high specific surface area prepared from nanofibrillated cellulose (NFC)," Compos. Sci. Technol., 2011, 71(13): 1593-1599.

Sehaqui et al., "Mechanical performance tailoring of tough ultra-high porosity foams prepared from cellulose I nanofiber suspensions," Soft Matter, 2010, vol. 6, p. 1824-1832.

Seveno et al., "Predicting the wetting dynamics of a two-liquid system," Langmuir, 2011, 27(24): 14958-14967.

Sharma, "On centrifugal high vol. separation of oil and water," 11AIChE—2011 AIChE Annual Meeting, Conference Proceedings, 2011, 1 pp.

Silva et al., "Chromatographic and spectroscopic analysis of heavy crude oil mixtures with emphasis in nuclear magnetic resonance spectroscopy: A review," Anal. Chim. Acta, 2011, 707(1): 18-37.

Song et al., "Approaching super-hydrophobicity from cellulosic materials: A Review," Nordic Pulp and Paper Research Journal, 2013, 28(2):216-238.

Sreekala et al., "Sorption characteristics of water, oil and diesel in cellulose nanofiber reinforced corn starch resin/ramie fabric composites," Composite Interfac., 2008 15(2-3): 281-299.

Srinivasan et al., "Oil removal from water using biomaterials," Bioresour. Technol., 2010, 101(17): 6594-6600.

Srinivasan et al., "Removal of oil by walnut shell media," Bioresour. Technol., 2008, 99, 8217-8220.

Stanssens et al., "Creating water-repellent and super-hydrophobic cellulose substrates by deposition of organic nanoparticles," Mater. Lett., 2011, 65(12): 1781-1784.

Stone et al., "Influence of drying on the pore structures of the cell wall," in Consolidation of the Paper Web, Trans. Symp. Cambridge, Sep. 1965, F. Bolam (ed.), Tech. Sec. British Paper and Board Makers' Assoc. Inc, London, 1965, vol. 1, 145-174.

Sun et al., "A convenient acetylation of sugarcane bagasse using NBS as a catalyst for the preparation of oil sorption-active materials," J. Mater. Sci., 2003, 38(19): 3915-3923.

Sun et al., "Acetylation of rice straw with or without catalysts and its characterization as a natural sorbent in oil spill cleanup," J. Agricultural Food Chem., 2002, 50(22): 6428-6433.

(56) References Cited

OTHER PUBLICATIONS

Sun et al., "Demulsification of water-in-oil emulsion by wetting coalescence materials in stirred- and packed-column," Colloids Surf. A: Physicochem. Eng. Aspects, 1999, 150, 69-75.
Sun et al., "Multifunctional, ultra-flyweight, synergistically assembled carbon aerogels," Adv. Mater., 2013, 25(18): 2554-2560.
Sun vet al., "Demulsification of water-in-oil emulsion by using porous glass membrane," J. Membrane Sci., 1998, 146(1): 65-72.
Suni et al., "Microbially treated peat-cellulose fabric as a biodegradable oil-collection cloth," J. Environ. Sci. Health. Part A—Toxic/Hazard. Subst. Environ. Eng., 2006, 41(6): 999-1007.
Suni et al., "Removal by sorption and in situ biodegradation of oil spills limits damage to marine biota: A laboratory simulation," Ambio, 2007, 36(2): 173-179.
Suni et al., "Use of a by-product of peat excavation, cotton grass fibre, as an sorbent for oil spills," Mar. Pollut. Bull., 2004, 49, 916-921.
Svitova et al., "Wetting behavior of silicone oils on solid substrates immersed in aqueous electrolyte solutions," Langmuir, 2002, 18(18): 6821-6829.
Swanson et al., "Surface chemical studies of pitch. II. The mechanism of the loss of absorbency and development of self-sizing in papers made from wood pulps," Tappi, 1959, 42(10): 812-819.
Tan et al., "Organic aerogels with very high impact strength," Adv. Mater., 2001, 13(9): 644-646.
Tao et al., "New oil-absorbent fiber absorb the oil of water," Adv. Civil Eng. Pts., 2011, 1-6(255-260): 2860-2866.
Tavisto et al., "Wetting and wicking of fibre plant straw fractions," Indust. Crops Prod., 2003, 18(1): 25-35.
Teas et al., "Investigation of the effectiveness of absorbent materials in oil spills clean up," Desalination, 2001, 140(3): 259-264.
Tirmizi et al., "Demulsification of water/oil/solid emulsions by hollow-fiber membranes," AICHE J., 1996, 42(5): 1263-1276.
Tze et al., "Swelling of recycled wood pulp fibers: Effect on hydroxyl availability and surface chemistry," Wood Fiber Sci., 2001, 33(3): 364-376.
Van Beilen et al., "Alkane hydroxylases involved in microbial alkane degradation," Appl. Microbiol. Biotech., 2007, 74(1): 13-21.
Vanem et al., "Cost-effectiveness criteria for marine oil spill preventive measures," Reliability Eng. Sys. Safety, 2008, 93(9): 1354-1368.
Varadaraj et al., "Dispersion and biodegradation of oil spills on water," Proceedings of the 1995 International Oil Spill Conference, Long Beach, California, American Petroleum Institute, Washington, D.C., 1995, pp. 101-106.
Varadaraj et al., "Molecular origins of crude oil interfacial activity. Part 3: Characterization of the complex fluid rag layer formed at crude oil-water interfaces," Energy Fuels, 2007, 21(3): 1617-1621.
Varadaraj et al., "Molecular origins of crude oil interfacial activity. Part 4: Oil-water interface elasticity and crude oil asphaltene films," Energy Fuels, 2012, 26(12): 7164-7169.
Varadaraj et al., "Molecular origins of heavy crude oil interfacial activity. Part 2: Fundamental interfacial properties of model naphthenic acids and naphthenic acids separated from heavy crude oils," Energy Fuels, 2007, 21(1): 199-204.
Varadaraj et al., "Molecular origins of heavy oil interfacial activity. Part 1: Fundamental interfacial properties of asphaltenes derived from heavy crude oils and their correlation to chemical composition," Energy Fuels, 2007, 21(1), 195-198.
Varghese et al., "Kenaf as a deep-bed filter medium to remove oil from oil-in-water emulsions," Separation Sci. Technol., 2008, 33(14): 2197-2220.
Venkateswara Rao et al., "Absorption and desorption of organic liquids in elastic superhydrophobic silica aerogels," Journal of Colloid and Interface Science, 2007, 305(1): 124-132.
Visser, "On Hamaker constants: A comparison between Hamaker constants and Lifshitz-van der Waals constants," Advan. Colloid Interface Sci., 1972, 3, 331-363.
Vogler, "Structure and reactivity of water at biomaterial surfaces," Advan. Colloid Interface Sci., 1998, 74, 69-117.
Wang et al., "Filter paper with selective absorption and separation of liquids that differ in surface tension," ACS Applied Materials & Interfaces, 2010, 2(3): 677-683.
Wang et al., "Molecular interactions of a polyaromatic surfactant C5Pe in aqueous solutions studied by a surface forces apparatus," J. Phys. Chem. B, 2012, 116, 11187-11196.
Wardlaw et al., "Disentangling oil weathering at a marine seep using GCxGC: Broad metabolic specificity accompanies subsurface petroleum biodegradation," Environ. Sci. Technol., 2008, 42(19): 7166-7173.
Washburn, "The dynamics of capillary flow," Phys. Rev., 1921, 17, 273-283.
Wasser, "The reactivity of alkenyl succinic anhydride: Its pertinence with respect to alkaline sizing," J. Pulp Paper Sci., 1987, 13(1): J29-J32.
Waters, "Aromatic interactions in model systems," Current Opin. Chem. Biol., 2002, 6(1): 736-741.
Wei et al., "Evaluation of nonwoven polypropylene oil sorbents in marine oil-spill recovery," Marine Pollution Bulletin, 2003, 46, 780-783.
Wennerstrom, "The van der Waals interaction between colloidal particles and its molecular interpretation," Colloids Surg. A—Physicochem. Eng. Aspects, 2003, 228, 189-195.
Wenzel, "Resistance of solid surfaces to wetting by water," Ind. Eng. Chem., 1936, 28, 988-994.
Witka-Jezewska et al., "Investigation of oleophilic nature of straw sorbent conditioned in water," Spill Sci. Technol. B, 2003, 8(5-6): 561-564.
Wolcott et al., "Temperature and moisture influence on compression-recovery behavior of wood," Wood Fiber Sci., 2003, 35(4): 540-551.
Wu et al., "Ultralight, flexible, and fire-resistant carbon nanofiber aerogels from bacterial cellulose.," Angew. Chem. Int. Ed. Engl., 2013, 52(10): 2925-9.
Xia et al., "Lessons from the Exxon Valdez oil spill disaster in Alaska," Disaster Adv., 2010, 3(4): 270-273.
Xu et al., "Self-Sensing, Ultralight, and Conductive 3D Graphene / Iron Oxide Aerogel Elastomer Deformable in a Magnetic Field," ACS Nano, Mar. 2015, 9(4): 3969-3977.
Yakimov et al., "*Alcanivorax borkumensis* gen. nov., sp. nov., a new hydrocarbon-degrading and surfactant producing marine bacterium," Int. J. Syst. Bacteriol., 1998, 48, 339-348.
Yamane et al., "Two different surface properties of regenerated cellulose due to structural anisotropy," Polymer J., 2006, 38(8): 819-826.
Yang et al., "Chemically Cross-Linked Cellulose Nanocrystal Aerogels with Shape Recovery and Superabsorbent Properties," Chem. Mater., 2014, 35(2): 6016-6025.
Yang et al., "Oilfield produced water treatment with surface-modified fiber ball media filtration," Water Sci. Technol., 2002, 46(11-12): 165-170.
Yeboah et al., "Geological disposal of energy-related waste," KSCE J. Civil Eng., 2011, 15(4): 697-705.
Young, "An essay on the cohesion of fluids," Phil. Trans. Royal Soc. London, 1805, 95, 65-87.
Zahid et al., "Oil slick removal using matrices of polypropylene filaments," Indust. Eng. Chem. Process Des. Dev., 1972, 11(4): 550-555.
Zaidi et al., "The use of micro/ultrafiltration for the removal of oil and suspended solids from oilfield brines," Water Sci. Tech., 1992, 25(10): 163-176.
Zaritsky et al., "Instructive simulation of the bacterial cell division cycle," Microbiol.-SGM, 2011, 157, 1876-1885.
Zeinalipour-Yazdi et al., "Correlation of polarizabilities with Van Der Waals interactions in pi-systems," J. Phys. Chem. B, 2006, 1100(47): 24260-24265.
Zhang et al., "Aerogels from crosslinked cellulose nano/microfibrils and their fast shape recovery property in water," Journal of Materials Chemistry, 2012, 22(2): 11642-11650.
Zhao et al., "A versatile, ultralight, nitrogen-doped graphene framework," Angew. Chemie—Int. Ed., 2012, 51(45): 11371-11375.

(56) References Cited

OTHER PUBLICATIONS

Zhu et al., "Facile removal and collection of oils from water surfaces through superhydrophobic and superoleophilic sponges," J. Phys. Chem. C, 2011, 115(35): 17464-17470.
Zhu et al., "Research and application on resource utilization technology of oily waste drilling fluid," Petrol. Sci. Technol., 2011, 29(14): 1470-1481.
Zhu et al., "Theoretical foundation of Zisman's empirical equation for wetting of liquids on solid surfaces," Eur. J. Phys., 2010, 31(2): 251-256.
Zisman et al., "Relation of the Equilibrium Contact Angle to Liquid and Solid Constitution," Contact Angle, Wettability, Adhes., 1964, 43(43) 1-51.
Zisman, "Surface energetics of wetting, spreading, and adhesion," J. Paint Technol., 1972, 44(564): 41-57.
Zou et al., "Mechanism of coalescence demulsification with microfiltration membrane," Chinese J. Chem. Eng., 2003, 11(3): 344-347.
Zouboulis et al., "Treatment of oil-in-water emulsions by coagulation and dissolved-air flotation," Colloids Surf. A: Physicochem. Eng. Aspects, 2000, 172, 153-161.
International Search Report and Written Opinion for Application No. PCT/US2017/014607 dated Mar. 24, 2017 (9 pages).
European Patent Office Extended Search Report for Application No. 17742121.1 dated Aug. 27, 2019 (8 pages).

\* cited by examiner

CELLULOSE ACETATE AEROGELS

CROSS-REFERENCE TO RELATED APPLICATIONS

The present patent application is continuation of U.S. Non-Provisional patent application Ser. No. 16/071,646, filed Jul. 20, 2018, which is a national stage filing under 35 U.S.C. § 371 of International Application No. PCT/US2017/014607, filed on Jan. 23, 2017, which claims the benefit of U.S. Provisional Application No. 62/281,364, filed Jan. 21, 2016, the content of which are incorporated herein by reference in their entirety.

FIELD OF INVENTION

The disclosure provided herein relates to mechanically strong, biodegradable and reusable aerogels made with a cross-linked cellulose ester, which have a low density and high porosity. The aerogels disclosed herein may be used as sorbent materials and can be functionalized with a hydrophobic agent.

BACKGROUND

Uncontrolled events such as oil, waste or chemical spillage into fresh water triggers a cascade of events which can include the contamination of water supplies and food resources. Such events and contamination are undesirable for the ecosystem. Known methods to address oil spills include skimming the oil, in situ burning, mechanical containment, and the use of dispersants, solidifiers and/or degrading microorganisms. However, these methods are generally inefficient or environmentally unfriendly. The need for efficient oil spill cleaning technology was apparent in the 2010 Deep Water Horizon spill, where oil gushed into the Gulf of Mexico for 87 straight days, pouring out over 200 million gallons of crude oil.

The use of strong, biodegradable and/or reusable sorbent material for oil, waste or chemical spill remediation is attractive as it is easy to implement and does not generate byproducts. Ideally, the spilled oil or chemical can be recovered, and the sorbent material reused. There is a need for strong and efficient sorbent materials which can be reused and are compatible with the environment.

SUMMARY

The present disclosure provides an aerogel which is made from a cellulose ester polymer having a degree of substitution ("DS") of from about 1.0 to about 2.8, such as cellulose acetate, which is cross-linked, and which has a bulk density of from about 1 mg/cc to about 500 mg/cc. The aerogel can also include a hydrophobic agent.

The present disclosure also provides methods of adsorbing a non-polar liquid from a mixture of a non-polar liquid and a polar liquid, including the step of contacting the mixture with an aerogel made from a cross-linked cellulose ester polymer that includes a hydrophobic agent, and which has a bulk density of from about 1 mg/cc to about 500 mg/cc. The non-polar liquid can be oil and the polar liquid can be water.

Also provided is a method for preparing an aerogel which has a bulk density of from about 1 mg/cc to about 500 mg/cc, comprising a cellulose ester polymer having a DS of from about 1.0 to about 2.6 which is cross-linked, where the method includes the steps of forming a homogenous solution of a cellulose ester in a solvent, adding a cross-linking agent to the homogenous solution to form a cellulosic intermediate cross-linked via an ester, ether or urethane linkage, exchanging the solvent with water to obtain a hydrated cellulosic intermediate, freezing the hydrated cellulosic intermediate; and lyophilizing the frozen cellulosic intermediate to obtain the aerogel. The method can also include the step of functionalizing the aerogel with a hydrophobic agent to form a hydrophobic cross-linked aerogel. The aerogel can be functionalized by chemical vapor deposition with an alkyl, cycloalkyl or aromatic silanating reagent, such as trichloro(octyl)silane (TCOS), to provide a modified aerogel. Alternatively, the aerogel can be functionalized using solution phase techniques.

Other aspects of the disclosure will become apparent by consideration of the detailed description and accompanying drawings.

BRIEF DESCRIPTION OF THE DRAWINGS

The drawings below are supplied in order to facilitate understanding of the Description and Examples provided herein.

DETAILED DESCRIPTION

Figure 1:
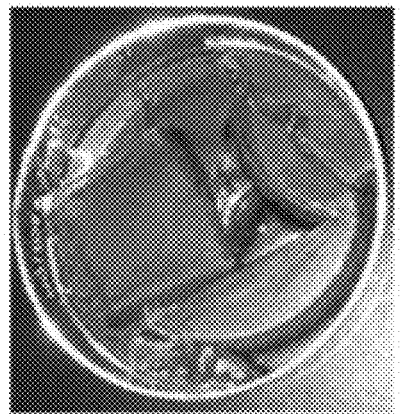
FIG. 1 shows two photographs of an aerogel containing 4 wt % cellulose acetate (Eastman; CA-394-605, referred to as "CDA"), in the non-gelled state (left photo) and the gelled state (right photo).
Figure 1:
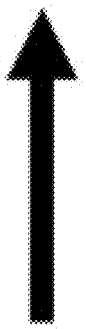
Figure 1:
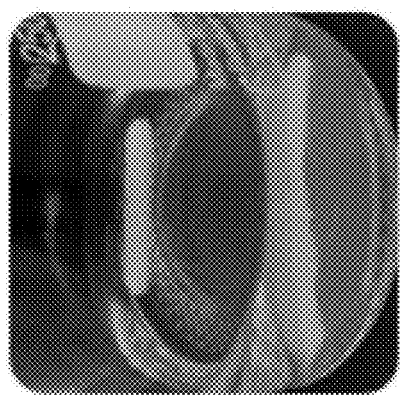

There are three broad categories of sorbent materials: organic (including milkweed, wood chips, rice straw); inorganic (including organo-clays, perlite, sand, zeolites); and synthetic (including non-woven polypropylene mats). However, they all suffer from low sorption abilities (typically less than 10 grams per gram of substrate), not being buoyant (which makes them difficult to separate), and/or not being biodegradable.

Aerogels are useful sorbent materials because of their light weight and high pore volume. Conventional silica aerogels are very brittle, making them difficult to remove from a mixture of oil and water, thus risking secondary contamination. Silica-chitosan composite aerogels have better mechanical properties, but have a low porosity (<96%) and high density (>58 mg/cc), which results in low sorption. Carbon nanotube and graphene based aerogels exhibit relatively high sorption of non-polar solvents (500-600 g/g), but they are not biodegradable and their synthesis involves expensive materials and high temperatures.

The use of cellulose derivatives as potential sorbents opens up a new area of biodegradable aerogels that are relatively easy to synthesize and have better mechanical properties than conventional silica, carbon or graphene based aerogels. Herein, light and highly porous aerogels made with cellulose diacrylates are disclosed, with maximum compressive strengths as high as 350 kPa. The inventive aerogels can separate oil from a simulated oceanic oil spill without observable disintegration. The cellulosic aerogels were synthesized via sol-gel cross-linking followed by solvent exchange with water and freeze drying, then were rendered hydrophobic by chemical vapor deposition of a chlorosilane. The silanated cellulosic aerogels separated viscous motor oil (170 cP) from water within 2 minutes.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The term "modified" as used herein to describe the inventive aerogels, means that the aerogel is functionalized to incorporate at least one hydrophobic and/or oleophilic chemical group. Generally, this occurs by reaction of a hydroxyl group on the cellulose with an activated hydrophobic and/or oleophilic group, such as a substituted alkyl chloride, to form an ether linkage between the cellulose and the hydrophobic/oleophilic group. Exemplary activated hydrophobic and/or oleophilic groups include trichloro(octyl)silane. Other examples include a $C_2$-$C_{20}$ alkyl silane, a $C_3$-$C_7$ cycloalkyl silane, an aromatic silane, an ($C_2$-$C_{20}$) alkyl, a ($C_3$-$C_7$)cycloalkyl, an ($C_2$-$C_{20}$)alkyl urethane, a ($C_3$-$C_7$)cycloalkyl urethane, an ($C_2$-$C_{20}$)alkyl ester, a ($C_3$-$C_7$)cycloalkyl ester, an ($C_2$-$C_{20}$)alkyl carbonate, a ($C_3$-$C_7$) cycloalkyl carbonate, or any mixtures of the foregoing. In an embodiment, the hydrophobic and/or oleophilic group is a $C_5$-$C_{10}$ alkyl silane, such as octyl silane.

As used herein, the term "alkyl" is a branched or unbranched saturated hydrocarbon group of 1 to 20 carbon atoms, such as methyl, ethyl, n-propyl, isopropyl, n-butyl, isobutyl, t-butyl, pentyl, hexyl, heptyl, octyl, nonyl, decyl, tetradecyl, hexadecyl, eicosyl, and tetracosyl. The alkyl group can be substituted or unsubstituted. The alkyl group can be substituted with one or more groups including, but not limited to, alkyl, aromatic, cycloalkyl, halide, nitro, hydroxy, carboxylic acid, or alkoxy.

The term "cycloalkyl" as used herein is a $C_3$ to $C_7$ cyclic hydrocarbon group of 3 to 7 carbon atoms. Examples of cycloalkyl groups include, but are not limited to, cyclopropyl, cyclobutyl, cyclopentyl, and cyclohexyl. The cycloalkyl group can be substituted or unsubstituted. The cycloalkyl group can be substituted with one or more groups including, but not limited to, alkyl, aromatic, cycloalkyl, halide, nitro, hydroxy, carboxylic acid, or alkoxy.

The term "aromatic" as used herein is any carbon-based aromatic group including, but not limited to, benzene, naphthalene, etc. The term "aromatic" also includes a heteroaromatic group," which is defined as an aromatic group that has at least one heteroatom incorporated within the ring of the aromatic group. Examples of heteroatoms include, but are not limited to, nitrogen, oxygen, sulfur, and phosphorus. The aromatic group can be substituted or unsubstituted. The aromatic group can be substituted with one or more groups including, but not limited to, alkyl, cycloalkyl, halide, nitro, hydroxy, carboxylic acid, or alkoxy.

The term "substituted hydroxyl group" as used herein is a hydroxyl group where the hydroxyl proton is replaced with an organic group such as, for example, an alkyl group, a cycloalkyl group, or an aromatic group.

The term "silane" as used herein means any compound which includes a tetravalent silicon atom bound to a hydrogen, a halogen, an alkyl group, a cycloalkyl group, an aromatic group, or any mixture of the foregoing. A "silane" is analogous to an alkane, which includes a tetravalent carbon atom. Exemplary silanes include trichlorosilane ($SiHCl_3$), trichloro(octyl)silane (TCOS), and trialkyl silyl halides ($R_3Si$-halogen).

As used herein, the term "sorption" includes both absorption and adsorption, meaning that it includes the processes of a material (here, an organogel, a hydrogel or an aerogel) incorporating a liquid into the gel in any manner, including into its surface and bulk volume. Unless specifically indicated otherwise, the words sorption, absorption and adsorption are used interchangeably.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof, as well as additional items.

It also should be understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Reference throughout this specification to "one embodiment," "an embodiment," or similar language means that a particular feature, structure, or characteristic described in connection with the embodiment is included in at least one embodiment of the invention provided herein. Thus, appearances of the phrases "in one embodiment," "in an embodiment," and similar language throughout this specification may, but do not necessarily, all refer to the same embodiment.

Furthermore, the described features, structures, or characteristics of the methods and compositions provided herein may be combined in any suitable manner in one or more embodiments. In the following description, numerous specific details are provided, to provide a thorough understanding of embodiments. One skilled in the relevant art will recognize, however, that the embodiments may be practiced without one or more of the specific details, or with other methods, components, or materials. In other instances, well-known structures, materials, or operations are not shown or described in detail to avoid obscuring aspects of the embodiments.

2. AEROGELS

In one aspect, the disclosure provides aerogels comprising a crosslinked-cellulose ester having a degree of substitution of from about 1.0 to about 2.8, wherein the aerogel has a bulk density of from about 1 mg/cc to about 500 mg/cc, and wherein the cellulose ester is a $(C_1-C_{10})$alkyl-C(O)-functionalized cellulose. The aerogel may include a cellulose ester that is cross-linked by a cross-linking agent. The aerogel may also include a hydrophobic agent. In addition, the disclosed aerogels have advantageous properties that allow them to be used in a number of different applications.

a. Cellulose Ester

The aerogel may include any type of cellulose ester that is suitable for production of the aerogel (e.g., can be cross-linked). The cellulose ester may be functionalized with different substituents, and these different substituents may impart certain characteristics to the aerogel. For instance, the cellulose ester may be a $(C_1-C_{10})$alkyl-C(O)-functionalized cellulose, such as a $(C_1-C_6)$alkyl-C(O)-functionalized cellulose or a $(C_1-C_3)$alkyl-C(O)-functionalized cellulose. The cellulose ester may be functionalized with a plurality of $(C_1-C_{10})$alkyl-C(O) groups, which may be the same or may be different. In some embodiments, the cellulose ester is cellulose acetate, cellulose acetate propionate, cellulose acetate butyrate, or a combination thereof.

The cellulose ester has a degree of substitution. For instance, a cellulose acetate repeating unit with a degree of substitution of 2 has one hydroxyl group per unit on average. By varying the degree of substitution of the cellulose ester, different properties of the aerogel may be modified. In addition, the degree of substitution may affect the crosslinking reaction used to provide the disclosed aerogels. Once cross-linked, the cellulose ester has the same degree of substitution as the cellulose ester prior to cross-linking. The cellulose ester may have a degree of substitution of from about 1.0 to about 2.8, such as from about 1.2 to about 2.8 or from about 1.8 to about 2.6. For example, the cellulose ester may have a degree of substitution of about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7 or about 2.8. In some embodiments, the cellulose ester has a degree of substitution of about 2.5.

In some embodiments, the cellulose ester may have a degree of substitution of greater than about 1.0, greater than about 1.2, greater than about 1.4, greater than about 1.5, greater than about 1.6, greater than about 1.7, greater than about 1.8, or greater than about 2.0.

In some embodiments, the cellulose ester may have a degree of substitution of less than about 2.8, less than about 2.7, or less than about 2.6.

The aerogel may include varying amounts of the cellulose ester, such as from about 85 wt. % to about 99 wt. % (wt. % of the aerogel). For example, the aerogel may include the cellulose ester at about 85 wt. %, about 86 wt. %, about 87 wt. %, about 88 wt. 00 about 89 wt. %, about 90 wt. %, about 91 wt. %, about 92 wt. %, about 93 wt. %, about 94 wt. %, about 95 wt. %, about 96 wt. %, about 97 wt. %, about 98 wt. %, or about 99 wt. %.

In some embodiments, the aerogel may include the cellulose ester at greater than about 85 wt. %, greater than about 86 wt. %, greater than about 87 wt. %, greater than about 88 wt. %, greater than about 89 wt. %, or greater than about 90 wt. %.

In some embodiments, the aerogel may include the cellulose ester at less than about 99 wt. %, less than about 98 wt. %, less than about 97 wt. %, less than about 96 wt. 00 less than about 95 wt. %, or less than about 94 wt. %.

b. Cross-linking Agent

The cellulose ester may be cross-linked through its pendant hydroxyl groups present on its cellulose ring via a cross-linking agent (which can refer to the cross-linking agent prior to cross-linking the cellulose ester or to the cross-linking molecule present in the cross-linked cellulose ester). Various cross-linking agents may be used in the synthesis of the cross-linked cellulose ester aerogels. For example, the cellulose esters can be cross-linked via an ester, ether or urethane linkage. In some embodiments, the cross-linking agent may be a $C_7-C_{20}$ aromatic anhydride, a $(C_5-C_{20})$cycloalkyl anhydride, a bis(halo($C_1-C_3$)alkyl)-($C_5-C_2$M)aromatic, a bis(halo($C_1-C_3$)alkyl)($C_3-C_7$)cycloalkyl, a bis(isocyanato($C_1-C_3$)alkyl)($C_5-C_2$M)aromatic, or a bis(isocyanato($C_1-C_3$)alkyl)($C_3-C_7$)cycloalkyl. In some embodiments, PMDA is used to cross-link the cellulose ester via an ester linkage.

The aerogel may include varying amounts of the cross-linking agent, such as from about 1 wt. % to about 15 wt. % (wt. % of the aerogel). For example, the aerogel may include the cross-linking agent at about 1 wt. %, about 2 wt. %, about 3 wt. %, about 4 wt. 00 about 5 wt. %, about 6 wt. %, about 7 wt. %, about 8 wt. %, about 9 wt. %, about 10 wt. 00 about 11 wt. %, about 12 wt. %, about 13 wt. %, about 14 wt. %, or about 15 wt. %.

In some embodiments, the aerogel may include the cross-linking agent at greater than about 1 wt. %, greater than about 2 wt. %, greater than about 3 wt. %, greater than about 4 wt. %, greater than about 5 wt. %, or greater than about 6 wt. %.

In some embodiments, the aerogel may include the cross-linking agent at less than about 15 wt. %, less than about 14 wt. %, less than about 13 wt. %, less than about 12 wt. %, less than about 11 wt. %, or less than about 10 wt. %.

c. Hydrophobic Agent

The disclosed aerogels may include a hydrophobic agent. The hydrophobic agent may increase the aerogels capacity to adsorb hydrophobic liquids from, e.g., an aqueous environment. In some embodiments, the hydrophobic agent is selected from at least one of a $C_2$-$C_{20}$ alkyl silane, a $C_3$-$C_7$ cycloalkyl silane, an aromatic silane, an ($C_2$-$C_{20}$)alkyl, a ($C_3$-$C_7$)cycloalkyl, an ($C_2$-$C_{20}$)alkyl urethane, a ($C_3$-$C_7$) cycloalkyl urethane, an ($C_2$-$C_{20}$)alkyl ester, a ($C_3$-$C_7$)cycloalkyl ester, an ($C_2$-$C_{20}$)alkyl carbonate, a ($C_3$-$C_7$)cycloalkyl carbonate or any mixture thereof. In some embodiments, the hydrophobic agent is a $C_5$-$C_{10}$ alkyl silane.

In some embodiments, the hydrophobic agent may be present in a uniform concentration throughout the aerogel. In other embodiments, the hydrophobic agent may be present in a non-uniform concentration throughout the aerogel, e.g., the hydrophobic agent may be present at higher concentrations at the surface of the aerogel relative to the center of the aerogel, and vice versa.

d. Properties of Aerogels

The disclosed aerogels may have many unique properties that make them advantageous for a number of different applications (e.g., oil decontamination). These properties include, but are not limited to, bulk density, porosity, compressive strength, strain, compression modulus, pore size, Brunauer-Emmett-Teller (BET) value, and surface tension.

The aerogel may have a bulk density of from about 1 mg/cc to about 500 mg/cc, such as from about 10 mg/cc to about 100 mg/cc or from about 15 mg/cc to about 85 mg/cc. For example, the aerogel may have a bulk density of about 1 mg/cc, about 5 mg/cc, about 10 mg/cc, about 15 mg/cc, about 20 mg/cc, about 30 mg/cc, about 40 mg/cc, about 50 mg/cc, about 60 mg/cc, about 70 mg/cc, about 80 mg/cc, about 85 mg/cc, about 90 mg/cc, about 100 mg/cc, about 150 mg/cc, about 200 mg/cc, about 250 mg/cc, about 300 mg/cc, about 350 mg/cc, about 400 mg/cc, about 450 mg/cc or about 500 mg/cc.

In some embodiments, the aerogel may have a bulk density of greater than about 1 mg/cc, greater than about 5 mg/cc, greater than about 10 mg/cc, greater than about 15 mg/cc, greater than about 20 mg/cc, greater than about 30 mg/cc, greater than about 40 mg/cc, or greater than about 50 mg/cc.

In some embodiments, the aerogel may have a bulk density of less than about 500 mg/cc, less than about 400 mg/cc, less than about 300 mg/cc, less than about 200 mg/cc, less than about 150 mg/cc, or less than about 100 mg/cc.

The aerogel may have a porosity equal to or greater than 90%, equal to or greater than 91%, equal to or greater than 92%, equal to or greater than 93%, equal to or greater than 94%, equal to or greater than 95%, equal to or greater than 96%, equal to or greater than 97%, or equal to or greater than 98%.

The aerogel may have a maximum compressive stress of from about 50 kPa to about 400 kPa. For example, the aerogel may have a maximum compressive stress of about 50 kPa, about 60 kPa, about 70 kPa, about 80 kPa, about 90 kPa, about 100 kPa, about 150 kPa, about 200 kPa, about 250 kPa, about 300 kPa, about 350 kPa, or about 400 kPa. In some embodiments, the aerogel may have a maximum compressive stress of greater than about 50 kPa, greater than about 60 kPa, greater than about 70 kPa, greater than about 80 kPa, greater than about 90 kPa, or greater than about 100 kPa. In some embodiments, the aerogel may have a maximum compressive stress of less than about 400 kPa, less than about 350 kPa, less than about 300 kPa, less than about 250 kPa, less than about 200 kPa, less than about 150 kPa, or less than about 100 kPa.

The aerogel may have a maximum strain of from about 15% to about 100%, such as from about 25% to about 95% or from about 35% to about 90%. For example, the aerogel may have a maximum strain of about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%. In some embodiments, the aerogel may have a maximum strain of greater than about 15%, greater than about 30%, or greater than about 50%. In some embodiments, the aerogel may have a maximum strain of less than about 100%, less than about 95%, or less than about 90%.

The aerogel may have a compression modulus of from about 20 kPa to about 500 kPa. For example, the aerogel may have a compression modulus of about 20 kPa, about 50 kPa, about 100 kPa, about 150 kPa, about 200 kPa, about 250 kPa, about 300 kPa, about 350 kPa, about 400 kPa, about 450 kPa, or about 500 kPa. In some embodiments, the aerogel may have a compression modulus of greater than about 20 kPa, greater than about 25 kPa, or greater than about 30 kPa. In some embodiments, the aerogel may have a compression modulus of less than about 500 kPa, less than about 450 kPa, or less than about 400 kPa.

The aerogel may have an average diameter pore size of from about 20 μm to about 100 μm. For example, the aerogel may have an average diameter pore size of about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, or about 100 μm. In some embodiments, the aerogel may have an average diameter pore size of greater than about 20 μm, greater than about 25 μm, or greater than about 30 μm. In some embodiments, the aerogel may have an average diameter pore size of less than about 100 μm, less than about 95 μm, or less than about 90 μm.

The aerogel may have a BET (a measure of surface area) of from about 2 $m^2$/g to about 5 $m^2$/g. For example, the aerogel may have a BET of about 2 $m^2$/g, about 2.2 $m^2$/g, about 2.4 $m^2$/g, about 2.6 $m^2$/g, about 2.8 $m^2$/g, about 3 $m^2$/g, about 3.2 $m^2$/g, about 3.4 $m^2$/g, about 3.6 $m^2$/g, about 3.8 $m^2$/g, about 4 $m^2$/g, about 4.2 $m^2$/g, about 4.4 $m^2$/g, about 4.6 $m^2$/g, about 4.8 $m^2$/g, or about 5 $m^2$/g. In some embodiments, the aerogel may have a BET of greater than about 2 $m^2$/g, greater than about 2.5 $m^2$/g, or greater than about 3 $m^2$/g. In some embodiments, the aerogel may have a BET of less than about 5 $m^2$/g, less than about 4.5 $m^2$/g, or less than about 4 $m^2$/g.

The aerogel may have a surface tension of from about 30 mN/m to about 60 mN/m. For example, the aerogel may have a surface tension of about 30 mN/m, about 35 mN/m, about 40 mN/m, about 45 mN/m, about 50 mN/m, about 55 mN/m, or about 60 mN/m. In some embodiments, the aerogel may have a surface tension of greater than about 30 mN/m, greater than about 35 mN/m, or greater than about 40 mN/m. In some embodiments, the aerogel may have a surface tension of less than about 60 mN/m, less than about 55 mN/m, or less than about 50 mN/m.

In certain embodiments, an aerogel exhibits at least one of the following properties: a porosity equal to or greater than about 98%, a maximum compressive stress of from about 50 kPa to about 400 kPa, a maximum strain of from about 15% to about 100%, a compression modulus of from about 20 kPa to about 500 kPa, an average diameter pore size of from about 20 micrometers to 80 micrometers, a BET of from about 2 m²/g to about 5 m²/g, and a surface tension of from about 30 mN/m to about 60 mN/m. In some embodiments, the aerogel exhibits more than one of the properties listed above; in some embodiments, the aerogel exhibits all of the aforementioned properties.

3. METHODS OF MAKING THE AEROGELS

Also disclosed herein are methods for preparing the aerogel comprising a cross-linked cellulose ester. In some aspects, the methods may include forming a homogenous solution of a cellulose ester having a degree of substitution of from about 1.0 and about 2.8 in a solvent; adding a cross-linking agent to the homogenous solution to form a cellulosic intermediate cross-linked via an ester, ether or urethane linkage; exchanging the solvent with water to obtain a hydrated cellulosic intermediate; freezing the hydrated cellulosic intermediate, and lyophilizing the frozen cellulosic intermediate to obtain the aerogel. The methods produce a cross-linked cellulose ester gel intermediate (e.g., organogel) that is solvent exchanged to obtain a hydrated cellulosic intermediate (e.g., hydrogel), where the hydrogel is frozen and lyophilized to provide the disclosed aerogels. The method may provide an aerogel with properties (e.g., bulk density) as described above. Steps such as the cross-linking reaction, solvent exchange and freezing may be utilized to tailor properties of the aerogels.

The cellulose ester may be dissolved in a solution at varying amounts to form the homogenous solution, which may be combined with the cross-linking agent to provide the cross-linked cellulose ester. The cellulose ester used to produce the cross-linked cellulose ester may be present in the homogenous solution at from about 1 weight/volume (w/v) % to about 15 w/v %, such as from about 2 w/v % to about 12 w/v % or from about 2 w/v % to about 8 w/v %. For example, the cellulose ester used to produce the cross-linked cellulose ester may be present at about 1 w/v 00 about 2 w/v 00 about 3 w/v 00 about 4 w/v %, about 5 w/v %, about 6 w/v %, about 7 w/v 00 about 8 w/v 00 about 9 w/v 00 about 10 w/v %, about 11 w/v %, about 12 w/v %, about 13 w/v %, about 14 w/v %, or about 15 w/v %.

In some embodiments, the cellulose ester used to produce the cross-linked cellulose ester may be present in the homogenous solution at greater than about 1 w/v 00 greater than about 2 w/v %, greater than about 3 w/v %, greater than about 4 w/v %, greater than about 5 w/v %, or greater than about 6 w/v %.

In some embodiments, the cellulose ester used to produce the cross-linked cellulose ester may be present in the homogenous solution at less than about 15 w/v %, less than about 14 w/v %, less than about 13 w/v %, less than about 12 w/v %, less than about 11 w/v %, or less than about 10 w/v %.

Any solvent suitable to dissolve the cellulose ester may be used in the disclosed methods. In some embodiments, forming a homogenous solution of cellulose ester is performed in acetone for a period of about 24 hours. Additionally, and as mentioned above, the cellulose ester may have a degree of substitution of from about 1.0 to about 2.8. The degree of substitution and weight percentage of the cellulose ester solution may be used to alter the cross-linking reaction of the cellulose ester with the cross-linking agent to form a cellulosic intermediate cross-linked via, e.g., an ester, an ether, or a urethane linkage. Examples of cross-linking agents that can be used for forming the cross-linked cellulose intermediate are listed above. In some embodiments, a catalyst (e.g., triethyl amine) may be used in the cross-linking reaction.

The cross-linking agent can be used in varying amounts to cross-link the cellulose ester. The cross-linking agent used to cross-link the cellulose ester may be added to the homogenous solution at from about 0.1 w/v % to about 0.5 w/v %. For example, the crosslinking agent used to cross-link the cellulose ester may be added to the homogenous solution at about 0.1 w/v %, about 0.2 w/v %, about 0.3 w/v %, about 0.4 w/v %, or about 0.5 w/v %. In some embodiments, the crosslinking agent used to cross-link the cellulose ester may be added to the homogenous solution at greater than about 0.1 w/v %, greater than about 0.2 w/v %, or greater than about 0.3 w/v %. In some embodiments, the cross-linking agent used to cross-link the cellulose ester may be added to the homogenous soliton at less than about 0.5 w/v %, less than about 0.4 w/v %, or less than about 0.3 w/v %.

The cross-linked cellulosic intermediate may be solvent exchanged with water in order to provide a hydrated cellulosic intermediate, which can then have water removed via freezing and lyophilization steps to obtain the disclosed aerogels. The step of exchanging the solvent may be used to obtain aerogels with varying properties. For example, using different solvent volume fractions for variable amounts of time may allow for control of aerogel properties as described above (e.g., density, porosity, etc.). It is hypothesized that the solvent volume fraction and the amount of time used to exchange the solvent can affect swelling properties of the cross-linked cellulosic intermediate (and hydrated intermediate thereof), which in turn may be used to control mechanical properties of the obtained aerogels.

The exchange of solvent may be performed over a series of solvent exchange steps. Or in other words, the solvent exchange may be repeated a number of times. The solvent exchange may follow a gradual progression of having a decreased amount of solvent in each subsequent exchange (e.g., solvent volume fraction decreases with each exchange). In some embodiments, the solvent exchange step is performed 1× to 10×. For example, the solvent exchange may be performed 1×, 2×, 3×, 4×, 5×, 6×, 7×, 8×, 9×, or 10×. Additionally, exchanging the solvent may be done at a solvent volume fraction of from about 1 to about 0. For example, exchanging the solvent may be done at a solvent volume fraction of about 1, about 0.9, about 0.8, about 0.75, about 0.6, about 0.5, about 0.4, about 0.3, about 0.25, about 0.2, about 0.1 or about 0. The exchange of solvent can be performed for a period of time, such as from about 1 hour to about 48 hours. In addition, each solvent exchange step may be performed for a period of time, such as from about 1 hour to about 48 hours. In some embodiments, the first exchange of solvent with water is done for a time of equal to or less than 48 hours. In some embodiments, exchanging the solvent with water is done at least 2× at a solvent volume fraction of from about 1 to about 0. In some embodiments, the final exchange of solvent with water is done in water (e.g., solvent volume fraction of 0).

Figure 31:
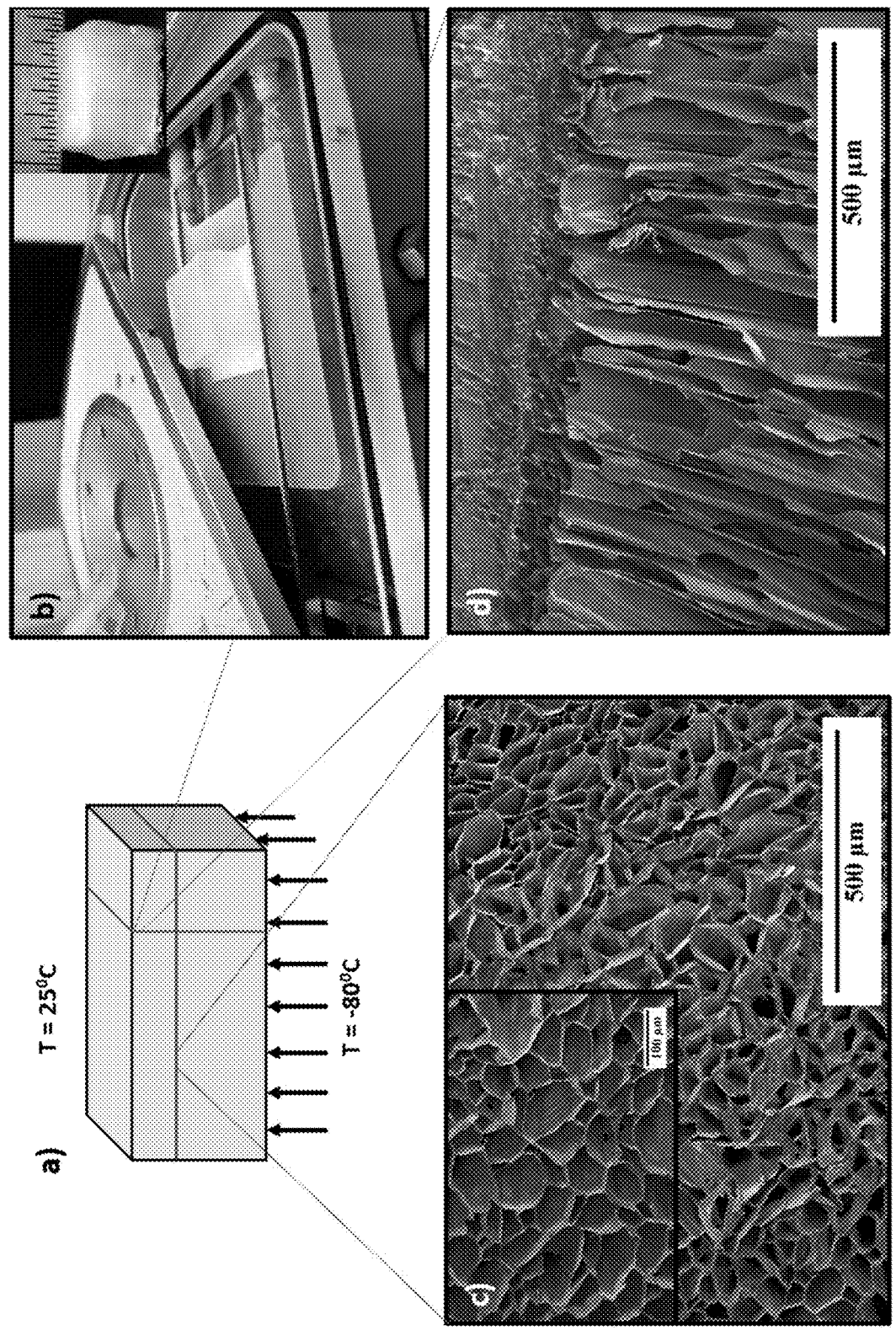
FIG. 31 is a characterization of unidirectional freezing for disclosed aerogels: a) schematic of unidirectional freezing of hydrogel; b) an image showing the unidirectional freezing arrangement (Inset shows the CDA hydrogel); c) an SEM image of out-of-plane view, cross-section perpendicular to the freezing direction (Inset shows the magnified SEM image); d) an SEM image of in-plane view, cross-section in direction to the freezing direction.

The step of freezing the hydrated cellulosic intermediate can be performed in different manners. For example, in some embodiments the hydrated cellulosic intermediate may be frozen in a dry ice/ethanol bath for a period of time (e.g., for about 10 minutes to about 30 minutes). In other embodiments, the hydrated cellulosic intermediate may be frozen in one direction (FIG. 31), which may be used to align the pore structure of the obtained aerogels. After being frozen, the cellulosic intermediate may be lyophilized to obtain aerogels.

The method may further comprise functionalizing the aerogel with a hydrophobic agent to form a hydrophobic aerogel. Functionalizing the aerogel with a hydrophobic agent may be performed after the frozen cellulosic intermediate has been lyophilized. Hydrophobic agents that can be used to functionalize the aerogel have been described above. In some embodiments, the functionalizing step is performed by chemical vapor deposition.

In some embodiments, the method does not include sonication. In some embodiments, the step of forming a homogenous solution of polymer does not include sonication.

4. USES OF THE AEROGELS

The disclosed aerogels may be useful in a number of different applications, including the sorption of liquids, shock absorbers, thermal insulation and acoustic insulation.

The aerogels may have the capacity to sorb aqueous liquids, such as water. In some embodiments, the aerogels may have the capacity to absorb at least about 20 grams of water per gram of aerogel.

Additionally and as detailed above, the aerogels may be modified (e.g., to increase hydrophobicity), which may be beneficial for sorption of a wider range of liquids, in addition to water. For example, hydrophobically-modified aerogels may adsorb at least about 20 grams of oil per gram of aerogel.

Hydrophobically-modified aerogels may be used to adsorb non-polar liquids from a mixture of a non-polar and a polar liquid by contacting the aerogel with the mixture. In some embodiments, the non-polar liquid may be oil or hexane, and the polar liquid may be water. In some embodiments, the aerogel may adsorb between about 25 grams and about 60 grams of non-polar liquid per gram of aerogel. In addition, the aerogels may sorb more than one liquid after contacting a mixture of liquids. For example, in a mixture including oil and water, hydrophobically-modified aerogels may be capable of adsorbing oil and water at a ratio of (oil:water) of from about 1:5 and about 1:50.

The disclosed aerogels are advantageously robust, in the sense they can be used a number of times in an application without losing its intended function for said application. For example, the aerogels can adsorb at least about 10 grams of oil per gram of aerogel after 5 cycles of adsorption and compression.

Exemplary embodiments of the present disclosure are provided in the following examples. The examples are presented to illustrate the inventions disclosed herein and to assist one of ordinary skill in making and using the same. These are examples and not intended in any way to otherwise limit the scope of the inventions disclosed herein.

5. EXAMPLES

Example 1: Synthesis and Characterization of Aerogels

Methods

Materials. Cellulose acetate flakes, referred herein as "CDA," were obtained from Eastman Chemical Co. (catalog number CA-394-60S) with a degree of substitution of about 2.5, and were used as received. Acetone (99%), ethanol, triethyl amine (TEA), trichloro(octyl)silane (TCOS; 99%), and the cross-linking agent 1,2,4,5-benzenetetracarboxylic acid, also known as pyromelletic dianhydride (PMDA), were purchased from Sigma Aldrich. Deionized (DI) water was used for all water purposes. Dry ice was prepared in the lab using a liquid $CO_2$ cylinder with siphon tube from Airgas. All solvents used for wicking measurements were 99% pure and bought from Sigma Aldrich.

Gelation of Cellulose Esters. Aerogels made with different amounts of cellulose acetate were synthesized using PMDA as a cross-linking agent, as shown below. Four solutions containing CDA were prepared: 2 wt %, 4 wt %, 6 wt % and 8 wt %. The weight percentages for CDA indicated in Examples 1-3 are per volume (i.e. w/v) of solution, and accordingly are also referred to with the same nomenclature in the Drawings and Brief Descriptions thereof. For each cellulose acetate solution, a homogeneous solution of cellulose acetate in acetone was formed by stirring the cellulose acetate in a 100 ml Pyrex bottle for 24 hours. Generally, a stock solution of cellulose acetate in acetone (100 or 200 mL) was prepared and used for further experimentation.

A cellulose acetate repeating unit with a degree of substitution of 2 has one hydroxyl group per unit on average and, assuming that one PMDA molecule will react with the hydroxyl groups from two different cellulose acetate chains, the amount of PMDA needed for complete crosslinking can be calculated. The crosslinking step is shown in Scheme 1, below:

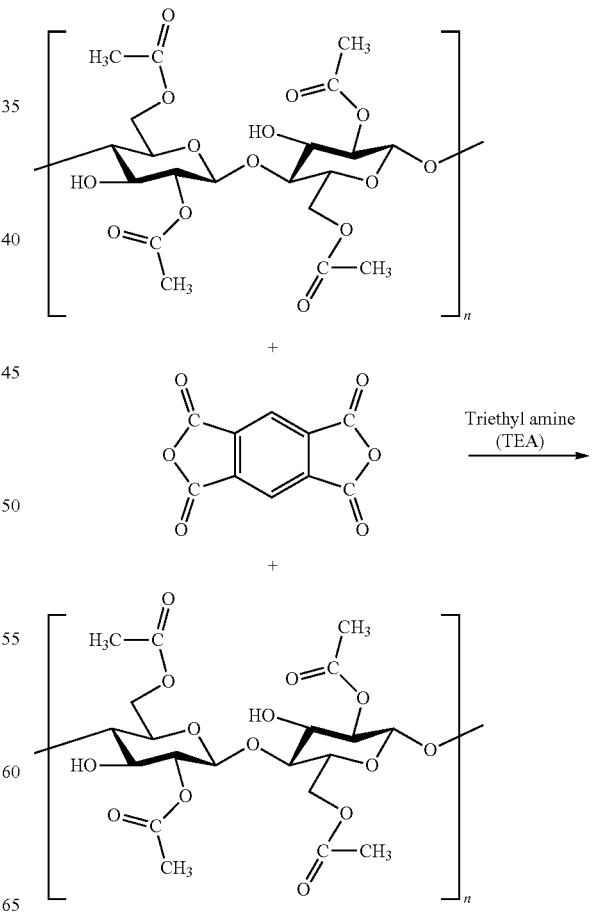

Scheme 1. Crosslinking of Cellulose Acetate with PMDA.

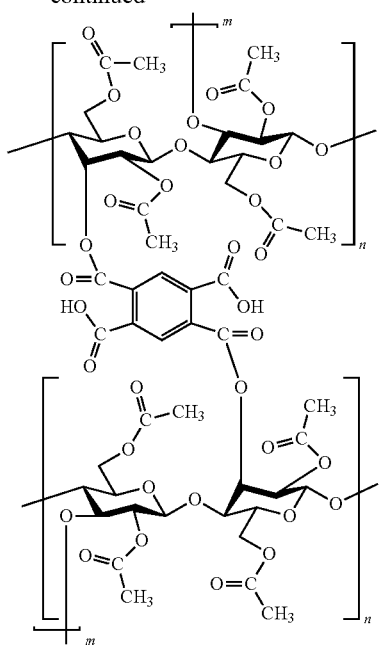

A cellulose acetate:PMDA molar ratio of 2:1 is required for complete cross-linking, but for these studies, a cellulose acetate:PMDA molar ratio of 8:1 (i.e. an excess of cellulose acetate) was used to prevent formation of a very rigid cross-linked structure and to have free hydroxyl groups available for further modification. To each of the homogeneous cellulose acetate solutions was added PMDA, and the solution was stirred for approximately 5 hr to ensure complete dissolution. For example, for 10 mL of a 4 wt % CDA solution, 0.04 gm of PMDA was added. To each of these solutions, 0.5 vol % of triethyl amine (TEA) was added as a catalyst, while stirring for another 30 seconds. For example, for the 4 wt % CDA solution, 0.5 mL of TEA was added. Each solution was then transferred to molds of different shapes and sizes and allowed to gel for 24 h.

Images of a sample of the gelation are shown in FIG. 1. FIG. 1 shows a 4 wt % CDA solution in a flask with a stir bar in the left photograph, and the gelled material after being allowed to set for 24 hours in the right photograph.

Solvent Exchange. The acetone-gelled cellulose acetate was subjected to sequential solvent exchange steps to gradually replace the acetone with DI water. The gel was placed in a mixed solution of acetone and DI water which was 5 times the volume of the gel and was replaced every 12 hours to allow adequate time for the gels to reach equilibrium with the solution. Generally 10 mL of gel and 50 mL of a solvent mixture was used. A total of 6 such exchanges were performed with following ratios of acetone:DI water: 90:10, 75:25, 50:50, 25:75, 10:90, 0:100. After the final exchange, each gel was kept in DI water for 24 hours. This gel in water is referred to as a hydrogel.

Aerogel Synthesis. The hydrogels were frozen by completely immersing each gel in a dry ice/ethanol bath. Generally, a 10 mL sample of gel was used and the gel was immersed for 20 minutes. The frozen hydrogels were then transferred to lyophilizer (Labconco FreeZone 2.5 Freeze Dryer) operating at −53° C. and 0.113 mbar, which is lower than the triple point of water. Each of the frozen hydrogels was dried for about 24 hours to provide a cellulose acetate aerogel.

Density and Porosity Measurements. The aerogel density (pa) was calculated by measuring the mass and volume of each aerogel. The mass of the aerogel was measured with an analytical balance (Fisher Scientific Accu-225D), which measures to 0.1 mg, and the volume was calculated by measuring the aerogel dimensions with digital Vernier calipers. The average density is reported from calculating the density of 5 aerogels.

The density calculation for the aerogels was calculated using the following equation:

$$\rho_{cal} = \frac{M_{CDA}}{\frac{M_{CDA}}{\rho_{CDA}} + \frac{(1 - M_{CDA})}{\rho_{water}}}$$

where $\rho_{cal}$ is the calculated density, $M_{CDA}$ is the weight percentage of the cellulose acetate added for the aerogel synthesis; $\rho_{CDA}$ is the density of the cellulose acetate flakes (1.3 gm/cc); and $\rho_{water}$ is the density of DI water (0.998 g/cc). It is assumed that there is no swelling or shrinkage of the aerogel during the solvent exchange.

The surface area calculation for the cellulose acetate aerogels is determined as follows. Assuming that the aerogel is composed of cylindrical pores with an average diameter of 50 μm, the surface area is calculated based on 1 gram of an aerogel containing 4% CDA (also referred to as a 4% aerogel) having a volume V:

$$V = 1/\rho_{aerogel} = \frac{1}{0.0234} cc.$$

The total surface area is $A = 2\pi rhN$, where r=the pore size radius (25 μm), h=the height of one cylindrical pore, and N=the total number of pores. The volume V is then:

$$V = \frac{1}{0.0234} = \pi r^2 hN,$$

and A can be calculated as:

$$A = \frac{2}{0.0234} m^2/g,$$

which gives $A = 3.42$ m$^2$/g. The surface area calculation is performed for comparison of the result with the experimental BET area.

The porosity of these aerogels was calculated using the following equation (Equation 1):

$$\text{Porosity} = \left(1 - \frac{\rho_a}{\rho_{CDA}}\right) * 100\%, \quad \text{(Equation 1)}$$

where $\rho_a$ is the bulk density of the aerogel and $\rho_{CDA}$ is the bulk density of the cellulose acetate flakes (1.3 g/cc).

Fourier Transform Infrared Spectroscopy (FTIR-ATR). The FTIR spectra were recorded using a Perkin Elmer FTIR spectrophotometer. Samples were analyzed in attenuated total reflectance mode (ATR) using the Pike Miracle accessory equipped with a GE crystal. The spectrum was collected for 256 scans and corrected for background noise. The multipoint baseline correction was realized for each spectrum.

BET Analysis. The Brunauer-Emmett-Teller (BET) surface area was measured by N2 absorption and desorption isotherms using a Micrometrics ASAP 2020 instrument. The 0.1-0.2 gram sample was first degassed for 3 hours at 115° C. prior to the analysis. BET analysis was done at a relative pressure of 0.01-0.3 at −196° C.

Scanning Electron Microscopy. The imaging was done with a Field Emission Scanning Electron Microscope (FE-SEM), FEI Verios 460L. The aerogels were fractured under liquid N2 using a sharp clean blade to image the radial cross-section. The samples were fixed on the metal stub using double sided carbon tape. The as-prepared SEM samples were coated with a 5 nm layer of gold and platinum to capture secondary electrons from the surface and thus reduce charging.

Mechanical Compression Testing. The freeze dried aerogels synthesized for compression testing were molded in 20 mL syringes with height:diameter ratio of 2:1. The top and bottom part of cylindrical aerogel was made smooth using a sharp clean blade. The compressive stress-strain curves were obtained via an Instron Series IX instrument using compressive loads of 0.5 N which were lowered at the rate of 5 mm/min.

Sorption Testing. The aerogel was immersed in a liquid and allowed to saturate for 12 hours. After immersion, the surface of the saturated aerogel was blotted with a lab-grade disposable tissue to remove surface liquid and weighed. Liquid uptake was calculated using the following equation (Equation 2):

$$\text{Liquid uptake} = \frac{W_{ab} - W_a}{W_a}, \quad \text{(Equation 2)}$$

where $W_{ab}$ and $W_a$ are the weight of the saturated aerogel and the weight of dry aerogel, respectively. In the cases where organic solvents were used, the blotting step was avoided to prevent wicking of solvent into the tissue. Instead, the saturated aerogels were weighed immediately.

Spin Coating. The silica wafers were coated with a 1 wt % CDA solution in acetone according to the following procedure. The 1 cm×1 cm silica wafers were cleaned by washing them in a piranha solution for 5 minutes. The silica wafers were then immersed in DI water for 5 minutes and thoroughly washed with DI water three times followed by drying with compressed N2 gas. The cleaned silica wafers were spin coated with CDA solution at 4000 rpm for 40 sec at an acceleration of 2400 sec$^{-1}$.

Some of the aforementioned methods are also applicable to Example 2.

Results

Figure 4:
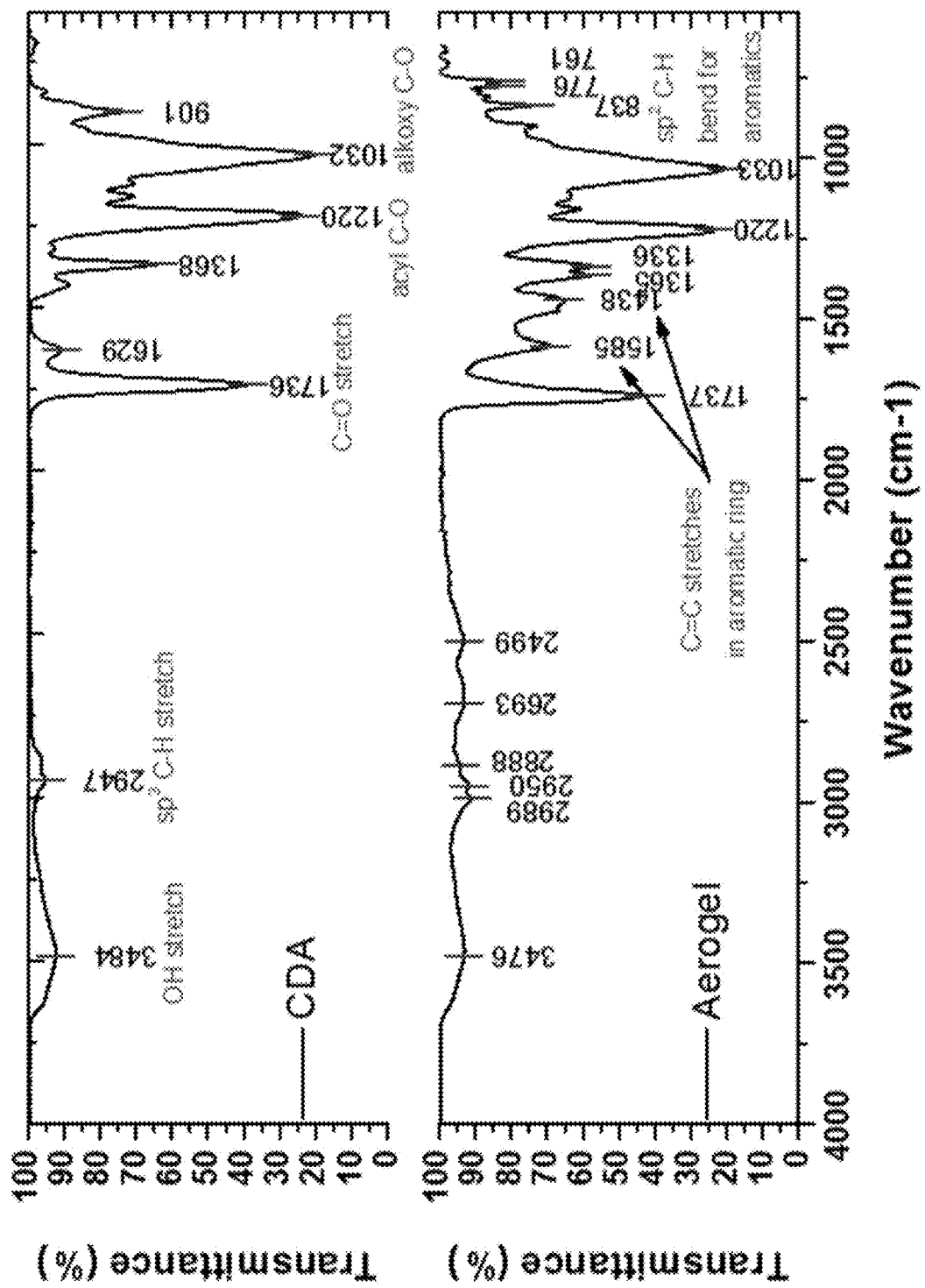
FIG. 4 shows Fourier Transform Infrared (FTIR) spectra of CDA (upper trace), and an aerogel containing 4 wt % CDA (lower trace).

The proposed cross-linking of the free hydroxyl groups of CDA with the anhydride group of PMDA to form an ester linkage is shown in Scheme 1, above. The formation of the ester linkage was confirmed via FTIR spectroscopy (FIG. 4). In FIG. 4, the upper spectrum shown is for cellulose acetate flakes ("CDA"), and the lower spectrum is for the corresponding aerogel made with 4 wt % CDA. The aerogel spectrum shows the additional aromatic peaks from the cross-linking PMDA moiety The main difference between the two FTIR curves are a) the out of plane angular vibrations of aromatic sp$^2$ C—H bends from 690 cm$^{-1}$ to 900 cm$^{-1}$, and b) the aromatic C═C stretch at around 1500 cm$^{-1}$. These two peaks indicate the presence of the aromatic cross-linker in the aerogel. Also, the lack of paired bands for the C═O stretch (indicative of anhydride groups) between the 1800 cm$^{-1}$-1830 cm$^{-1}$ & 1740 cm$^{-1}$-1775 cm$^{-1}$ regions indicates that all of the PMDA has reacted with hydroxyl groups in the cellulose acetate. A slight broadening of the O—H stretch at 3476 cm$^{-1}$ is likely due to an increase in the number of O—H bonds present in the carboxylic acid groups formed. The strong acyl C—O and alkoxy C—O peaks at 1220 cm$^{-1}$ and 1032 cm$^{-1}$, respectively, indicate the presence of C—O—C stretching in the glucopyranose ring. These peaks combined with the prominent carbonyl peak (C═O stretch) at 1736 cm$^{-1}$, confirms the presence of ester groups in the cellulose acetate aerogel. The peaks at around 2950 cm$^{-1}$ are due to the sp$^3$ C—H stretch, and the peak at 1368 cm$^{-1}$ corresponds to the C—H bend. The formation of a self-standing gel at the relatively low concentration of cellulose acetate used here (4 wt %) is also indicative of successful cross-linking, as shown in FIG. 1.

Figure 5:
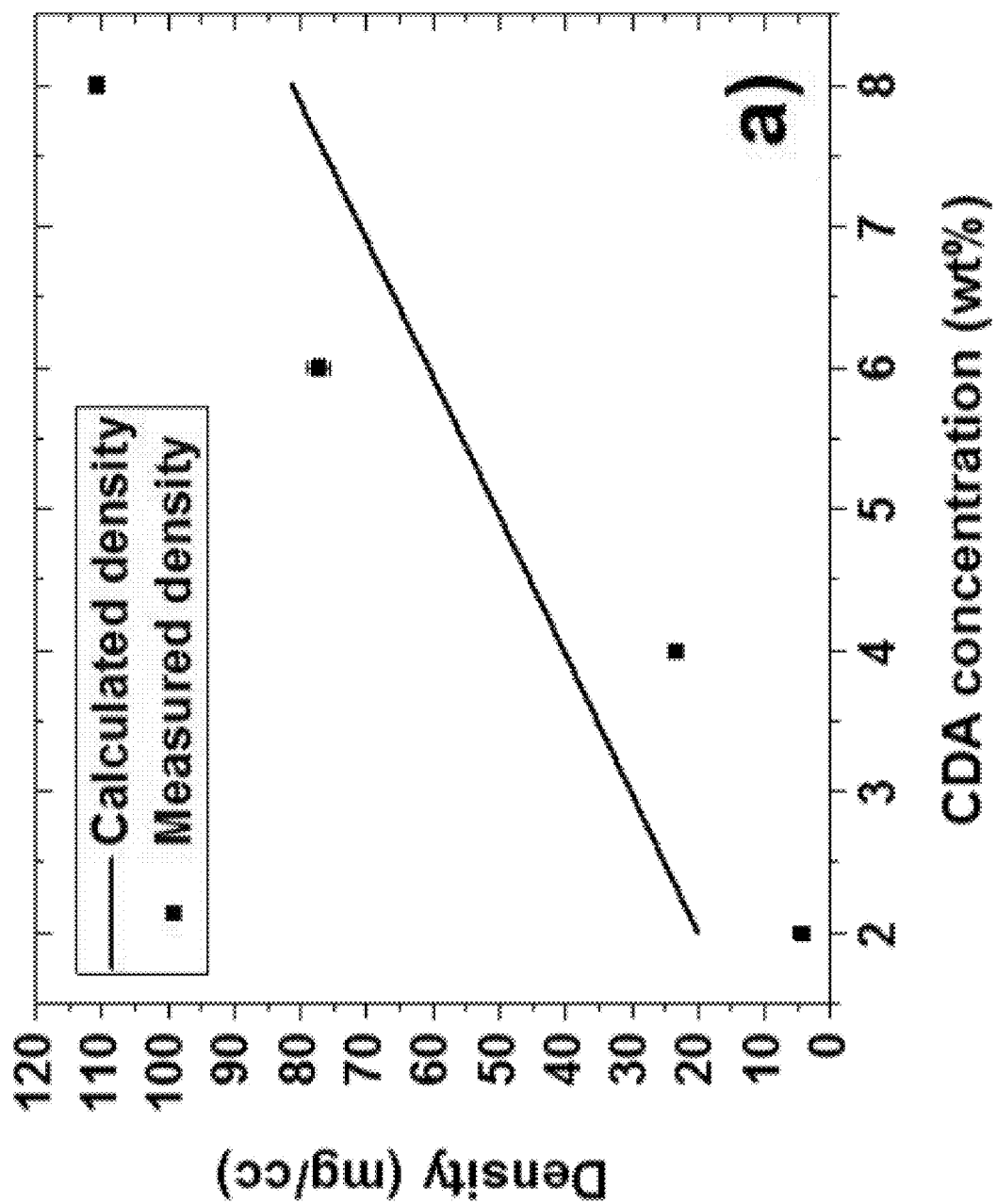
FIG. 5 is a graph of the measured and calculated density of four aerogels made from varying amounts of cellulose acetate, showing the calculated density (solid line) and the measured density (black squares).

The difference between the calculated density (solid line), as described above, and the measured density (black squares) of four aerogels is shown in FIG. 5, with each aerogel containing a different amount of cellulose acetate. The bulk density for the aerogels made with 2% and 4% CDA was measured as 4.3±0.7 mg/cc and 23.4±1.0 mg/cc, respectively, which is much lower than their calculated densities. The opposite behavior was observed for the aerogels made with 6% and 8% CDA. This is attributed to the combination of swelling/shrinkage of the gels during gradual solvent exchange with water along with shrinkage during freeze drying.

Figure 6:
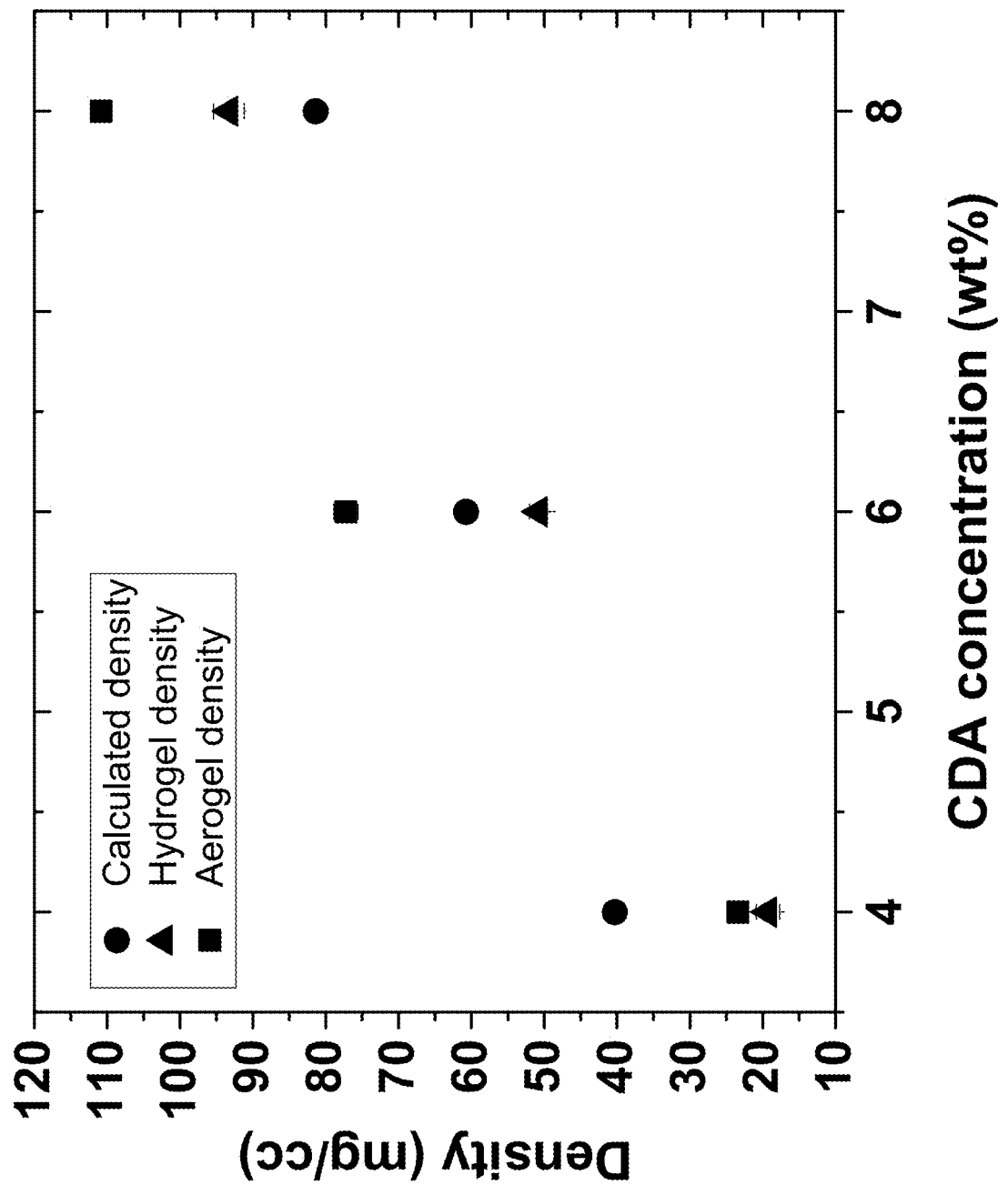
FIG. 6 is a graph of the density of three aerogels made from varying amounts of cellulose acetate, showing the calculated density (circles), the hydrogel density (triangles), and the aerogel density (squares).

FIG. 6 shows the density values for three samples, one with a CDA concentration of 4% by weight, one with a CDA concentration of 6% by weight, and one with a CDA concentration of 8% by weight.

The calculated and measured densities of the aerogels are shown in FIG. 6, for the two steps of aerogel synthesis: the gel and the hydrogel. The density for the hydrogel stage is termed its "hydrogel density." The hydrogel density was calculated by assuming that all the liquid was replaced with air without changing the volume of the gel. The graph in FIG. 6 demonstrates that in the 4% aerogel, there is not much shrinkage in the freeze drying step as compared to the 6% and 8% aerogels. Also, the 8% aerogel does not swell during solvent exchange, but rather seems to shrink, whereas the 4% and 6% aerogels swell during the solvent exchange step. This is likely due to strong intermolecular hydrogen bonding exhibited by the cellulose network which is expected to be stronger at higher concentrations of cellulose acetate, which makes it difficult for solvent to penetrate.

For each sample in FIG. 6, the calculated density of the gel is shown in black circles, the hydrogel density is shown in solid blue circles, and the aerogel density is shown in blue circles. The volume of hydrogel was measured via volume displacement using deionized water in a flat based beaker. The gel made with 2% CDA was too weak to be handled for the volume measurements. The data demonstrates the effect of solvent exchange and freeze drying on the final density of the aerogels.

The porosities of these aerogels were measured, and ranged from 99.7±0.10% to 91.5±0.1% as calculated from Equation 1, above, and shown in Table 1, below.

TABLE 1

Material Properties for the 4%, 6% and 8% CDA aerogels.

| | density (g/cc) | Compress. Modulus (kPa) | Specific Modulus (MPa/g/cc) | Yield strain (%) | Highest strain (%) | Maximum compressive stress (kPa) | Maximum stress at 60% strain (kPa) | Reference |
|---|---|---|---|---|---|---|---|---|
| 4% aerogel | 0.0234 | 38 | 1.6 | NA | 92 | 350[1] | 33.5 | |
| 6% aerogel | 0.0772 | 225 | 2.9 | 30 | 60 | 70 | 169 | |
| 8% aerogel | 0.1102 | 445 | 4.0 | 25 | 25 | 150 | NA | |
| CNF aerogel | 0.0081 | 54.5 | 6.7 | 19 | 80 | 2 | 15 | (Jiang & Hsieh, 2014) |
| CNC aerogel | 0.0217 | 40 | 1.8 | NA | 80 | 7[1] | 10 | (Yang & Cranston, 2014) |
| Graphene | 0.0058 | 2.3 | 0.4 | NA | 95 | 10[1] | 1.5 | (Xu et al., 2015) |
| Carbon nanofiber | 0.006 | 10 | 1.7 | NA | 90 | 64[1] | 6 | (Wu, Li, Liang, Chen, & Yu, 2013) |

[1]The material showed no yield stress. The elastic region was followed by the densification region. The values represent compressive stress, i.e. the stress at maximum strain.

It should be noted that the densities of the 2% and 4% CDA aerogels are low, particularly when starting with relatively high concentrations (2%, 4%) of cellulosic polymer solution.

Figure 7:
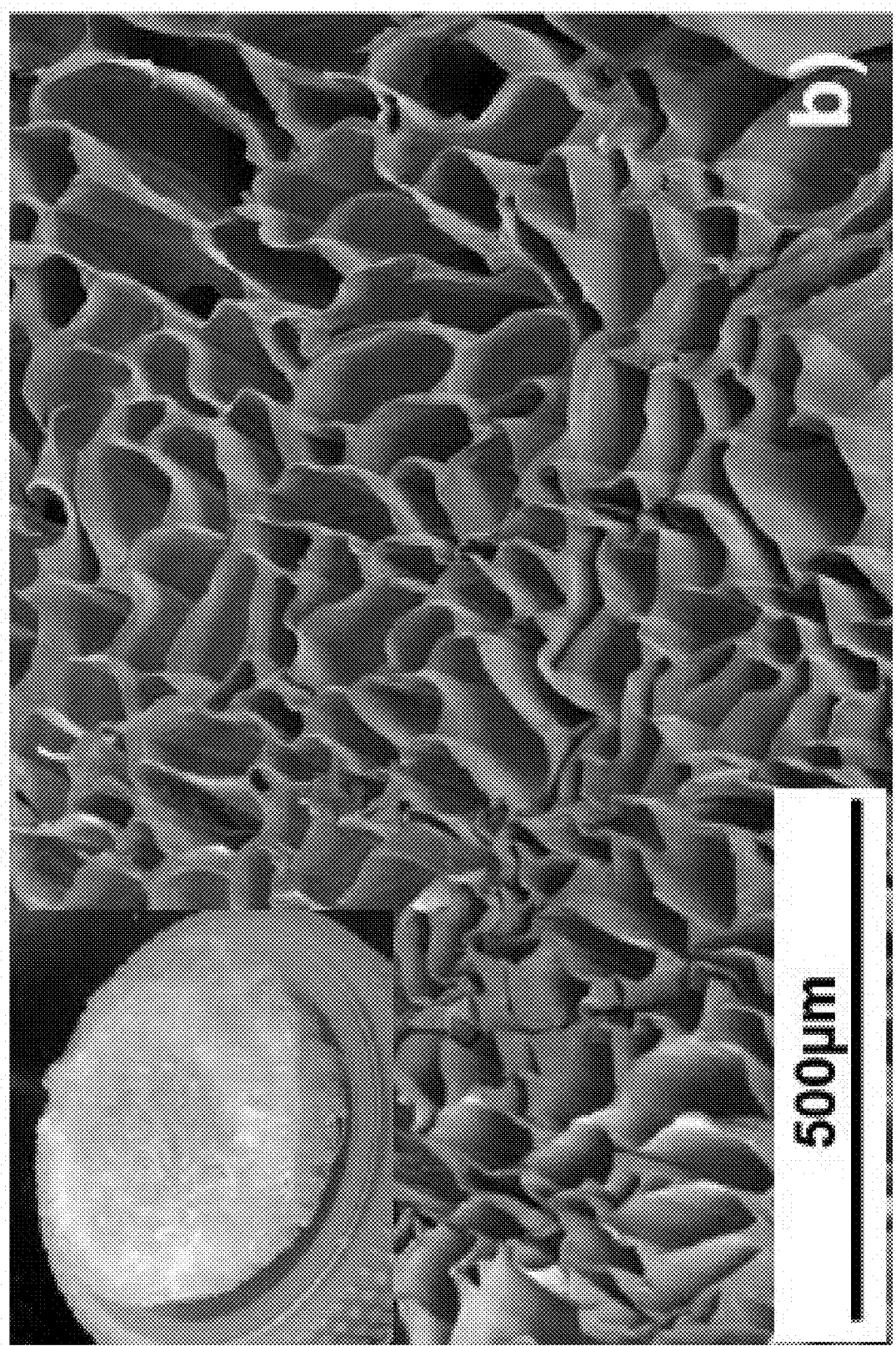
FIG. 7 is a scanning electron microscopy (SEM) image and a photo (inset) of an aerogel.

FIG. 7 shows a SEM image of the radial cross-section and a photo (inset) of an aerogel made with 4 wt % of CDA. The SEM image shows irregularly-shaped pores formed by the film-like walls of the assembled cellulose acetate. The image suggests that the pore size is determined by the rate of freezing. Without being bound by theory, it is believed that the water in the hydrogels starts to nucleate, forming ice crystals and squeezing out the cross-linked cellulose diacetate polymer and compressing them into thin walls. The crystals then sublimate during the drying process, leaving behind cylindrical pores with an average diameter of about 50 m.

The cellulose acetate aerogels exhibit a BET area of 3.4 $m^2/g$, as measured by N2 adsorption/desorption analysis (described above), which is low when compared to the BET surface area of aerogels obtained from other cellulosic materials. This is attributed to the large pore size of the aerogels and a lack of micro porosity. Assuming that the cellulose acetate aerogel is composed of cylindrical pores with an average diameter of about 50 μm running throughout the aerogel along the radial axis, the calculated surface area is 3.4 $m^2/g$ (calculated as described previously). This suggests the lack of micro porosity in the aerogel.

Figure 8:
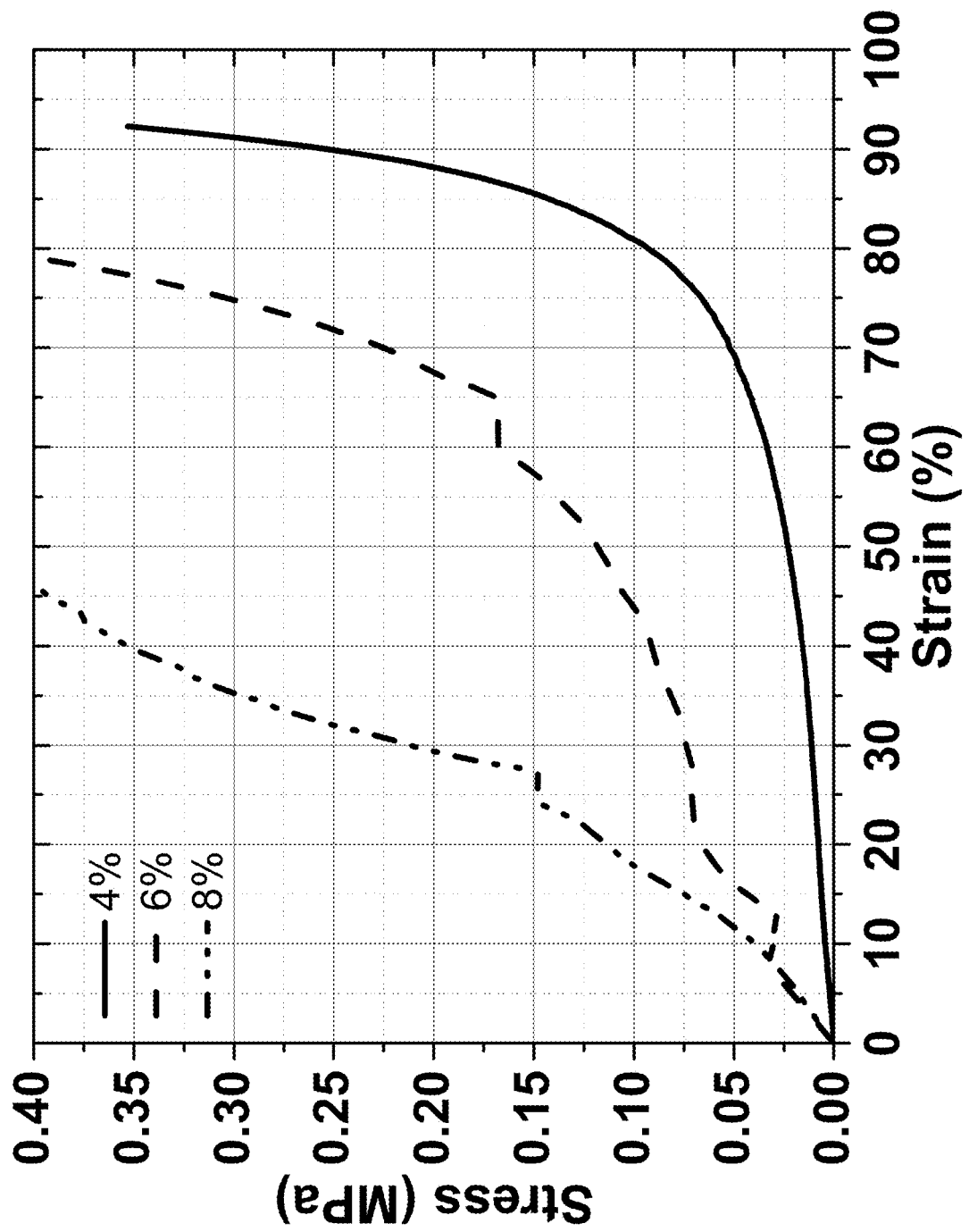
FIG. 8 is a graph of stress and strain for three aerogels made from varying amounts of cellulose acetate, for an aerogel made with 4% CDA (solid line), 6% CDA (dashed line), and 8% CDA (dashed-dotted line).

The porous morphology, including the self-assembled walls, of the cross-linked cellulose acetate results in highly compressible aerogels, as demonstrated in the compressive stress-strain curves shown in FIG. 8, with the aerogel made using 4% by weight of CDA in the solid trace, the 6% aerogel in the dashed trace, and the 8% aerogel in the dashed-dotted trace.

It is noted that the synthesis of the 2% aerogel in a mold with the desired size was difficult due to breakage of the gel during the solvent exchange process. Hence, compression testing of the 2% aerogel was not performed. The 4% aerogel exhibited a high compression strain of 92% without crumbling or showing any cracks, in contrast to the behavior seen with brittle silica aerogels. The high compression strains are generally comparable to carbon nanofiber aerogels and higher than those of nanocellulose aerogels.

As is shown in FIG. 8, the 4% aerogel does not show any yield strain, unlike the 6% and 8% aerogel which yield below 30% strain. This suggests that a high concentration of cellulose acetate (greater than 4%) renders more stiffness to an aerogel and provides ductile behavior, i.e. the ability to compress decreased with increasing concentrations of cellulose acetate. However, even a 4% cellulose acetate concentration is considered high for aerogels, and cross-linking a gel with this relatively high polymer concentration gives an aerogel with a maximum compressive strain of 350 kPa, which is approximately 100 times higher than the values for known aerogels, and which allows for a higher loading capacity. Due to the relatively high concentration of polymer in the 6% and 8% cellulose acetate gels, the final aerogel product for these gels have artifacts after solvent exchange and freezing, hence their compression stress-strain curves were not perfectly reproducible. It was found that all the curves for the 6% and 8% aerogel yielded below 30% strain.

Figure 9:
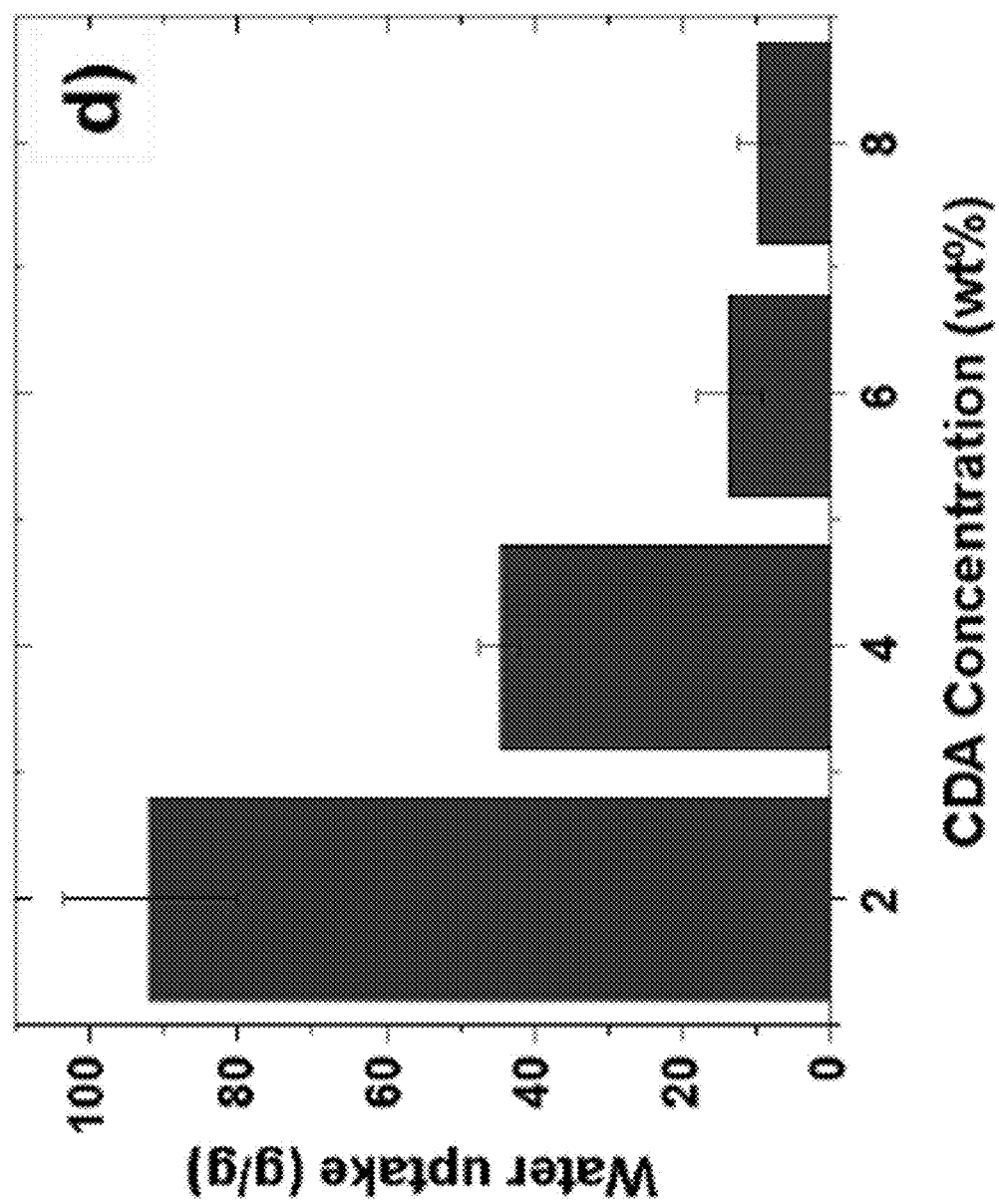
FIG. 9 is a graph of the water uptake in gram/gram of gel, for four aerogels made from varying amounts of cellulose acetate.

Due to their high porosity and closed celled morphology, these aerogels were tested for water sorption, as shown in FIG. 9. The 2% aerogels showed the highest sorption, of 91 grams of water per gram of aerogel, as calculated from equation 2. However, during evaporation of the water, the 2% aerogel collapsed under the capillary forces of water. The 4%, 6% and 8% CDA aerogels were strong enough to sustain the capillary forces.

Figure 10:
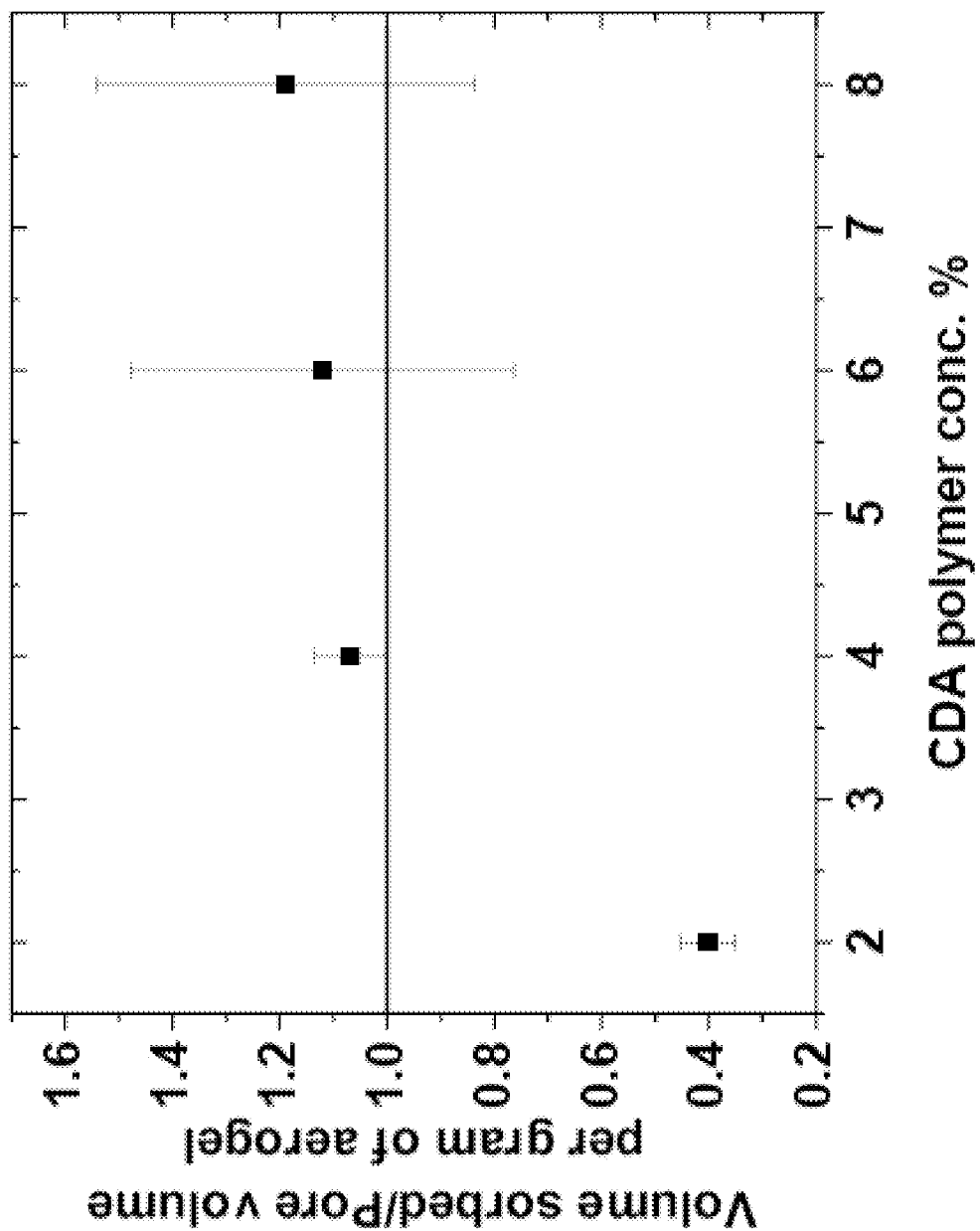
FIG. 10 is a graph showing the volume sorbed/pore volume per gram of aerogel, for four aerogels made from varying amounts of cellulose acetate.

FIG. 10 shows a graph of the uptake of water relative to the pore volume available. The marginally higher liquid uptake compared to the available pore volume in the 4%, 6%, and 8% aerogels suggests that the combination of absorption in the pores and adsorption by the polymer chains may be occurring, which could be due to hydrogen bonding. However, the 2% aerogel showed a very low uptake compared to the available pore volume. This may be due to the 2% aerogels being unable to retain relatively high amounts of water.

Sorption Studies & Surface Energy Analysis. The mass of the liquid sorbed is related to the interfacial surface tension of the corresponding liquid with the surface. According to the Zisman theory, a critical surface tension $\gamma_c$ is attributed to the modified aerogel. If the surface tension of the liquid is such that $\gamma_{liq} > \gamma_c$, partial wetting of the aerogel is observed. If the surface tension of the liquid is such that $\gamma_{liq} < \gamma_c$, the liquid shows complete wetting. Since the aerogel surface is not perfectly flat, the contact angle measurements are not a perfectly accurate representation of the surface tension. Thus, contact angle measurements of an aerogel surface were generally avoided as a means to test the Zisman theory. Instead, wicking tests were performed on the modified cellulose acetate aerogels using solvents of different surface tension. Surface tension data for a variety of solvents is shown below in Table 2.

TABLE 2

The surface tension, viscosity and density of various solvents.

| Solvent | surface tension @ 20 deg. C. (mN/m) | Viscosity mPa-s | density g/cc |
| --- | --- | --- | --- |
| Diethyl ether | 16.7 | 0.22 | 0.708 |
| n-hexane | 18.4 | 0.3 | 0.655 |
| 1-propanol | 20.9 | 1.95 | 0.802 |
| Ethanol | 22.1 | 1.07 | 0.787 |
| Cyclohexane | 24.7 | 0.89 | 0.773 |
| Octanoic acid | 27.9 | 5.02 | 0.903 |
| Toluene | 27.9 | 0.56 | 0.865 |
| 1.2-dichlorobenzene | 35.7 | 1.32 | 1.301 |
| Methyl Iodide | 50.8 | 2.6 | 3.306 |
| water | 72.8 | 0.89 | 1 |

Figure 22:
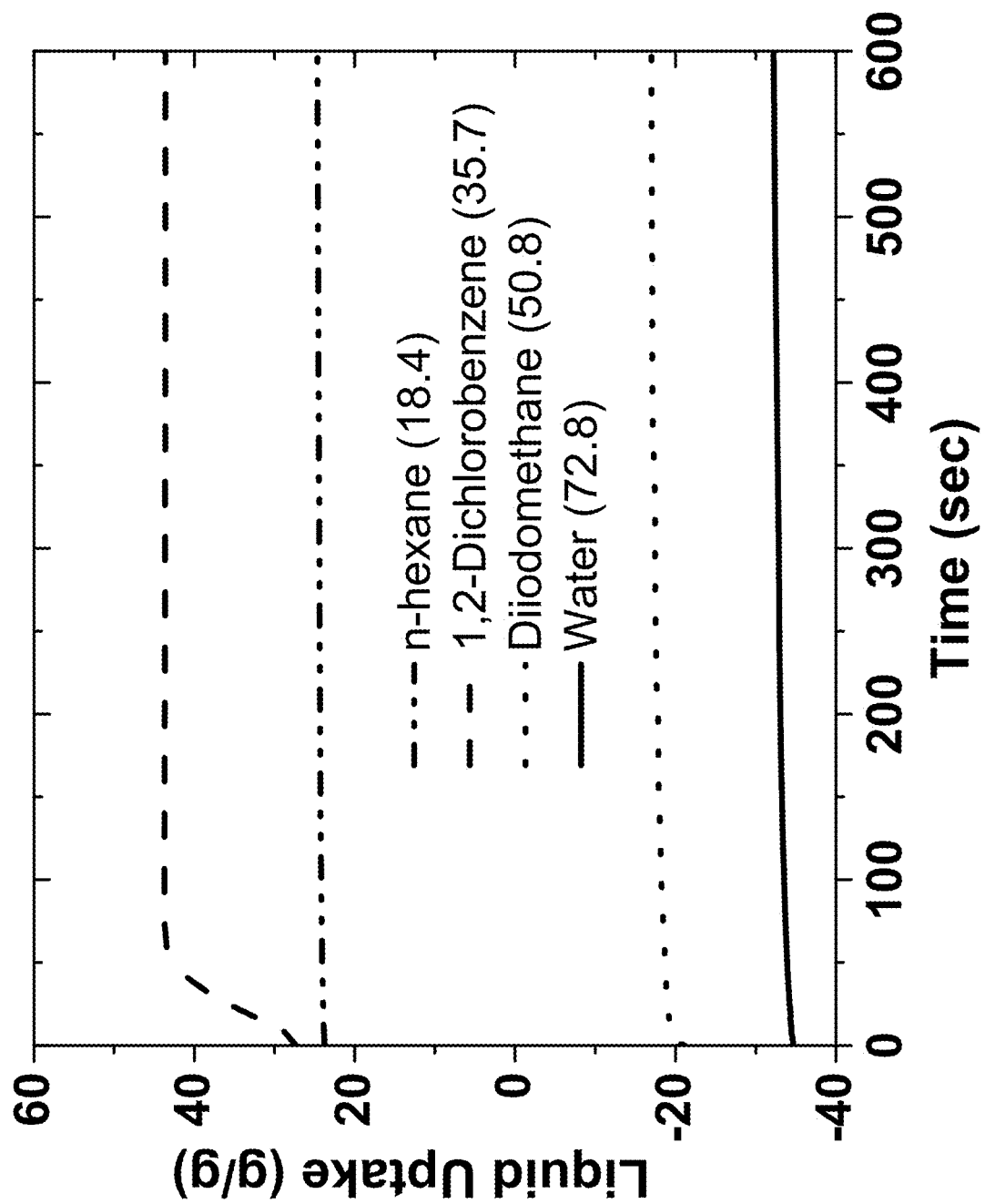
FIG. 22 is a graph of the liquid uptake in grams per gram of a modified aerogel, over time, for four solvents: n-hexane (dashed-dotted line), 1,2-dichlorobenzene (dashed line), diiodomethane (dotted line), and water (solid line).

A plot of the amount of liquid sorbed over time for a TCOS-modified 4% CDA aerogel for four solvents is shown in FIG. 22 (methods for making a TCOS-modified aerogel are described in Example 2). As seen in FIG. 22, the modified aerogel exhibits a nearly instantaneous sorption of the low surface energy liquid n-hexane, and shows negative values for the liquid uptake of water and diiodomethane.

Figure 3:
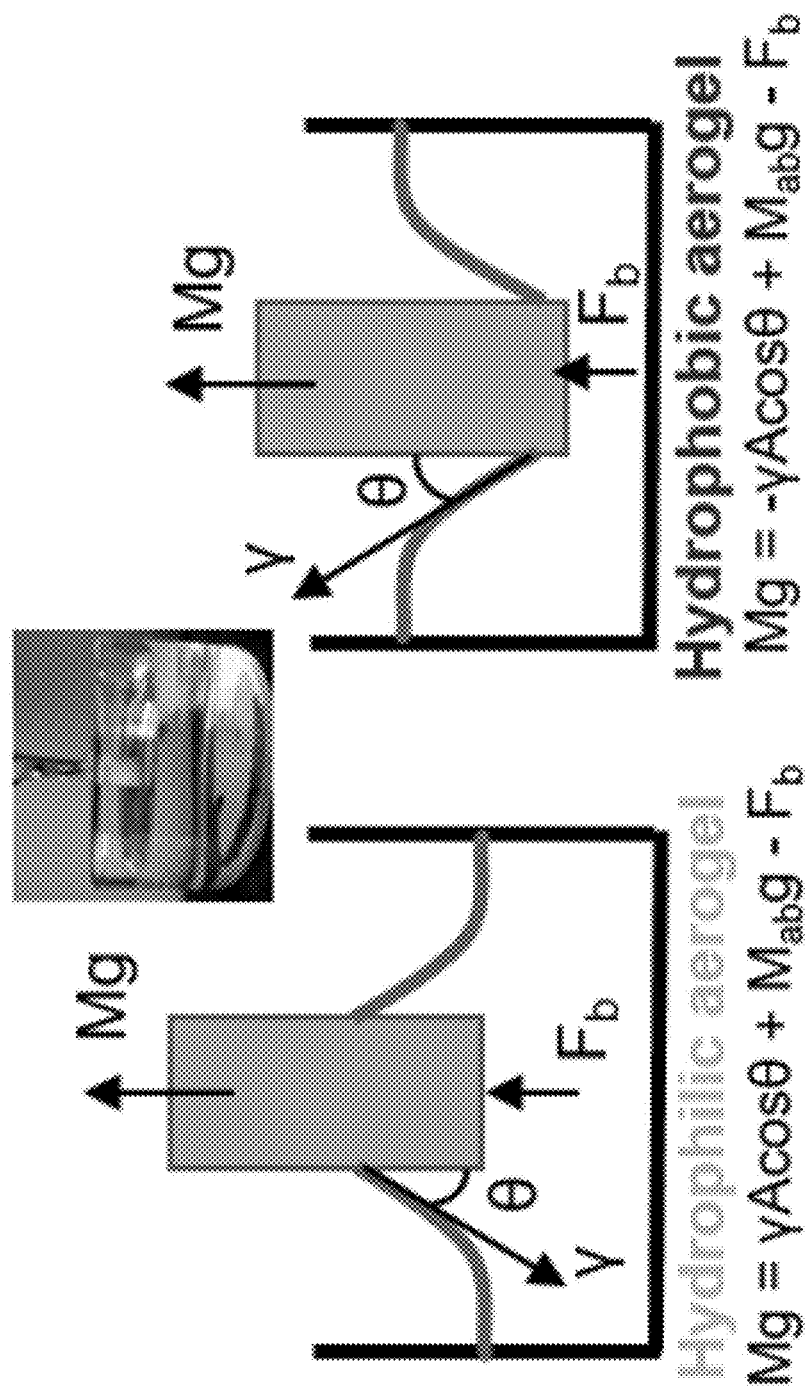
FIG. 3 is a schematic drawing of, and a photograph showing the experimental setup for, the tensiometry analyses used to characterize aerogels.

A negative value of liquid uptake is explained as follows, with reference to the graphical representation of the wicking setup that is shown in FIG. 3. As the aerogel sample is lowered towards the surface of the liquid, the instrument records the mass gain (Mg) as a function of distance and time. Once a certain fraction of the aerogel sample is immersed into the solvent, there is a buoyant force exerted in the upward direction which is not negligible with respect to the aerogel. In the situation where the aerogel is hydrophobic, the buoyant force and surface tension both act in an upward direction while there is very little solvent sorption, and $M_{ab}g$ (for water and diiodomethane) acts downwards. So, the tensiometer records a negative weight gain, which indicates resistance to the penetration of the liquid into the pores of the aerogel which in turn demonstrates that the surface tension of the liquid is greater than the critical surface tension of the aerogel surface ($\gamma_c$).

A indicated by FIG. 22, the $\gamma_c < \gamma_{diiodomethane}$, and the instantaneous sorption of n-hexane indicates that $\gamma_{hexane} < \gamma_c$. However, 1,2-dichlorobenzene (with a surface tension of 35.7 mN/m), shows a sorption gradient which implies that initially the aerogel surface resists penetration of 1,2-dichlorobenzene, but as soon as the liquid penetrates the aerogel surface, the aerogel is saturated within a minute due to capillary action. This means that $\gamma_{1,2\text{-}dichlorobenzene} < \gamma_c$. From this analysis, it can be concluded that the surface tension ($\gamma_c$) of the modified aerogel lies between about 35.7 mN/m and about 50.8 mN/m.

Once the liquid is sorbed, its mass will depend on the capillary force due to the microporous structure of the aerogel, and the mass of liquid sorbed (M) can be related as $$Mg = 2\pi r \gamma \cos\theta, \quad \text{(Equation 3)}$$

where 'r' is the radius of the pore, '$\gamma$' is the surface tension of the liquid, and '$\theta$' is the contact angle made by the liquid with the pore wall of the aerogel.

Figure 23:
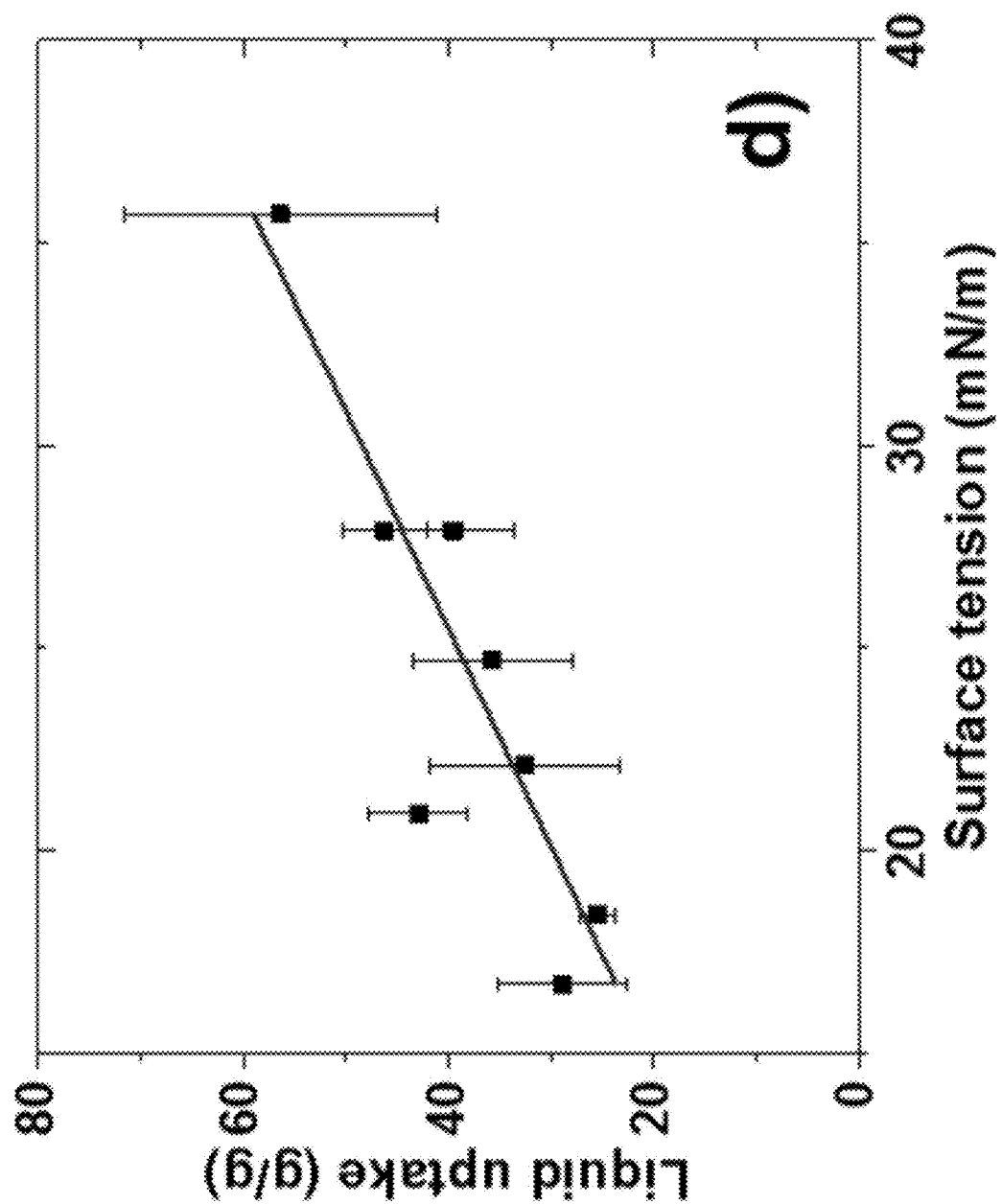
FIG. 23 is a graph of the liquid uptake in grams per gram of a modified aerogel, for solvents with varying surface tension.
Figure 24:
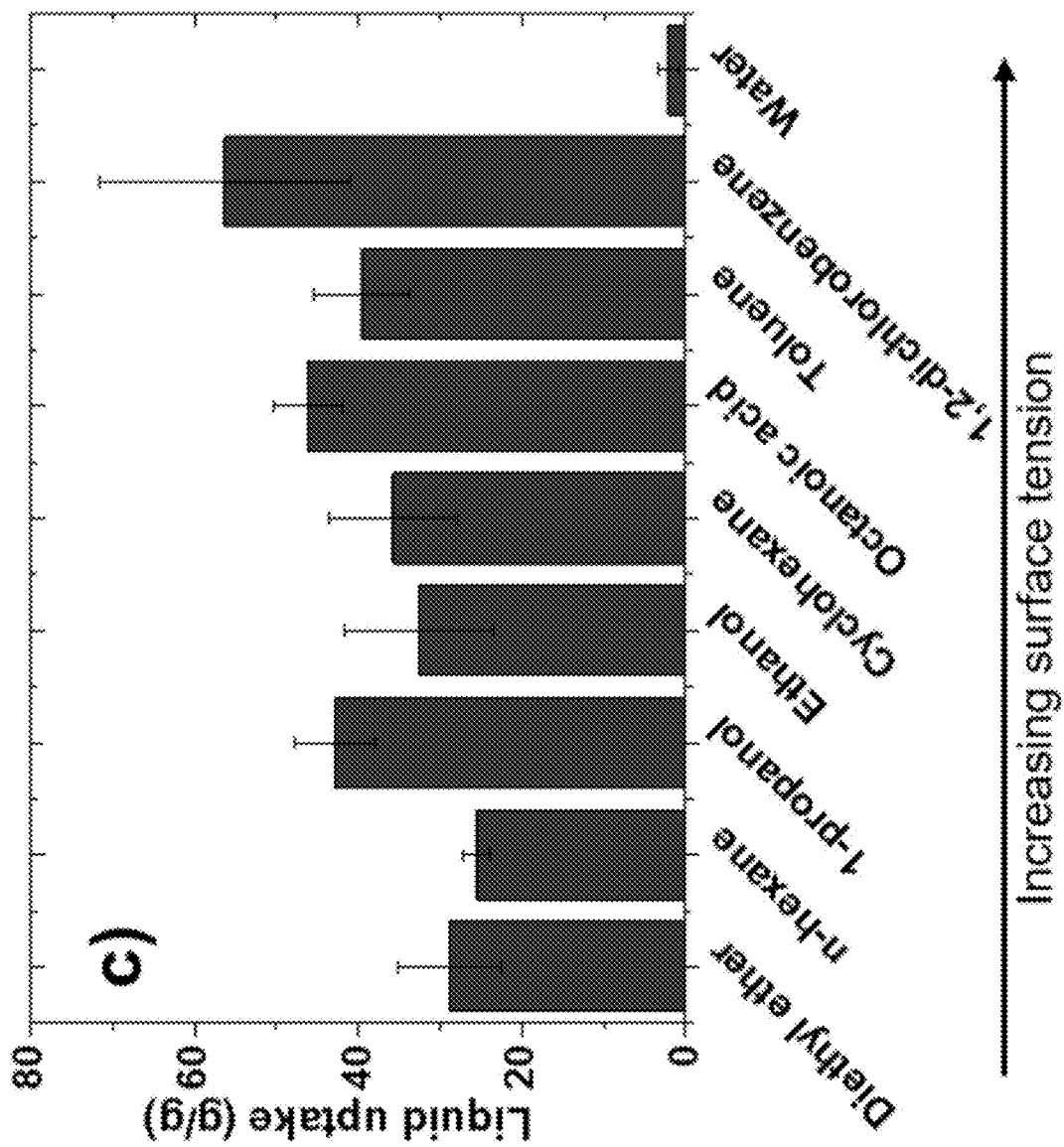
FIG. 24 shows the experimental values for sorption of the solvents of FIG. 23 by a modified aerogel.

In the case of low surface energy liquids that completely wet the surface, a contact angle of zero is assumed. Since r is constant, the mass of the liquid sorbed is directly proportional to the surface energy of the liquid: this is shown in FIG. 23, which demonstrates the linear relationship of the mass of liquid sorbed to the surface tension of the liquid. The mass of low surface energy n-hexane (18.4 mN/m) sorbed is lower than that of 1,2-dichlorobenzene (35.7 mN/m). The amount of liquid sorbed by the TCOS-modified 4% CDA aerogels for a variety of solvents is shown in FIG. 24, with the solvents listed in increasing surface tension values on the x axis, in units of mN/m.

Figure 25:
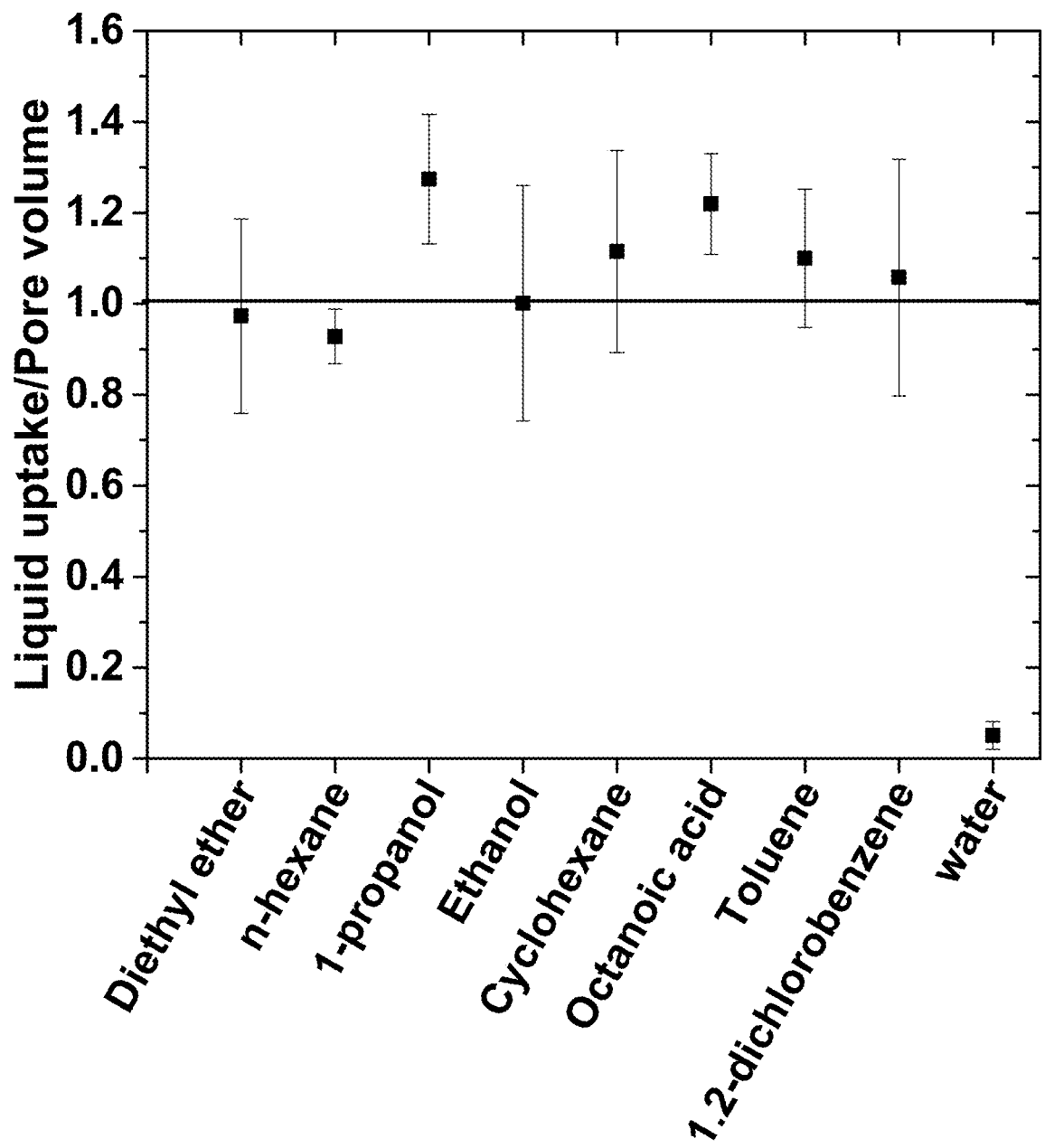
FIG. 25 is a graph showing the volume of liquid sorbed/pore volume for a modified aerogel, for nine different liquids.

The volume of liquid sorbed by the aerogels, however, does not change. FIG. 25 shows the volume of liquid sorbed relative to the available pore volume with TCOS-modified 4% CDA aerogels. The data shows a ratio which is greater than 1 for most of the solvents measured, which suggests that they are chemically interacting with the cellulose ester polymer. However, completely non-polar n-hexane has a ratio of less than 1, which may suggest that it is not interacting with the polymer at all.

Calculation of Surface Energy using the Fowkes Model. The interfacial surface energy of a modified aerogel is governed by surface groups, surface roughness and tortuosity. Since the measured contact angle of liquid on the modified aerogels using a camera image is not a correct representation of the aerogel's actual surface properties due to the difficulty in obtaining a perfectly even surface for the inventive aerogels, the change in surface energy of an aerogel due to surface modification was analyzed. For this analysis, a Fowkes model was used to identify the dispersive and polar components of the surface energy of a TCOS modified cellulose ester film, which was obtained by spin coating cellulose acetate on a silicon wafer as explained above. The spin-coated cellulose acetate was subjected to chemical vapor deposition of TCOS using the same procedure as described for the aerogels. Water and diiodomethane were the two probe liquids used.

Table 3 shows the average contact angle measured for the probe liquids, along with the corresponding surface energy values. Diiodomethane has no polar component for its surface tension, and the dispersive part of the surface energy can be obtained using the contact angle value of diiodomethane.

TABLE 3

Contact angles and surface energy values for the two probe liquids.

| | Contact angle θ (degree) | | Polar $\gamma^p$ | Dispersive | Total $\gamma^t$ |
|---|---|---|---|---|---|
| Probe liquid | Untreated CDA | TCOS modified | (mN/m) | $\gamma^d$ (mN/m) | (mN/m) |
| Water | 45 | 80 | 51 | 21.8 | 72.8 |
| Diiodomethane | 26 | 38 | 0 | 50.8 | 50.8 |

Using the Fowkes model, the surface energy of the untreated cellulose acetate surfaces and the TCOS modified cellulose acetate surfaces were calculated to be 64.1 mN/m and 43.9 mN/m, respectively, as shown in Table 4, below.

The dispersive component of the surface energy is responsible for the ability of the surface to take part in induced dipole interactions, whereas the polar component of the surface energy represents dipole interactions, hydrogen bonding and ionic interactions. Here, the dispersive part of the surface energy is dominating: it is 71.4% in the untreated cellulose acetate surfaces and 92.5% in the TCOS-modified cellulose acetate surfaces. This is likely because cellulose acetate is primarily composed of a non-polar carbon backbone, which is responsible for induced dipole interactions (i.e. London forces). The polar component of the surface energy for cellulose acetate is mainly due to the surface hydroxyl groups that are present. Upon modification of the cellulose acetate, the polar component drops from 18.3 mN/m to 3.3 mN/m. Also, as predicted from the Zisman theory, the surface energy of the modified surface lies between about 35.7 mN/m and about 50.8 mN/m. However, the apparent surface energy of the aerogels is likely lower than the calculated surface energy for the thin films, due to the effect of surface roughness of the aerogels

TABLE 4

Surface Energy values as Calculated with the Fowkes Model.

| | Polar $\gamma^p$ (mN/m) | Dispersive $\gamma^d$ (mN/m) | Total $\gamma^t$ (mN/m) |
|---|---|---|---|
| Untreated CDA | 18.3 | 45.8 | 64.1 |
| TCOS modified CDA | 3.3 | 40.6 | 43.9 |

Example 2: Use of Aerogels for Adsorbing Non-Polar Materials

Methods

Figure 2:
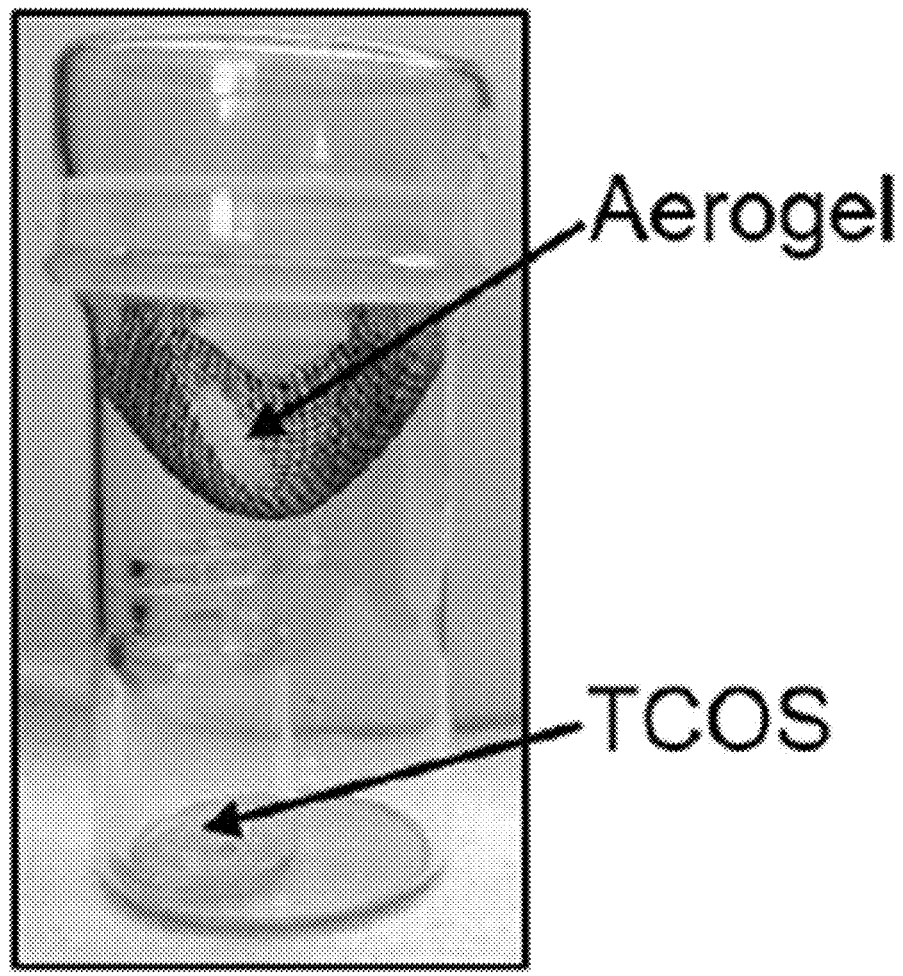
FIG. 2 is a photograph of the synthesis of a modified aerogel containing 4 wt % CDA, using a bottle in a bottle technique.

Aerogel Modification. Chemical vapor deposition (CVD) was used to modify the cellulose acetate aerogels into hydrophobic and/or oleophilic aerogels. A bottle in a bottle set up was used for the purpose, as shown in FIG. 2, where trichloro(octyl)silane (TCOS) was kept in the smaller bottle and a sample of aerogel was suspended in the wire mesh hanging in the top portion of the bigger bottle, allowing the aerogel to be placed over the smaller bottle. The aerogel shown in FIG. 2 contains 4 wt % CDA. The amount of TCOS used was 2 times the weight of the aerogel. Generally, a 50-60 mg sample of aerogel was treated at a time, using 100-120 uL of TCOS. The system was kept in an 80° C. oven for 2 hours.

X-ray Photospectroscopy (XPS). XPS analysis was done using a SPECS FlexMod system with the PHOIBOS 150 hemispherical analyzer. The base pressure in the analysis chamber was in the $10^{-10}$ mbar range. The samples were excited via Al kα excitation (1486.7 eV) with the electron beam incident at about 30° from the surface normal. Energy calibration was established by referencing to adventitious carbon ($C_1$s line at a 285.0 eV binding energy). Survey scans were taken with 0.5 eV steps, a 0.04 sec dwell per point and an Epass setting of 24, and high resolution scans were taken with 0.1 eV steps, a 0.5 sec dwell per point and an Epass setting of 20.

Contact Angle Measurements. A SEO Phoenix goniometer was used for the contact angle measurements. The contact angle data reported for each aerogel is for a qualitative representation of the modification of aerogels after treatment with a hydrophobic agent, as shown in the illustrations of FIG. 3. Each value of the contact angle for the flat surface (average of 5 measurements) was recorded after drop deposition for 30 seconds. The Fowkes model was used to calculate the polar and dispersive part of the solid surface energy using this contact angle data.

Wicking Measurements. A CAHN Dynamic contact angle analyzer (DCA-312) was used for the wicking measurements. Each aerogel was cut into a cuboid shape and lowered into the liquid, as shown in FIG. 3.

FIG. 3 shows an illustration of the expected wicking and contact angles for a hydrophilic aerogel (left) and a hydrophobic aerogel (right), and the inset photo shows the experimental setup for the tensiometry analysis. Extreme care was taken to cut the aerogels in one direction to ensure that pore alignment was the same in all the measured samples. The aerogels were immersed 1.5 mm below the surface of the liquid to ensure complete immersion of the aerogel into the solvent during the course of the analysis.

Reusability test. N-Hexane was determined to be representative of low surface energy oil, and was used to test the reusability of modified aerogels. The saturated aerogels were mechanically compressed between two lab-grade disposable tissues to remove the solvent and weighed again to ensure that at least 70% of the solvent was squeezed out. The aerogels were compressed mechanically between two glass slides, parallel to the major axis. The process of sorption and compression was repeated until the modified aerogel lost its mechanical integrity, which was defined as when the aerogel was unable to recoil after compression, as observed by the unaided eye. The average data with standard deviation is reported after repeating the test on three separate samples.

Results

The mechanical properties and high sorption values of the aerogels suggested their use for absorbing a non-polar material, such as for an oil spill cleanup. To separate oil from water, the cellulose acetate aerogels were rendered hydrophobic by a chemical vapor deposition (CVD) process with a chlorosilane. The presence of the free hydroxyl groups and the carbon backbone renders the cellulose acetate aerogels generally amphiphilic. To increase the hydrophobicity and oleophilicity of the aerogels, CVD with trichloro(octyl) silane (TCOS) was used to cap the free hydroxyl functionalities with hydrophobic chains, as was confirmed by contact angle measurements. The 4% CDA aerogel was selected to test for separating oil from water, due to its ease of handling during synthesis as compared to the 2% aerogel, and its favorable mechanical properties with a relatively high sorption as compared to the 6% and 8% aerogels.

Figure 11:
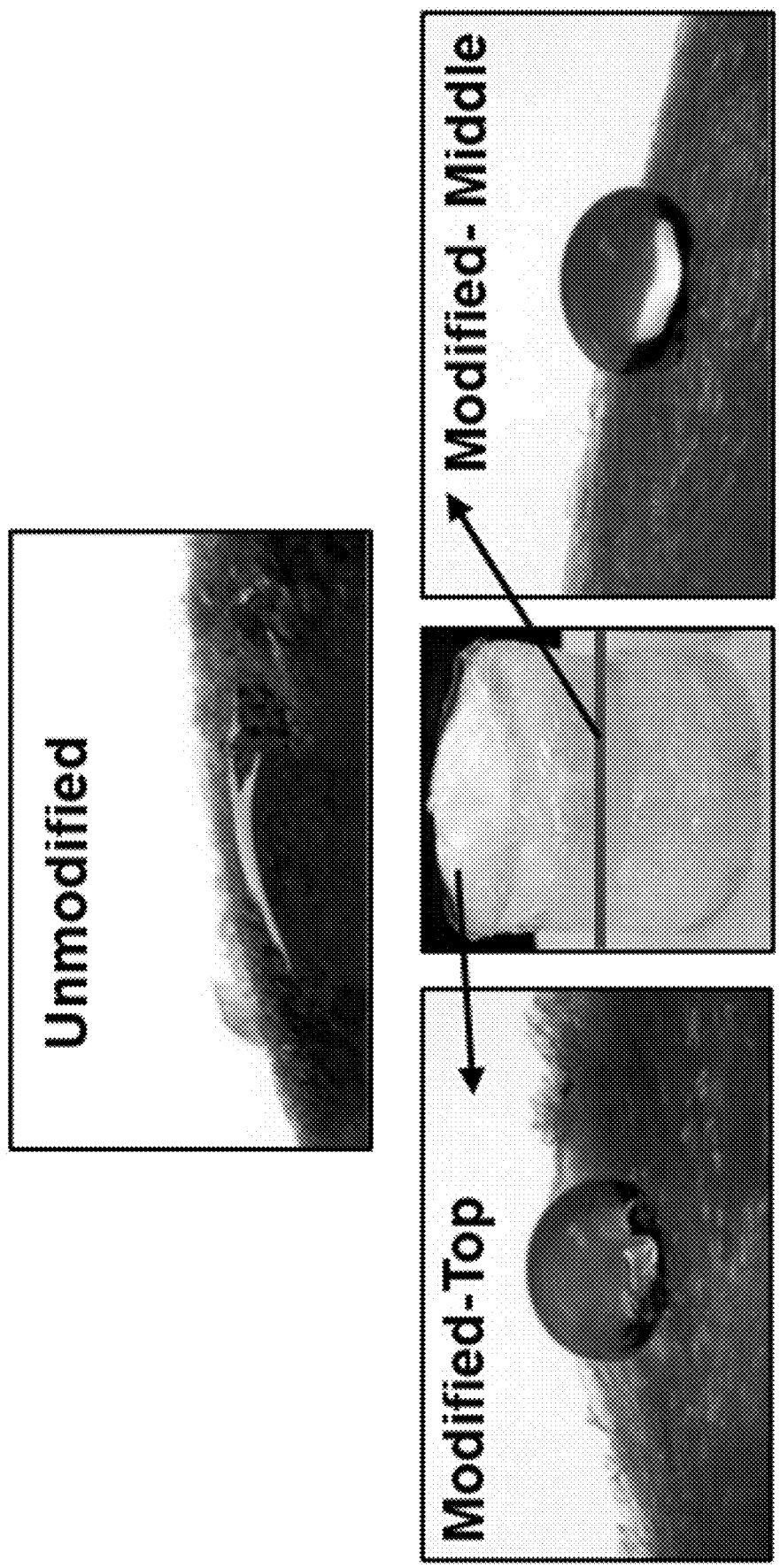
FIG. 11 shows photographs of a water droplet on an unmodified aerogel (upper photo), and water droplets on two modified aerogels (lower photographs).

As shown in the upper photo of FIG. 11, a water droplet completely wicked through the surface of the unmodified 4% CDA aerogel. In the lower photos of FIG. 11, it is seen that a modified aerogel showed a high water contact angle, on both the surface of the aerogel (left photo) and from an internal cross-section of the aerogel (right photo). Also, the fact that the radial cross-section of the interior of the modified aerogel exhibited a high water contact angle (right photo) indicates that the TCOS is diffusing below the surface of the aerogel, rendering the bulk aerogel hydrophobic. In general, all observed contact angles for the modified aerogels were greater than 120 degrees, although it was determined that the reliability of contact angle measurements was low due to the uneven gel surfaces present.

Figure 12:
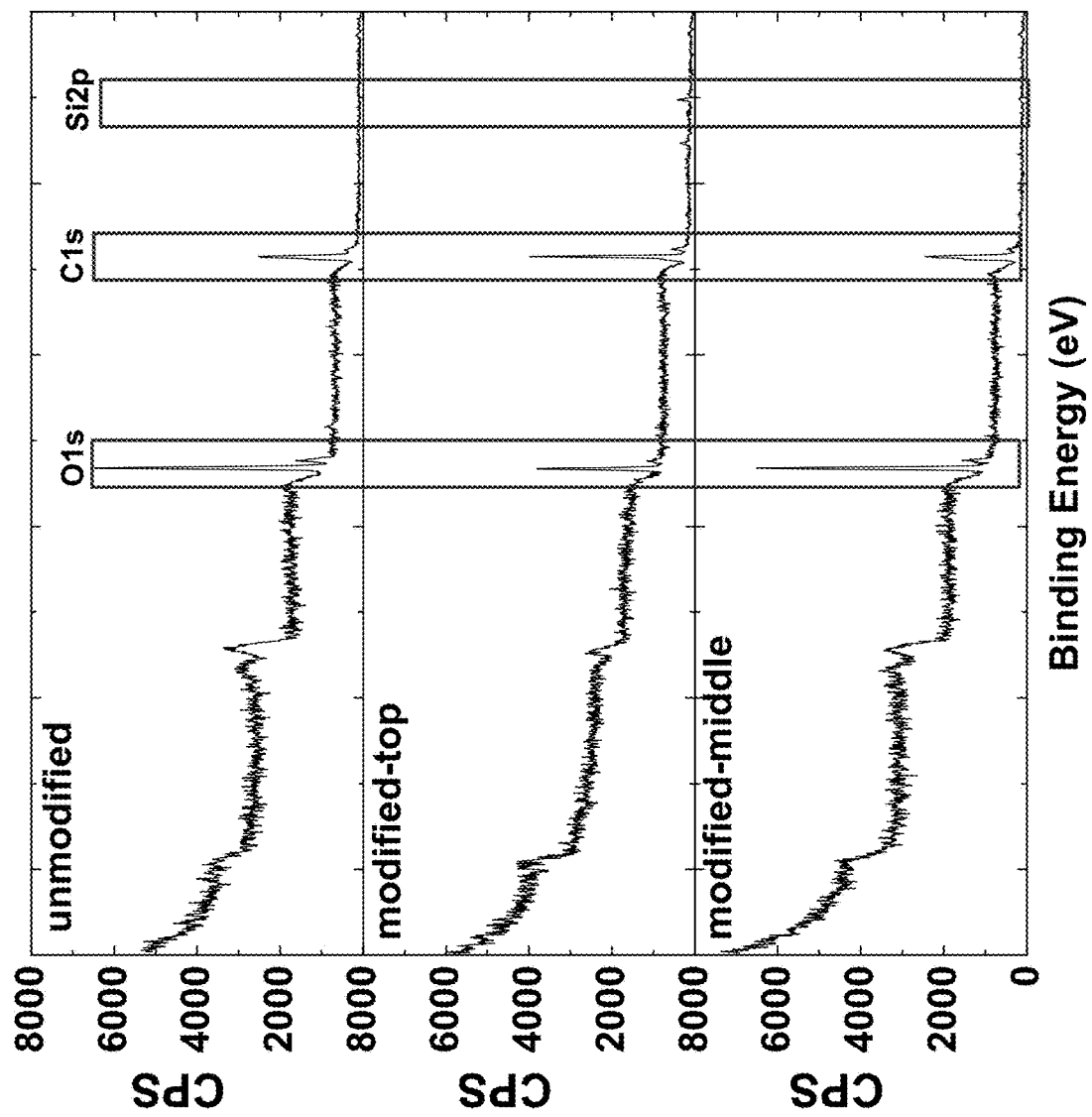
FIG. 12 shows XPS survey scans for an aerogel (upper scan), the top surface of a modified aerogel (middle scan), and a cross-sectional inner surface of a modified aerogel (lower scan). The oxygen (O), carbon (C) and silicon (Si) energies are labeled.

An XPS survey scan of the surface and a radial cross-section of a 4% CDA modified aerogel is shown in FIG. 12, with the scan of the untreated (unmodified) aerogel shown in the upper trace, the top surface of the sample of the modified aerogel shown in the middle trace, and a sample from a cross-section (middle) of the sample shown in the lowest trace. This data confirms that the TCOS has diffused into the bulk of the aerogel during the modification process. Based on the XPS data, the calculated Si/O % at the top of the modified sample is about 19% (18.9%), and is about 2% (1.8%) in the middle of the sample. It is likely that the diffusion of TCOS inside the bulk of the aerogel can be further increased by lengthening the time that the CVD step is performed.

Figures 13A, 13B:
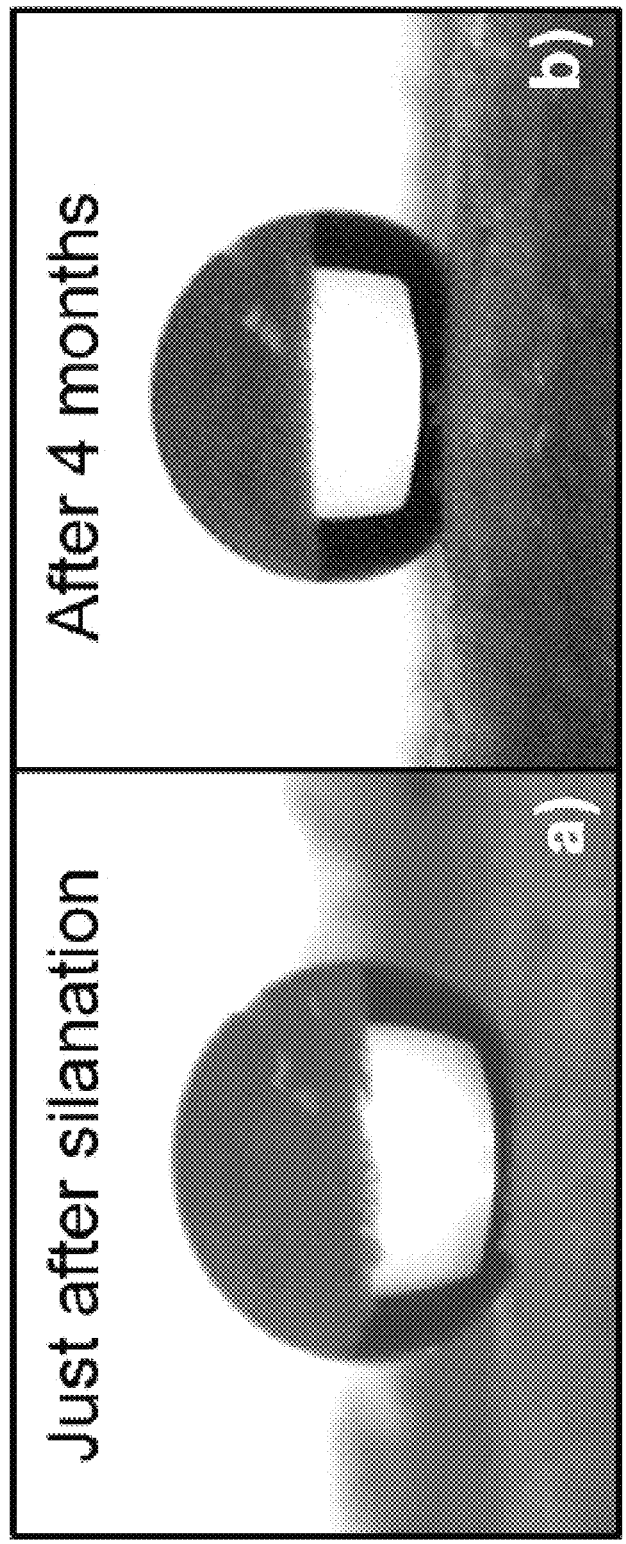
FIGS. 13(*a*)-13(*b*) are photographs of the side view of a water droplet on a modified aerogel immediately after silanation (FIG. 13(*a*)), and four months after silanation (FIG. 13(*b*)).

The modified aerogels were found to retain their hydrophobicity for at least about 4 months, as is shown in FIGS. 13(a) and 13(b). The aerogels were modified by exposing them to TCOS for 2 hours by CVD. The photograph on the left (FIG. 13(a)), shows a water droplet with a high contact angle on the aerogel immediately after modification of a 4% CDA aerogel with TCOS, and the photograph on the right (FIG. 13(b)) shows a water droplet on the same aerogel sample after 4 months of storage at ambient temperature. The low water uptake shown by the modified aerogel, even after keeping the sample in ambient conditions for 4 months, as indicated by the high contact angle, reflects the stability and durability of modified aerogels over a long period of time.

Figure 14:
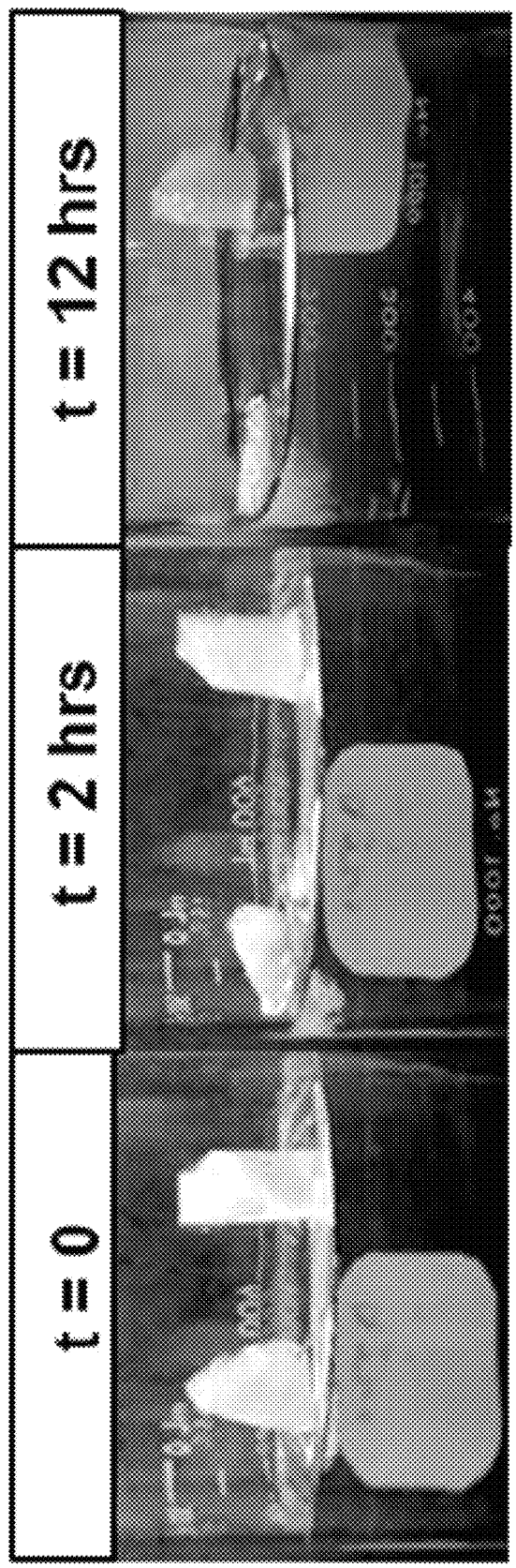
FIG. 14 is a series of photographs showing the water absorbance of an unmodified aerogel in a beaker (left sample in each beaker) and a modified aerogel (right sample), at time=0 (left photo), time=2 hours (middle photo), and time=12 hours (right photo).

Samples of an unmodified and a modified aerogel containing 4% CDA were subjected to a water sorption test for 48 hours (as described above in Example 1), with their behavior monitored after placing the samples on the surface of water in a beaker. FIG. 14 shows a series of photographs of the water sorbance of a 4% CDA unmodified aerogel (left sample in each beaker) and a 4% CDA aerogel modified with TCOS (right sample) in a beaker of water, immediately after placing the samples into the water (left photo; t=0), two hours after placing the samples in the water (middle photo; t=2 hrs), and twelve hours after placing the samples in the water (right photo; t=12 hrs).

Looking at the photographs in FIG. 14, it is clear that the sample of unmodified aerogel began sinking below the surface of the water within 2 hours, but that the sample of modified aerogel remained floating even after 12 hours.

Figure 15:
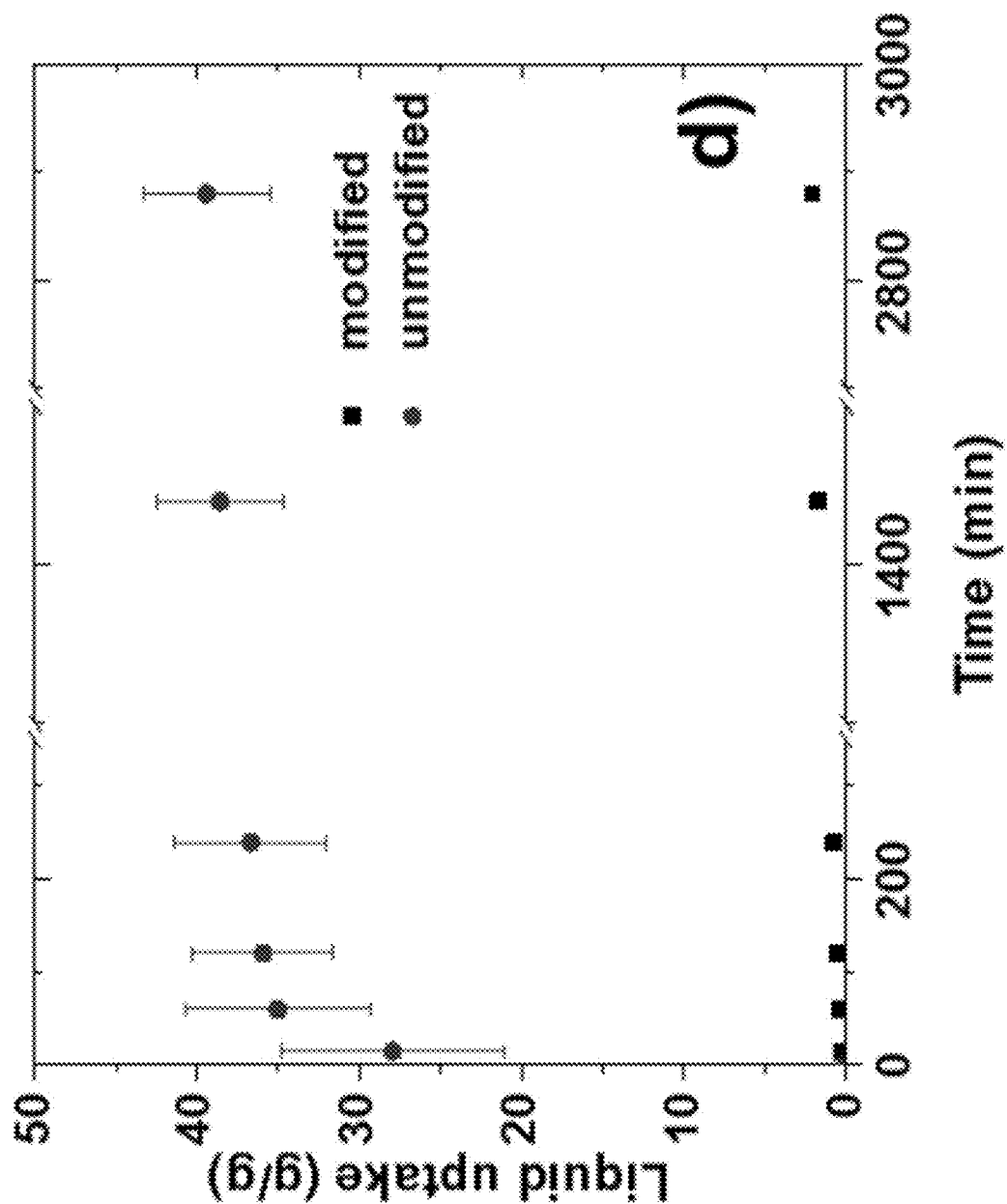
FIG. 15 is a graph of the liquid (water) uptake in grams per gram of aerogel, over time, for a modified aerogel (squares) and a unmodified aerogel (circles). The unmodified aerogel can absorb a significantly larger amount of water than the modified aerogel.
Figure 16:
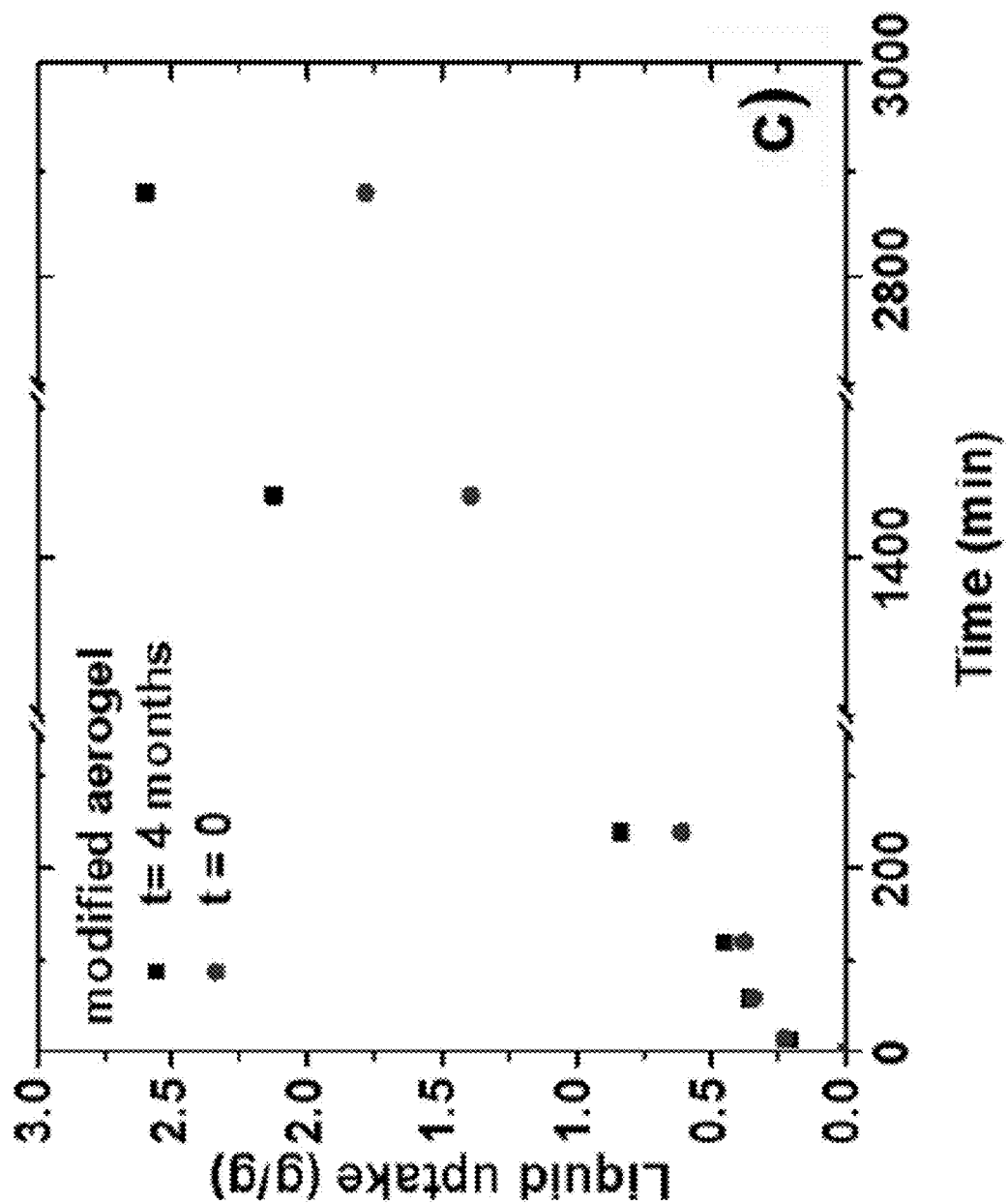
FIG. 16 is a graph of the liquid (water) uptake in grams per gram of aerogel, over time, for a modified aerogel immediately after modification (circles; t=0) and after 4 months of storage (circles; t=4 months). The amount of water absorbed stays relatively consistent over time.

FIG. 15 and FIG. 16 show the ability of unmodified and TCOS-modified aerogels to sorb water, and that the modified aerogel retains its hydrophobicity after at least about 4 months, respectively. FIG. 15 shows a graph of the liquid uptake in grams of water sorbed per gram of aerogel, over time. The unmodified 4% CDA aerogel quickly sorbed between about 35 and 40 grams of water per gram of gel over about 48 hours, whereas the TCOS-modified 4% CDA aerogel was hydrophobic and sorbed less than 5 grams of water per gram of gel during the same time period. Thus, the modified aerogel sorbed only about 3 times its weight of water over 48 hours, whereas the unmodified aerogel sorbed about 40 times its weight. This data demonstrates that the modified aerogel is stable and retains its hydrophobicity even after 48 hours of constant exposure to water.

FIG. 16 shows the water uptake in grams per gram of aerogel, over time, for a TCOS-modified 4% CDA aerogel immediately after modification and after 4 months of storage (the "aged" aerogel). The amounts of water sorbed by the two samples is similar and very low, with only about 2.5 grams of water sorbed for the aged aerogel after 48 hours, and only about 1.75 grams of water sorbed in the same time period for the non-aged aerogel.

Figure 17:
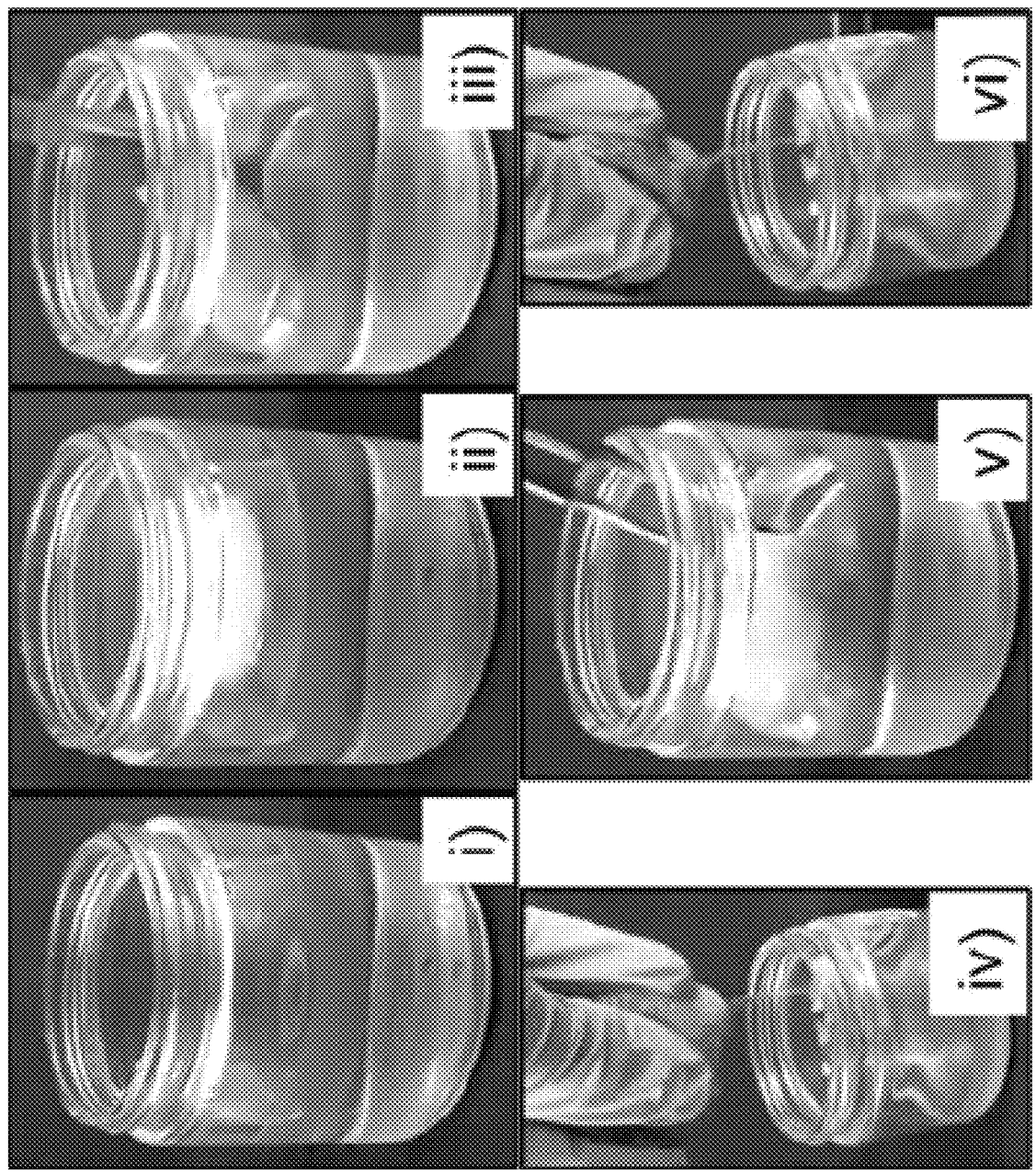
FIG. 17 is a series of photographs showing the process of selective sorption of a non-polar liquid by a modified aerogel over time.

The TCOS-modified 4% CDA aerogel was tested in the various models of an oil in water system to evaluate their sorptive properties and mechanical integrity. The model oil used in these studies was a spent kerosene grade oil (with a viscosity of about 1-2 cP) which was obtained from cleaning a laboratory vacuum pump, which is representative of an oil fraction with an equivalent alkane number of 9. A sample of approximately 0.3 grams of the modified aerogel was placed into a jar which contained about 10.5 grams of the model oil and about 60 grams of water. The photographs of FIG. 17 show the process of the selective sorption of the oil from the oil-water mixture by the modified aerogel over time. The aerogel was saturated with oil within a minute, as shown in FIG. 17 ii) to iii). The oil-loaded aerogel was pressed by hand, as shown in FIG. 17 iv) to recover the oil, and it can be reused to remove the oil remaining in the oil-water mixture, as shown in FIG. 17 v) to vi).

Figure 18:
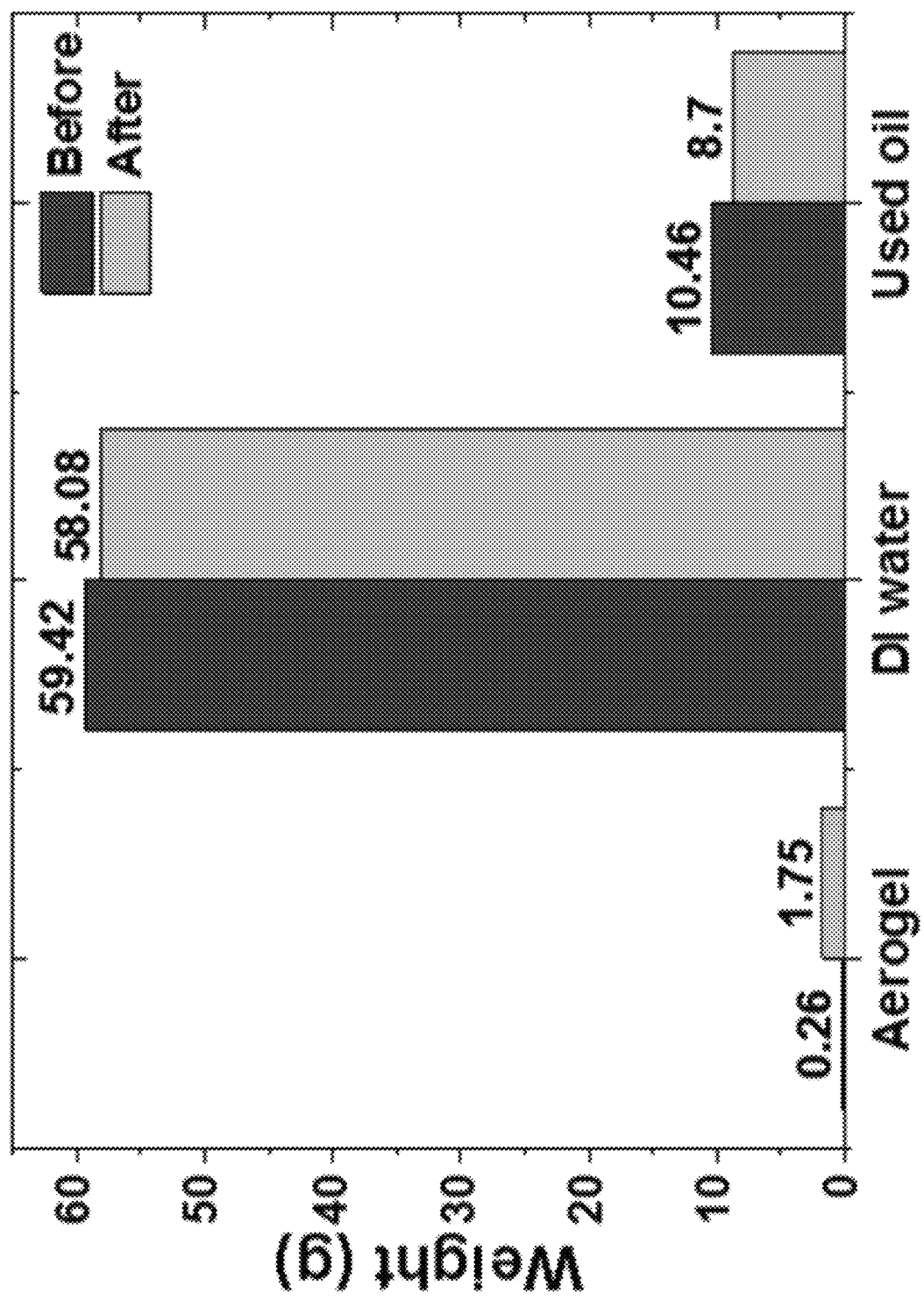
FIG. 18 is a graph showing the mass balance of liquids before and after exposure to a modified aerogel.

The mass balance of the liquids from the separation shown in photographs i) to iii) of FIG. 17, is shown in FIG. 18. The weight of the water, oil and aerogel was measured before the experiment, and the weight of the oil pressed out from the aerogel was measured after the experiment. The weight of the used aerogel and the remaining water was measured to complete the mass balance. The data shown in FIG. 18 shows that about 83 wt % of the model kerosene oil was recovered, with the unrecovered oil staying trapped in the aerogel pores. Also, the water sorption by the cellulose acetate aerogel was negligible (about 0.02 wt %), which suggested that the recovered oil can be reused.

Figure 19:
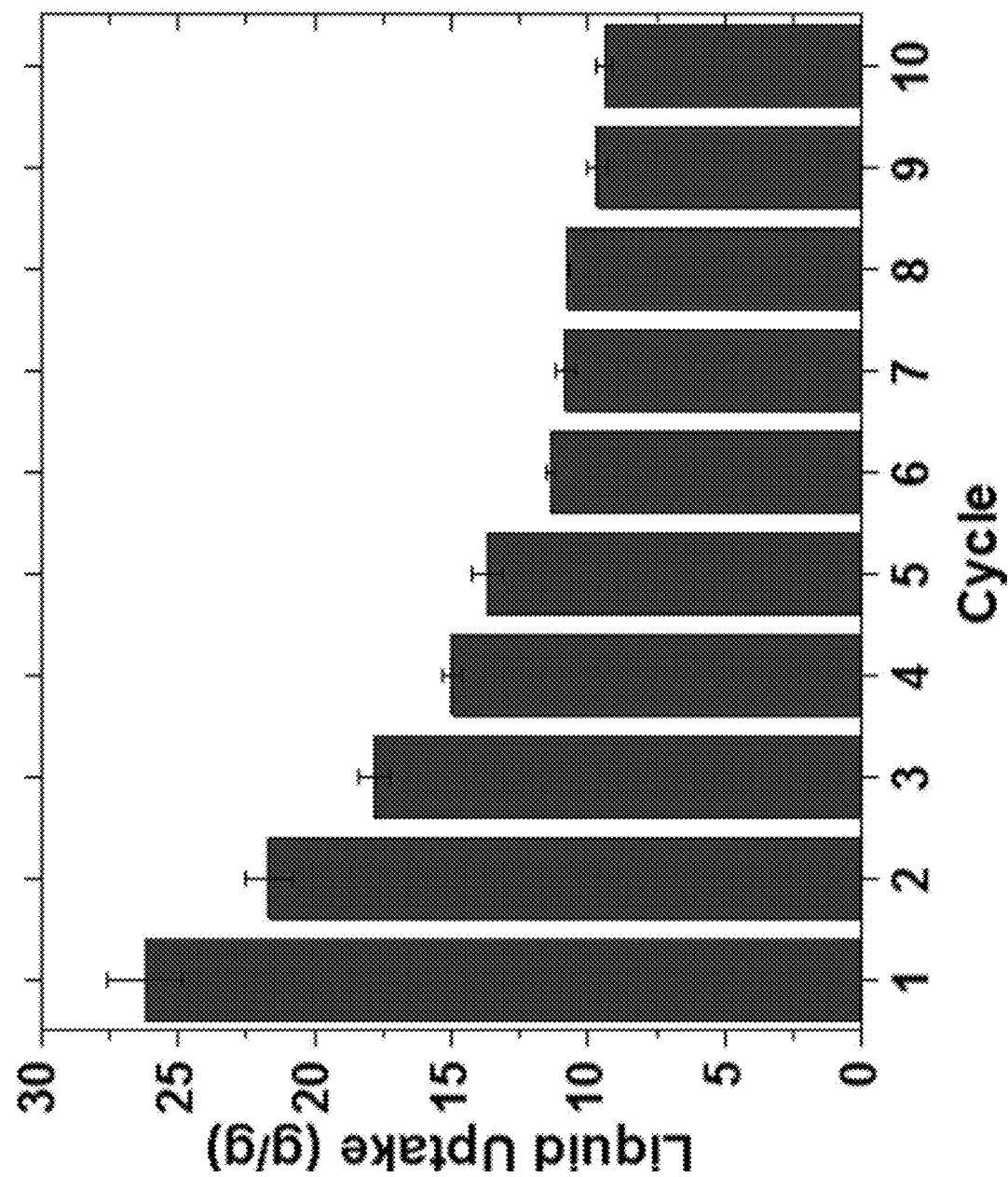
FIG. 19 is a graph showing the reusability of a modified aerogel, as measured by liquid uptake in grams per gram of aerogel, over 10 sorption/desorption cycles.

It was found that there were no major changes in the aerogel structure after multiple cycles of sorption and mechanical compression. The reusability of modified aerogels was tested via n-hexane sorption and desorption by mechanical compression, and is shown in FIG. 19. It was found that a TCOS-modified 4% CDA aerogel can be subjected to 10 cycles of sorption and compression before it undergoes structural failure. As shown in FIG. 19, the modified aerogel can sorb over 25 times its weight of n-hexane in the first cycle, and can still sorb about 10 grams of a n-hexane per gram of gel even after 9 cycles of sorption/compression.

Figure 20:
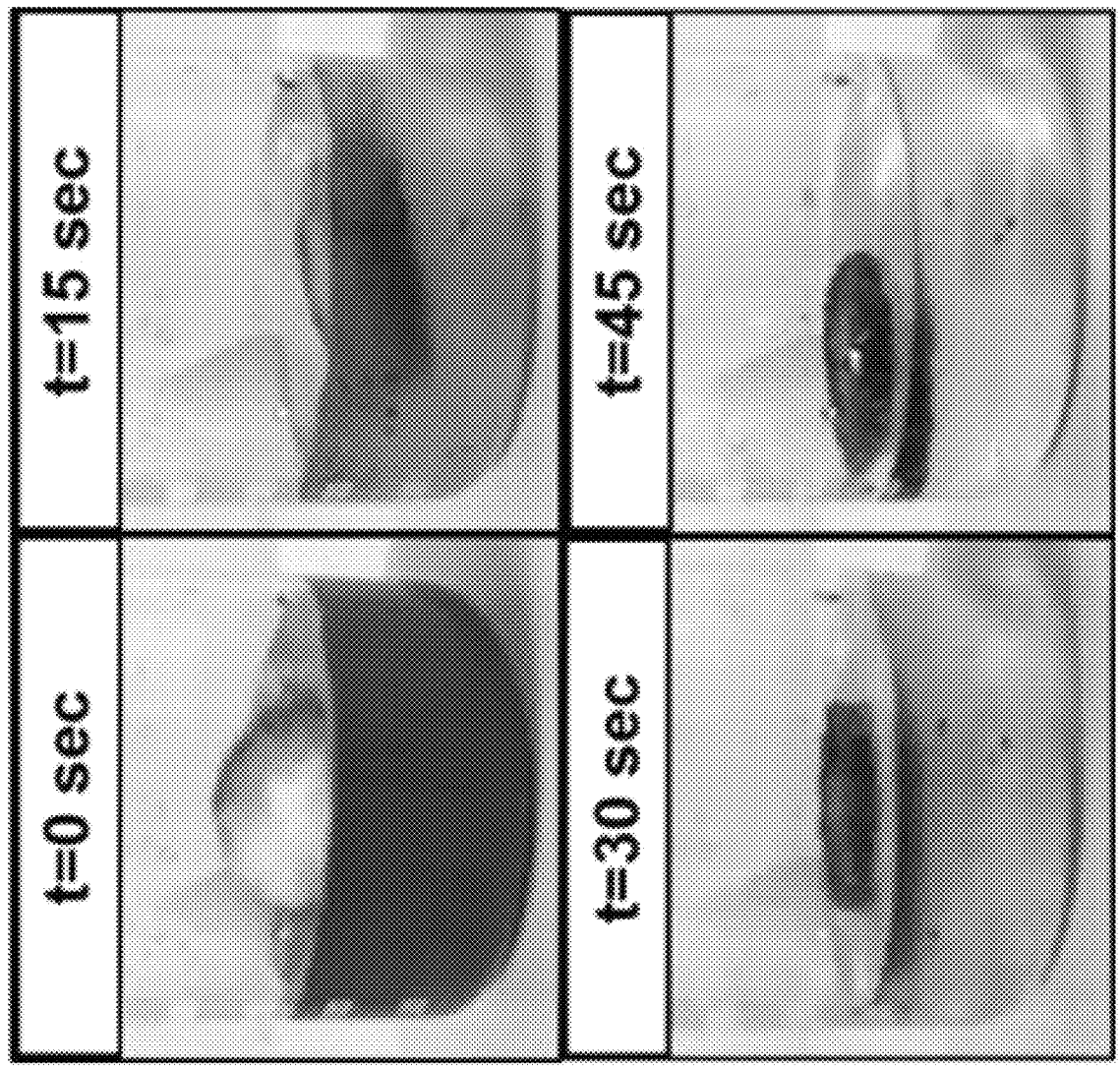
FIG. 20 is a series of photographs showing the process of selective sorption of a non-polar liquid (kerosene) containing a dye by a modified aerogel over time.

The modified aerogels were further tested in a stirred oil in water emulsion system. The spent model kerosene oil was dyed red with Oil red O for better visual observation. The following conditions were used: 6 grams of kerosene oil, 100 grams of water, 0.25 grams of aerogel and a trace amount of Oil Red O dye were stirred at approximately 500 rpm. FIG. 20 shows photographs of this study, with the upper photographs showing the aerogel being added to a beaker containing an oil-water emulsion at the instant it's added (t=0; upper left photograph) and 15 seconds after the addition of the aerogel (t=15 sec; upper right photograph), and the lower photographs showing the beaker at the 30 second (t=30 sec; lower left photograph) and 45 second (t=45 sec; lower right photograph) time intervals. As indicated by the photographs, a clear solution was obtained within a minute, as nearly all of the dyed oil is soaked up by the modified aerogel. Also, it was found that the modified aerogel retained both the oil and its mechanical integrity even in the stirred media, which indicates its utility for oil spills in an oceanic environment.

Figure 21:
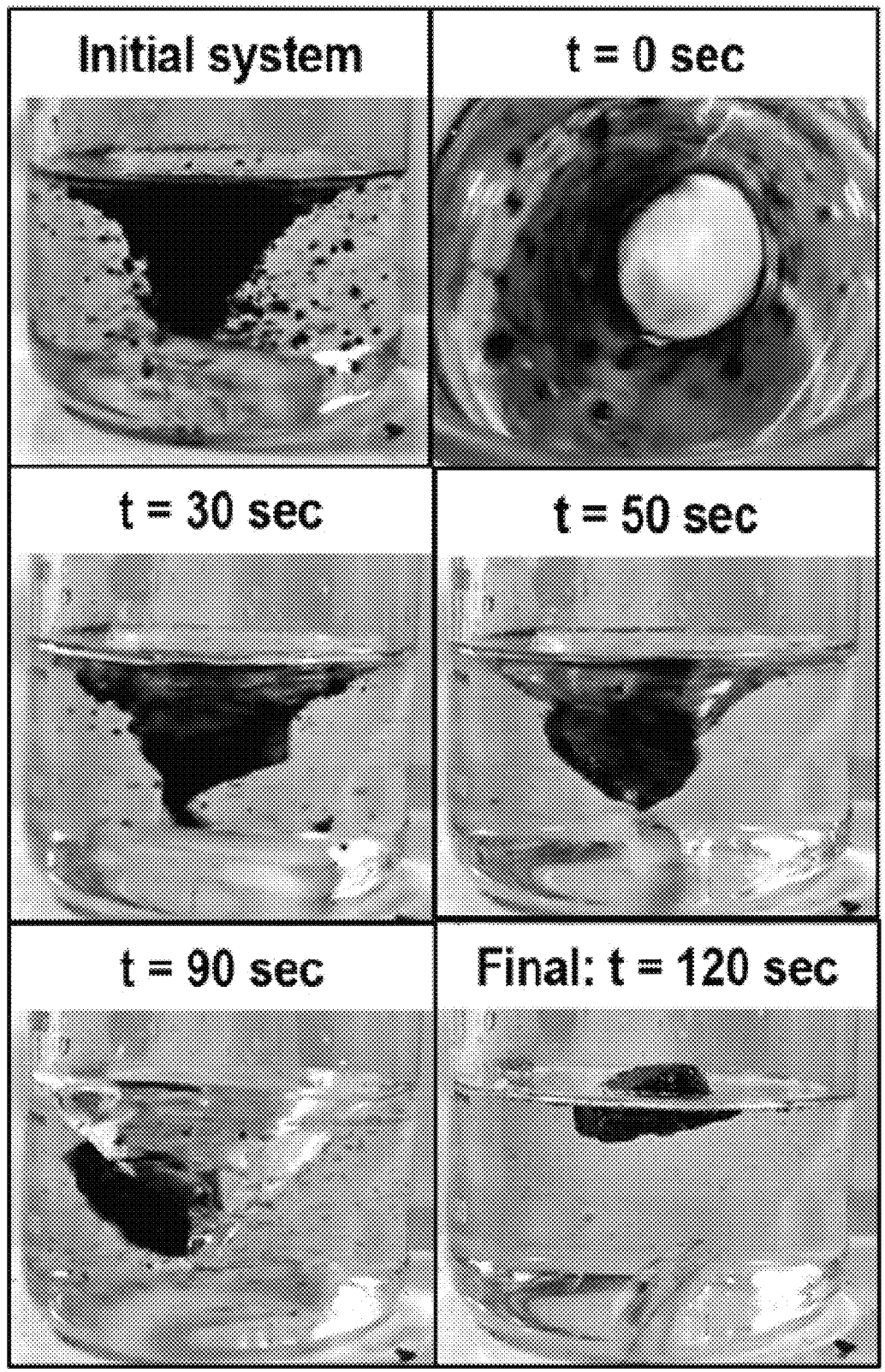
FIG. 21 is a series of photographs showing the selective sorption by a modified aerogel in a stirred motor oil in water system over time.

To simulate an oil spill in a turbulent ocean environment, a stirred oil in water system was prepared, where the model oil used was spent motor oil obtained after an oil change (with a viscosity between about 100-200 cP). Here, 7 grams of motor oil, 100 grams of DI water, and 0.35 grams of the aerogel were stilled at approximately 500 rpm. FIG. 21 shows photographs of this study, with the upper photographs showing a side view of the beaker used for the study prior to addition of the modified aerogel ("initial system"; upper left photograph), and an overhead view of the instant that the aerogel was added to the beaker (t=0 sec; upper right photograph). The middle photographs of FIG. 21 show the study at 30 seconds after the addition of the aerogel (t=30 sec; middle left photograph) and 50 seconds after the addition of the aerogel (t=50 sec; middle right photograph), and the lower photographs show the beaker at the 90 second (t=90 sec; lower left photograph) and final 120 second (t=120 sec; lower right photograph) time intervals. As indicated by the photographs of FIG. 21, the modified aerogel absorbed all of the motor oil within 2 minutes, even in the stirred media.

It is likely that modified aerogels with 2% CDA can also be used for oil separation with a higher sorption capacity. However, they likely cannot be reused after their first sorption/desorption cycle due the fact that they cannot sustain the capillary forces exerted from the liquids.

In summary, Examples 1 & 2 demonstrate that cellulose ester aerogels have been synthesized which exhibit a low density (about 24.3 mg/cc) and a high porosity (99%). The covalent cross-linking of a relatively high concentration of cellulose acetate (4 wt %) in the aerogels via sol-gel chemistry provides a high compressive strength of up to about 350 kPa, and a maximum strain of about 92%. The aerogels can be modified to render them hydrophobic and/or oleophilic. The modified aerogels do not fall apart, sorb oil within 2 minutes, and retain oil in turbulent media. These properties make them suitable for potential use to clean up oil spills in rough oceanic environments.

Example 3. Tuning Mechanical Properties of Aerogels

Methods

Materials: Cellulose acetate (CA, which is also referred to as CDA herein) flakes provided by Eastman Chemical Co. with degree of substitution of 2.45 and acetyl content of 39.7% were used as received. Reagent grade acetone (99.5%), Triethyl amine (TEA) and the cross-linking agent 1,2,4,5-benzenetetracarboxylic acid (also known as Pyromelletic Dianhydride, PMDA) were purchased from Sigma Aldrich. Deionized (DI) water with pH 6.74 was used. Liquid $N_2$ cylinder was bought from Airgas (NC).

Organogel synthesis: Cellulose acetate gels were synthesized as reported above. Briefly, a homogeneous solution of 4 wt % CA in acetone was formed by stirring it in a 100 ml Pyrex bottle for 24 hours. Assuming one PMDA molecule reacts with two hydroxyl groups on different CA chains, implies the CA:PMDA molar ratio of 2:1 was required for complete cross-linking. In the present example, the CA:PMDA molar ratio of 8:1 was used, where the molecular weight of one unit of CA with degree of substitution 2.45 was calculated as 264.6 g/mol. CA solution was stirred with PMDA cross-linker, for approximately 5 h to ensure complete dissolution. 0.05 vol % of the catalyst triethyl amine (TEA) was added to the previous solution, while stirring for another 30 s. A 10 ml of the solution was then transferred to a cylindrical mold and allowed to set into gel for 24 h. The obtained gel in acetone is termed as organogel.

Solvent exchange and swelling studies: The organogel was cut into cuboidal shape of 1 cm×0.8 cm×0.5 cm. To analyze the effect of acetone volume fraction on gel swelling behavior, the organogels were immersed in a solvent with acetone volume fraction of 1, 0.9, 0.75, 0.5, 0.25 and 0 for 48 h. To analyze the effect of solvent exchange time on gel swelling behavior, the organogels were immersed in a solvent with acetone volume fraction of 0.9 and the organogels were sampled at the interval of 4, 12, 24 and 48 h. The volume of the gels was measured via volume displacement method. The volumetric swelling is reported by normalizing the volume of the swelled/shrunk organogel at time 't' with the initial organogel volume. A total of 5 such experiments were done for each solvent concentration and each time interval. The average values of swelling along with the standard deviation is reported. The swelled organogels were immersed in DI water for 72 h, where DI water was replaced every 24 h. Thereafter, the obtained gels in water is referred to as hydrogels. The gels are abbreviated as fA, where, 'f' is the acetone fraction of the solvent in which organogel was immersed. For e.g., 0.9 A means, organogel was immersed in solvent with acetone volume fraction of 0.9 and the resulting hydrogel and aerogel is referred as 0.9 A hydrogel and aerogel respectively.

Aerogel synthesis: The hydrogels were frozen in one direction (FIG. 31) to ensure pore alignment. This was achieved using a computer controlled Linkam LTS350 which gives a precise working temperature, where the base plate was cooled using liquid $N_2$ and the temperature of the base plate was controlled using electrically heated coils to maintain the temperature at −80° C. The frozen hydrogel were then transferred to lyophilizer (Labconco FreeZone 2.5 Freeze Dryer) operating at −53° C. and 0.113 mbar which is lower than the triple point of water. The frozen hydrogel were dried for ~24 h to give CA aerogel. The aerogels are abbreviated according to solvent exchange in which the corresponding organogel were immersed. For e.g., aerogel prepared after immersing organogel in acetone volume fraction of 0.9 is referred as 0.9 A aerogel.

Density and Porosity: Aerogel density (pa) was calculated by measuring its mass and volume. The mass of the aerogel was measured by analytical balance, Fisher Scientific Accu-225D, which has least count of 0.1 mg and the volume was determined by measuring the dimensions (digital Vernier caliper). Average density is reported after 5 measurement for 3 different aerogels. The porosity of the aerogels was calculated using Equation 1.

Turbidity measurements: Turbidity measurements were done using Thermo Scientific turbidity meter (Orion™ AQ4500). The instrument was calibrated using 5 USEPA approved primary calibration standards. The samples were measured in transmittance mode. The values are reported in turbidity units (NTU).

Scanning Electron Microscopy (SEM): The imaging was done by Field Emission Scanning Electron Microscope (FESEM), FEI Verios 460L. The aerogels were fractured under liquid N2 using a sharp clean blade to image the in-pane and out-of-plane cross-section. The samples were fixed on the metal stub using a double sided carbon tape. The as prepared SEM samples were coated with a 5 nm layer of gold and platinum to capture secondary electrons from the surface and thus reducing charging.

Mechanical Compression testing: The compressive stress-strain curves were obtained via Instron Series IX using compressive load of 0.5 N which was lowered at the rate of 5 mm/min. The aerogels were compressed in-plane (parallel to freezing direction) and out-of-plane (perpendicular to freezing direction) directions. The compression modulus was obtained as the slope of initial linear region (at 1% strain). The energy of absorption was calculated as the area under the curve from 0 to 70% strain. The compressive strength was reported as the stress obtained at 70% strain and the densification strain was found as x-intercept of the tangent from the densification region.

Results

The solubility theories are based on the basic principle, "like dissolves like", i.e., the solvent should have the same physiochemical properties as the solute. The physiochemical properties of a material can be identified by its cohesive energy density (E/V), where 'E' is the energy of vaporization and 'V' is the molar volume of the material. The square root of cohesive energy density of the material is defined as Hildebrand solubility parameter ($\delta$). If the $\delta$ of a solvent and a solute are similar, then they mix well. The Hildebrand solubility parameters works well for non-polar hydrocarbon systems but fail for polar solvents and the solvents that exhibit hydrogen bonding. Hansen further improved upon Hildebrand solubility theory by dissociating cohesive energy density into three components; dispersion component ($\delta_d$), polar component ($\delta_p$) and hydrogen bonding component ($\delta_h$) that arise due to Van der Waals interactions, dipole interaction and hydrogen bonding interactions respectively. These three components, called Hansen solubility parameters (HSPs) can be calculated or measured. The equation most commonly used to correlate HSP is Equation 4:

$$Ra = \sqrt{4((\delta_{d1}^2 - \delta_{d2}^2) + (\delta_{p1}^2 - \delta_{p2}^2) + (\delta_{p1}^2 - \delta_{p2}^2))} \quad \text{(Equation 4)}$$

where, Ra is the modified difference between the HSPs of a solvent (1) and a polymer (2). The constant 4 is an empirical correlation. The solubility is maintained, if Ra is less than $R_0$, the interaction radius of the polymer which is measured experimentally. A Relative Energy Difference (RED) is defined as $Ra/R_0$. A value of RED less than 1 implies good solubility for the polymer in the solvent system.

TABLE 5

| Hansen solubility parameters of the polymer and the solvents | | | | |
|---|---|---|---|---|
| | $\delta_d$ (MPa)$^{1/2}$ | $\delta_p$ (MPa)$^{1/2}$ | $\delta_h$ (MPa)$^{1/2}$ | $R_0$ (MPa)$^{1/2}$ |
| Cellulose acetate | 18.6 | 12.7 | 11.0 | 7.6 |
| Acetone | 15.5 | 10.4 | 7.0 | — |
| Water | 15.6 | 16.0 | 42.3 | — |

Figure 26:
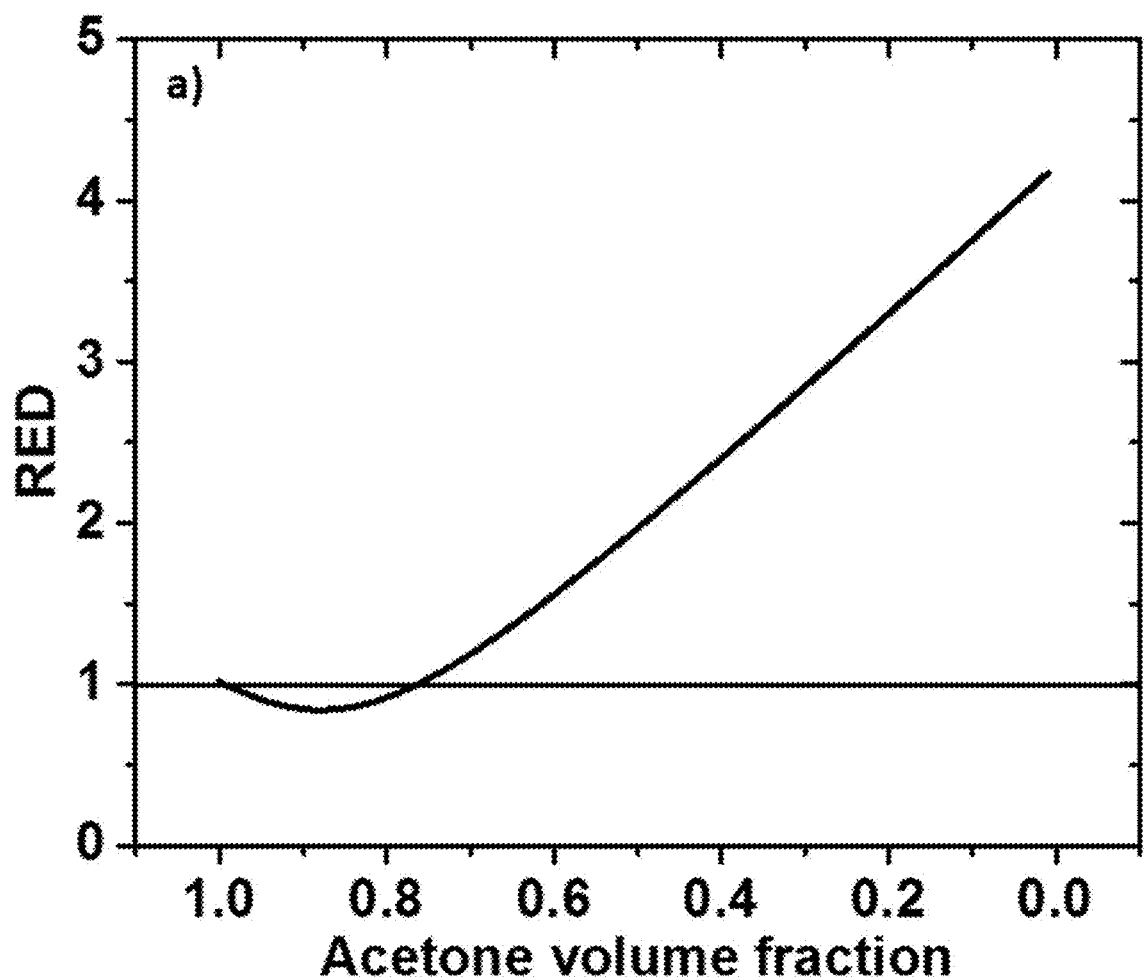
FIG. 26 is a graph of the relative energy difference (RED) between CDA and a solvent blend of acetone and water.
Figure 27:
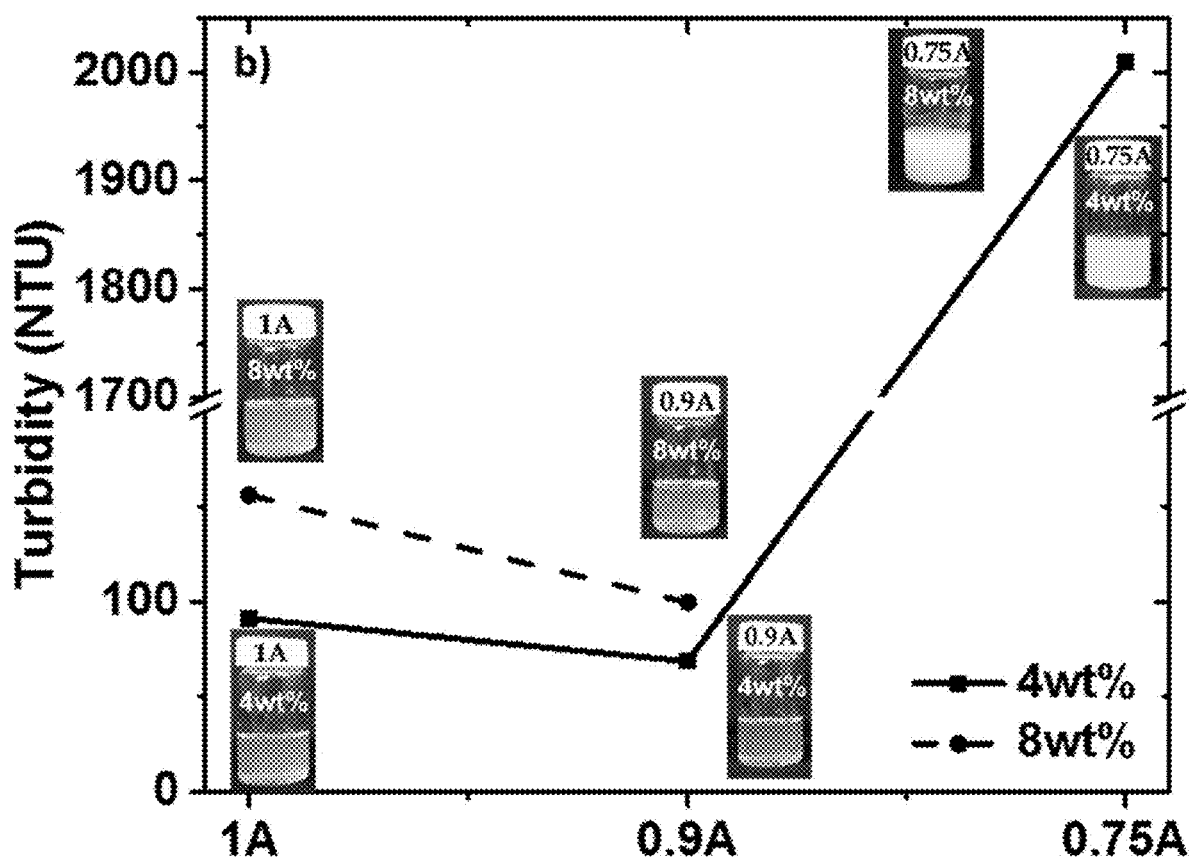
FIG. 27 is a graph showing the turbidity measurement of 4 and 8 wt % CDA solutions in acetone/water solvent. Images show solutions of CDA in the solvent blends of different acetone volume fractions.

In this example, the polymer is cellulose acetate (CA) with acetyl content of 39.7% and the solvent system is a blend of acetone and water. The values of their HSPs and $R_0$ of the polymer is displayed in Table 5. The HSPs of the solvent blend of small molecules, such as acetone and water can be calculated by simple rule of mixing. FIG. 26 shows the RED as a function of acetone volume fraction in the solvent blend. It is evident from the graph that the blend with 0.9 acetone volume fraction theoretically may be the best solvent for CA. The claim is corroborated experimentally with the turbidity analysis of the solutions of 4 wt. % and 8 wt. % CA in solvent blends of acetone fraction 1, 0.9 and 0.75. As can be seen from FIG. 27, the CA solution in 0.9 acetone volume fraction exhibits the lowest turbidity, which implies enhanced solubility. The corresponding images of the solutions are also shown in the FIG. 27.

The understanding for behavior of CA in the solvent blend of acetone and water can be employed to tune the swelling behavior of CA gels. It is hypothesized that CA organogels will exhibit a maximum swelling in the solvent blend with 0.9 acetone volume fraction represented as 0.9 A. It is worth mentioning that swelling behavior of gels also depends on the cross-linking density. Therefore, to isolate the effect of solvent concentration, the cross-linking density was kept constant.

Figure 28:
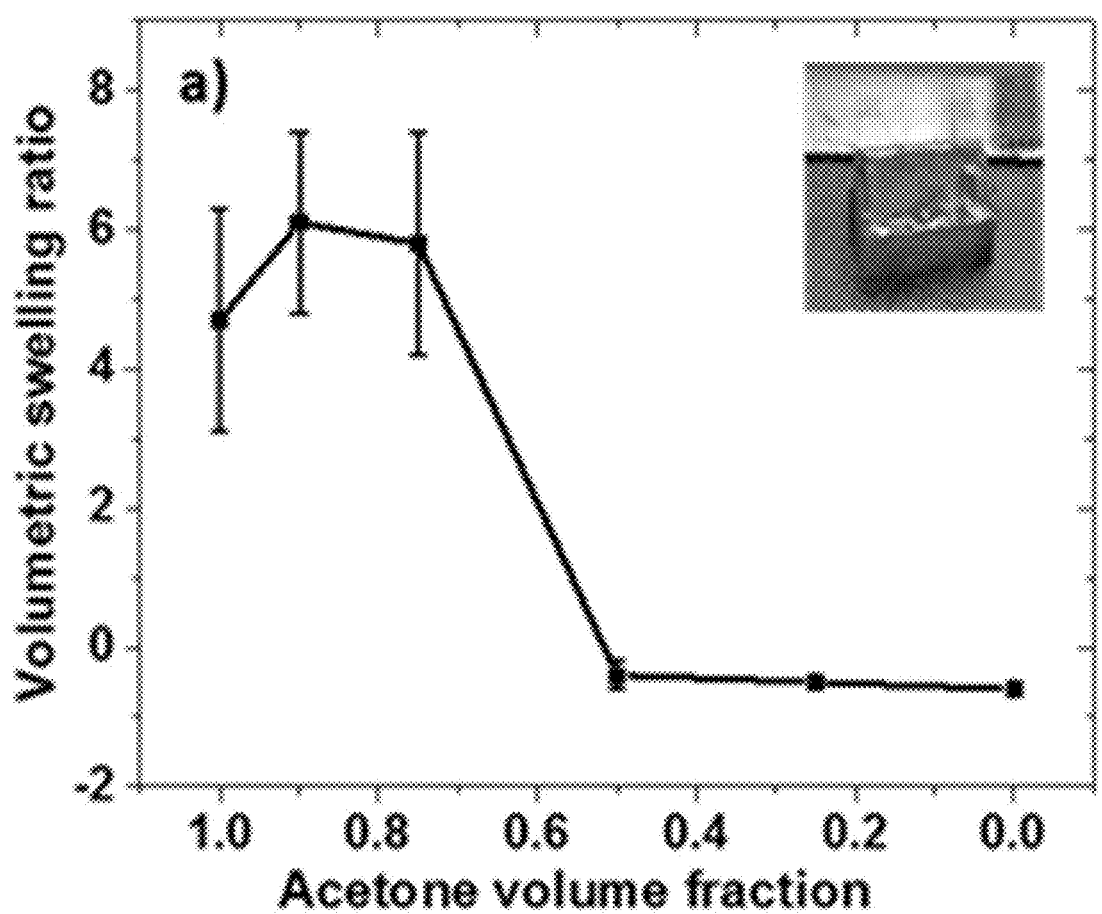
FIG. 28 is a graph showing the swelling behavior of a cross-linked organogel as a function of acetone volume fraction. Inset shows dimensions of an organogel used for swelling studies.

The volumetric swelling ratio shown in FIG. 28 for CA organogel in various acetone volume fractions exhibits a maximum for 0.9 A. However, there is no appreciable difference between the organogel swelling in 0.9 A and 0.75 A. This is most likely due to the chemical cross-linking of CA, which may cause slight shift in the good solvent concentration for CA organogels. Nevertheless, a range of acetone volume fraction was found in the solvent blend, 0.9 to 0.75, for which the CA organogels exhibit a maximum swelling. Solvent blends below 0.5 acetone volume fraction are poor solvents for CA and they do not show any appreciable swelling.

Figure 29:
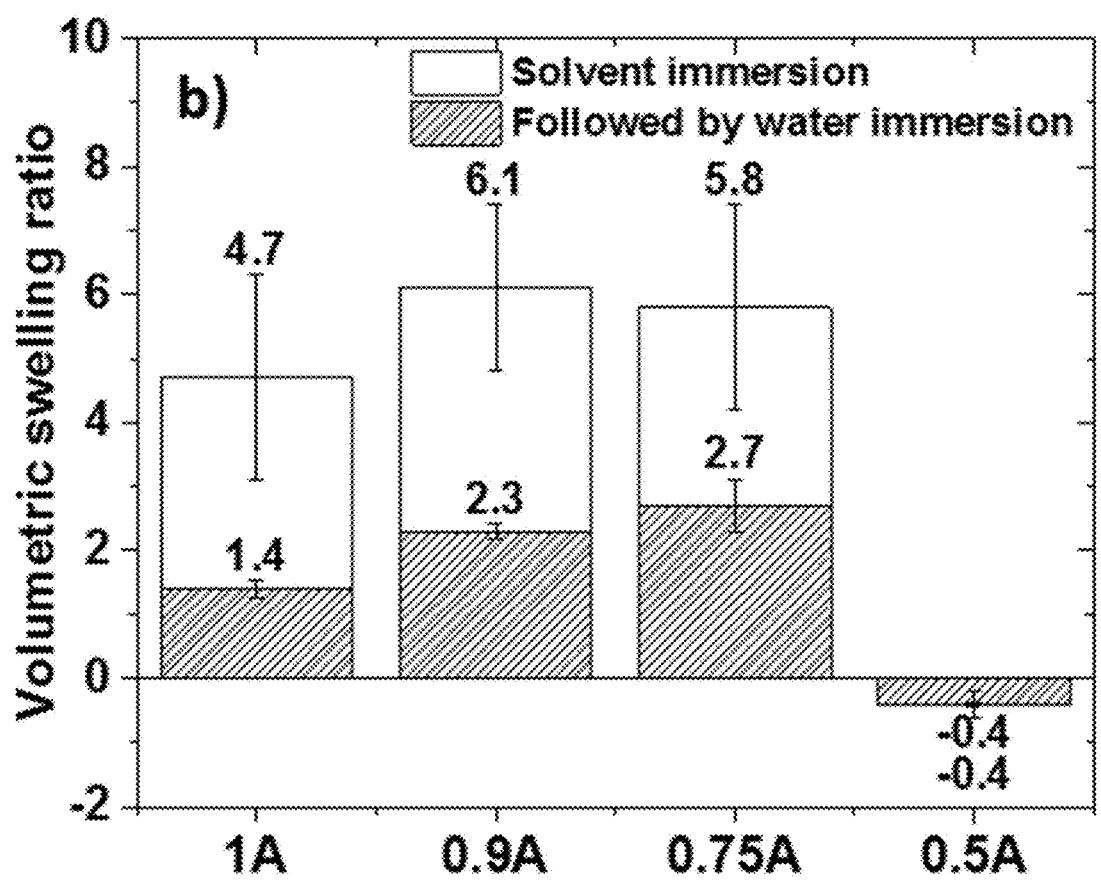
FIG. 29 is a graph showing the equilibrium volumetric swelling ratio of gels after water exchange.
Figure 30:
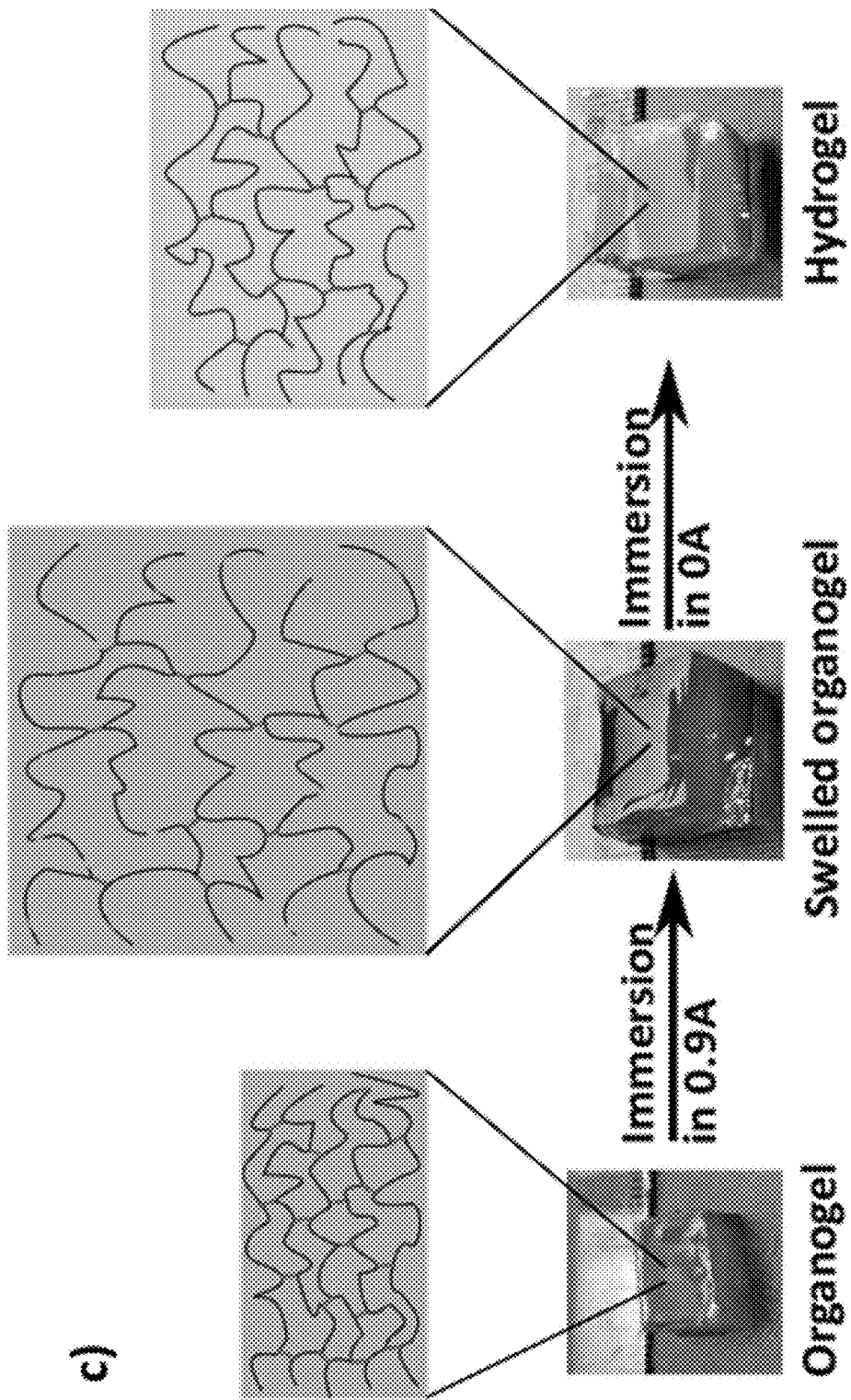
FIG. 30 is a schematic of the hypothesized swelling phenomenon for cross-linked CDA gels (black chains—CDA polymer, red dash-cross-links, blue dots—water molecules, grey represents acetone and blue represents water).
Figure 42:
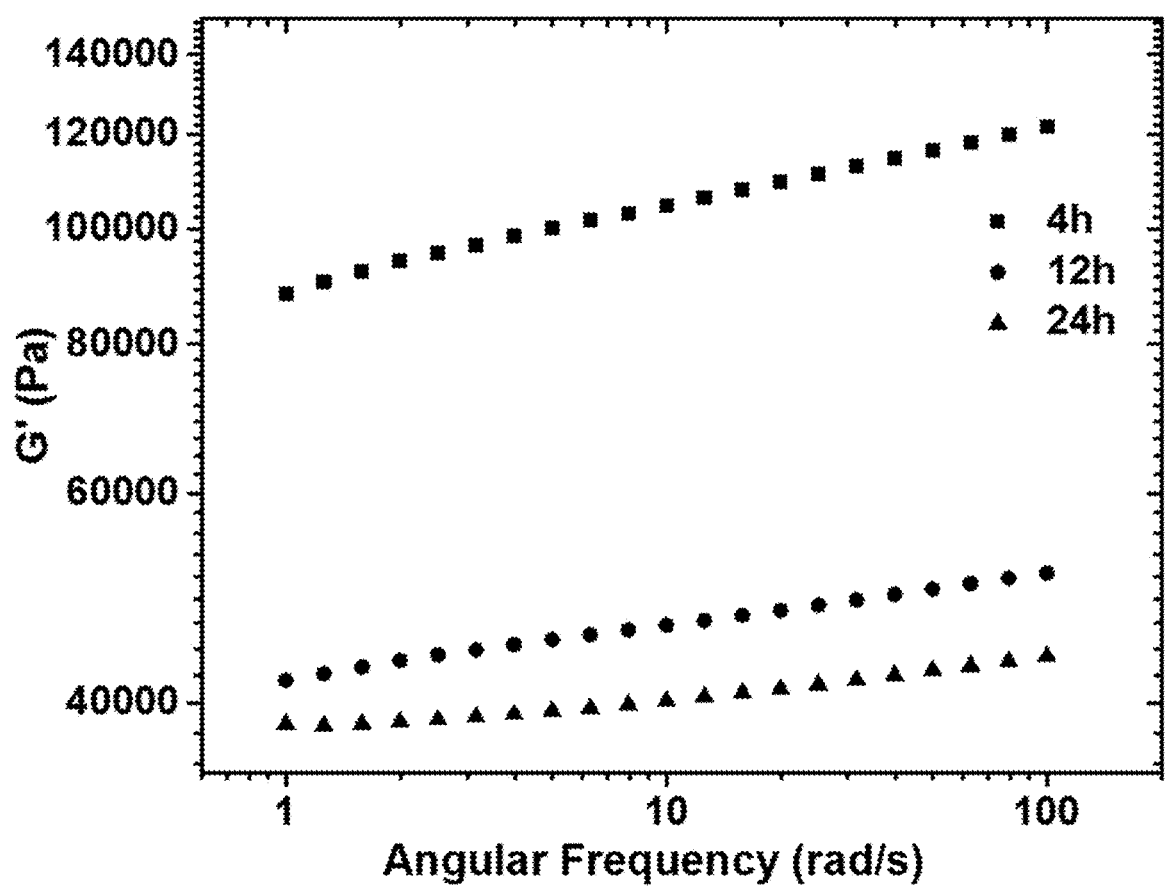
FIG. 42 is a graph of a frequency sweep demonstrating elastic modulus (G') of hydrogels obtained after solvent exchange for 4, 12 and 24 h.

The swelled organogels were dipped in DI water for 72 hours and the water was exchanged two times to remove the acetone. Interestingly, even after immersing in the poor solvent (water), the swelled organogels do not shrink back to the original state, in fact, they equilibrate at a final swelling ratio, as can be seen from FIG. 29. The final swelling ratio ranges from 1.4 to 2.7 for acetone volume fraction of 1 to 0.75. The organogel in 0.5 A solvent blend does not show any further shrinkage after immersing in water. The fact that swelled organogel does not revert back to its original volume or shrink further when immersed in poor solvent can be explained by the elastic behavior of the cross-linked networks. A hypothesis is illustrated in FIG. 30. The black chains denote CA polymer, red lines denote cross-links, blue dots represent water molecules and grey and blue represent acetone and water respectively. Immersing organogel in a good solvent blend (0.9 A) causes swelling and allows water molecules to seep into the network along with acetone. These water molecules may hydrolyze some of the ester bonds, thus reducing the elasticity of the cross-linked network. Upon immersing swelled organogel in poor solvent (water, 0 A) for a certain period of time, entire acetone diffuses out but the water molecules remain trapped inside due to hydrogen bonding interaction with the hydroxyl groups on CA polymer chains. The ester bonds hydrolysis should cause weakening of the elastic network that can be qualitatively correlated with lowering of elastic modulus (G') of the gel. To test this, three hydrogel samples were prepared by immersing the organogel in 0.9 A for 4, 12 and 24 h followed by water immersion for 72 h. A frequency sweep (1-100 rad/s) was performed on the resulting hydrogels using a serrated flat plate geometry. The result is shown in FIG. 42, which indicates a 3 times decrease in G' upon increasing the immersion time for the gel from 4 to 24 h, thus indirectly confirming the hypothesis.

The mechanical properties of an aerogel may rely on the pore structure that includes pore volume, pore alignment and pore wall thickness. It has been shown that freezing conditions heavily determines the pore structure of the resulting aerogel. Therefore, to isolate the effect of freezing conditions on the mechanical properties of the aerogels, unidirectional freezing was performed to target uniform pore alignment and pore structure. The procedure and setup is demonstrated in FIG. 31 $a,b$. The hydrogel was placed on a copper plate which was kept at a constant −80° C. Rest of the faces of the hydrogel were kept open to atmosphere at 25° C. The frozen hydrogel was freeze dried at −56° C. and 0.113 mbar, to give the aerogel as shown in inset of FIG. 31 $b$. The out-of-plane (cross-section perpendicular to the freezing direction) and in-plane (cross-section along the freezing direction) view of SEM micrographs of CA aerogels are presented in FIG. 31 $c,d$ respectively. The out-of-plane view of CA aerogel (FIG. 31 $c$) exhibits a honey-comb kind of structure with cell size ranging from 50-100 µm. The closed pore structure resembles a morphology that is reminiscent of sublimated ice crystals. Since, the growth rate of ice crystals is highly anisotropic in one direction, the CA polymer is forced to align along the solidification front. The CA polymer gets concentrated and squeezed on to the crystal boundaries giving a highly ordered honeycomb structure. The inset in FIG. 31 $c$ shows the magnified SEM image of the out-of-plane view. The in-plane view, shown in FIG. 3$d$, exhibits a directionality in the pores. Most of the CA polymer was aligned in the direction of ice crystal growth and no honeycomb structure was observed in this view.

Figure 32:
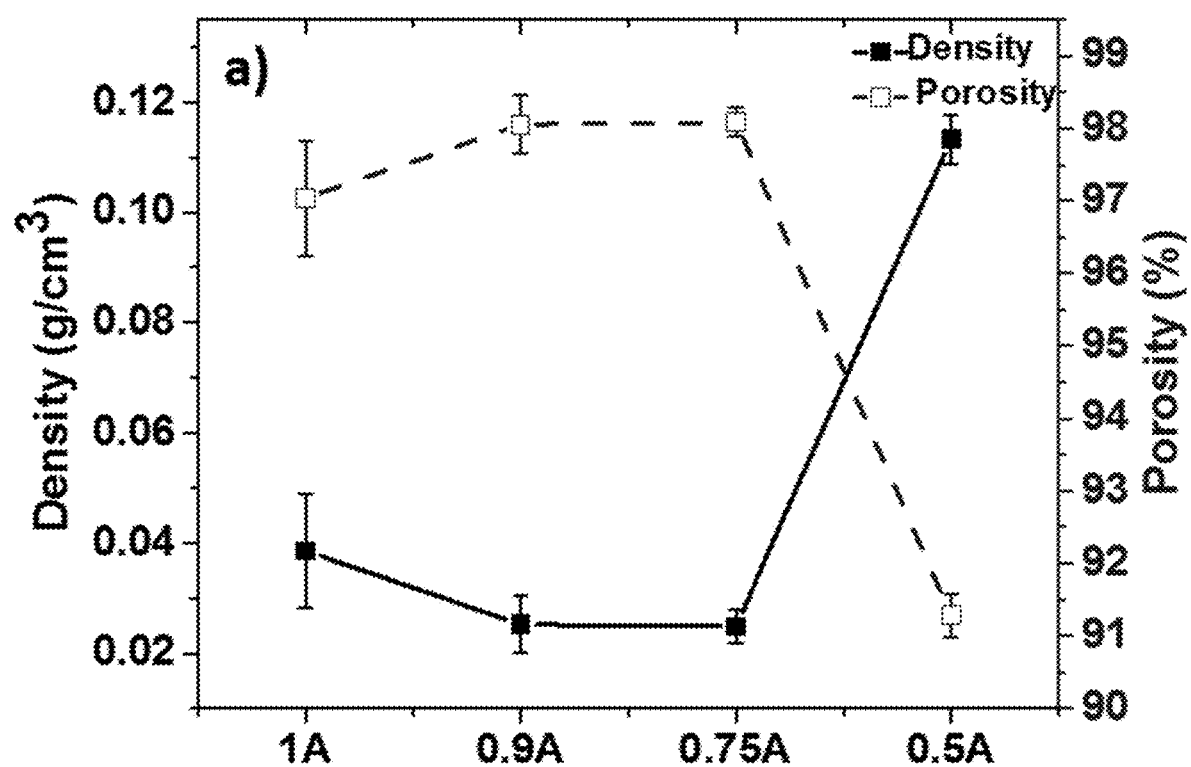
FIG. 32 is a graph showing the density and porosity of CDA aerogels synthesized from organogels that were obtained after solvent exchange with different acetone volume fractions.
Figure 43:
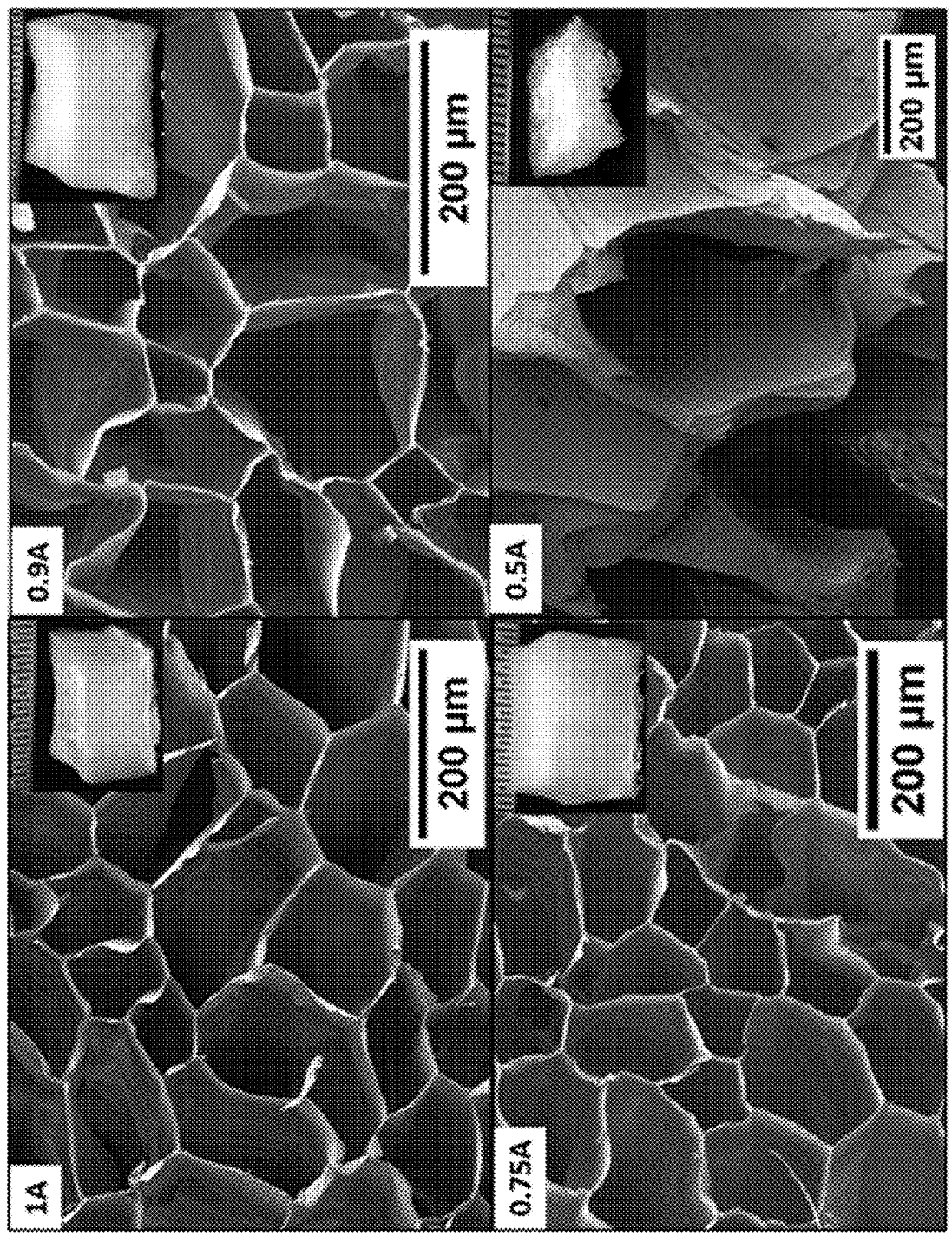
FIG. 43 is a series of SEM images of the out-of-plane axis of aerogels when the acetone volume fraction in solvent exchange is varied. Inset shows the camera image of the bulk aerogels.

The CA aerogels were analyzed for their structural and mechanical properties. As seen from the FIG. 32, 0.9 A and 0.75 A aerogels have minimum density and highest porosity. It was previously observed that 4 wt % CA hydrogels undergo minimal shrinkage during freeze drying step. Hence, the difference in densities and porosities is attributed to the swelling behavior of CA organogels when immersed in various acetone volume fractions. The organogels immersed in 0.9 A and 0.75 A exhibited maximum swelling, resulting in aerogels with lowest densities and highest porosity. The organogel immersed in 0.5 A (poor solvent for CA) did not exhibit swelling, which resulted in aggregation of the polymer chains even before freezing, thus producing an aerogel with highest density and lowest porosity. FIG. 43 shows SEM images of the 1 A-0.5 A aerogels. The 1 A, 0.9 A and 0.75 A aerogels exhibit a honeycomb pattern that spans the entire aerogel. The 0.5 A aerogel, on the other hand shows pores that do not span the entire aerogel.

Figure 33:
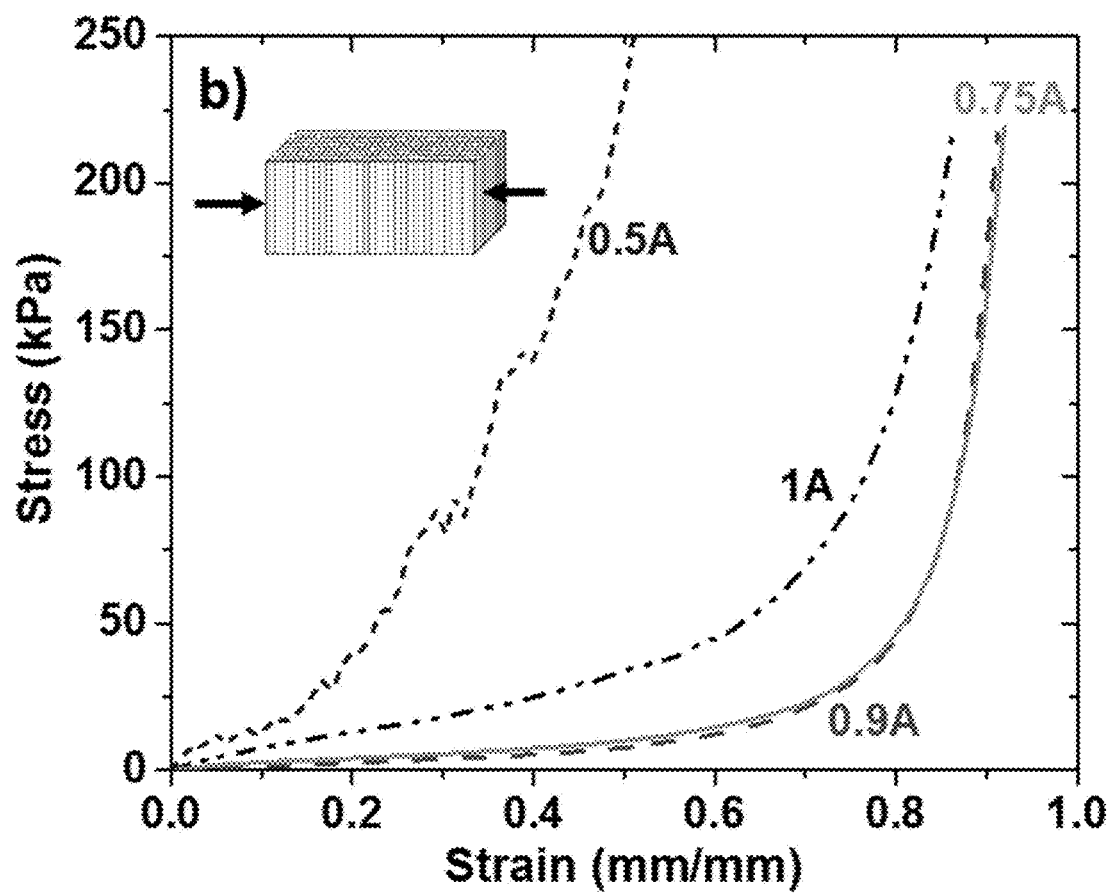
FIG. 33 is a graph showing the compressive stress-strain curve for CDA aerogels that were obtained after solvent exchange with different acetone volume fractions (inset shows compression direction, out-of-plane compression).
Figure 34:
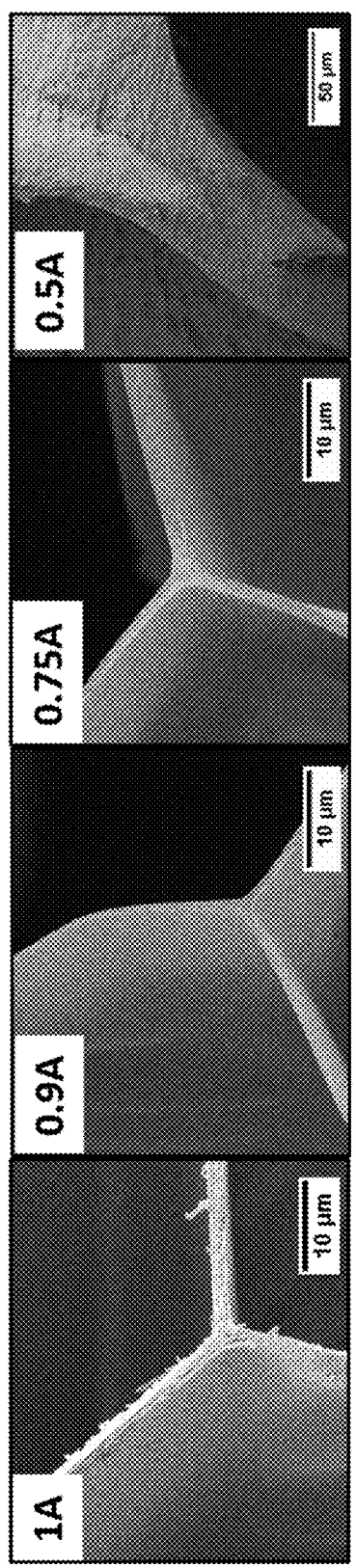
FIG. 34 is a series of SEM images showing the pore walls of aerogels for varying solvent exchange volume fractions.

The mechanical properties of these aerogels were analyzed via measuring compression stress as a function of strain. FIG. 33 shows the out-of-plane compressive stress-strain curve for the CA aerogels as demonstrated in inset of FIG. 33. The curves resemble a compression curve of an elastomeric foam. The elastomeric foams are characterized by a linear elastic region followed by a plateau region and a final densification region. The linear elastic region is controlled by cell wall bending. A small linear elastic region is observed (less than 3% strain) for CA aerogels, which is due to low relative density of the aerogels (less than 0.09). The 1 A, 0.9 A and 0.75 A aerogels have extremely low relative density (0.03-0.02), that indicates presence of thin cell walls and edges as seen in FIG. 34. The cell wall thickness of 1 A, 0.9 A and 0.75 A aerogel is 1.3±0.3, 0.8±0.1 and 0.8±0.1 µm respectively. Furthermore, a honeycomb pattern (FIG. 43) of the thin cell walls induces a large pore volume and provides an added strength to the aerogel structure.

The linear elastic region is followed by an extended plateau region (for 1 A, 0.9 A and 0.75 A aerogels, up to 70% strain), which is associated with collapse of the cells walls by elastic buckling. The arrangement of thin cell walls in a honeycomb pattern gives an excellent load bearing capacity to the aerogel structure and allows 1 A-0.75 A aerogels to be compressed to large strains (more than 80%) without failure. The 0.5 A aerogel, in contrast has high relative density of 0.09 resulting in thick cell walls and edges (40±12 µm). Also, the honeycomb structure of 0.5 A aerogel does not span the entire aerogel (FIG. 43), which generates structural defects in the 0.5 A aerogel, exhibited in the form of kinks on stress-strain curve.

When the cells are completely collapsed, a further strain causes the cell walls to touch each other resulting in sudden rise of stress. This region is termed as densification region which is very distinct for 1 A-0.75 A aerogel due to a large pore volume, whereas, 0.5 A aerogel have a short plateau region that transitions quickly to densification region due to a low pore volume.

Generally, the mechanical properties of an aerogel such as compression modulus, energy of absorption, compressive strength and densification strain is highly dependent on relative density of an aerogel. Usually aerogel density is tailored by varying the polymer content. However, reducing the polymer content compromises mechanical performance of the aerogels. In this example, the density was tuned in a novel approach by controlling the swelling behavior of the preceding CA organogel. By using the controlled swelling approach, not only the density and desired mechanical properties of the aerogels can be tuned, but also the mechanical integrity of the aerogels can be maintained. As can be seen from Table 6, there is a wide range of values for stiffness (compression modulus: 14-340 kPa), toughness (energy of absorption: 4-103 kPa) and strength (compressive strength: 22-373 kPa) of these aerogels. A wide range of densification strain (35-87%) was also observed. The densification strain gives an indication to the compressibility of an aerogel that arises due to large pore volume and elastic pore walls arranged in honeycomb pattern. The values imply the flexibility this solvent exchange approach provides, to synthesize aerogels with comprehensive range of mechanical properties without undergoing any chemical or physical modification.

TABLE 6

Mechanical properties of CA aerogels

|  | 1A | 0.9A | 0.75A | 0.5A |
|---|---|---|---|---|
| Density, pa (g/cm$^3$) | 0.039 | 0.025 | 0.026 | 0.113 |
| Porosity (%) | 97.0 | 98.1 | 98.0 | 91.3 |
| Relative density ($\rho_a/\rho_{CA}$) | 0.030 | 0.019 | 0.020 | 0.087 |
| Compression Modulus (kPa) | 110 | 14 | 32 | 340 |
| Energy of Absorption (kPa) | 18 | 4 | 6 | 103 |
| Compressive strength (kPa) | 71 | 22 | 24 | 373 |
| Densification strain (%) | 78 | 86 | 87 | 35 |

Figure 35:
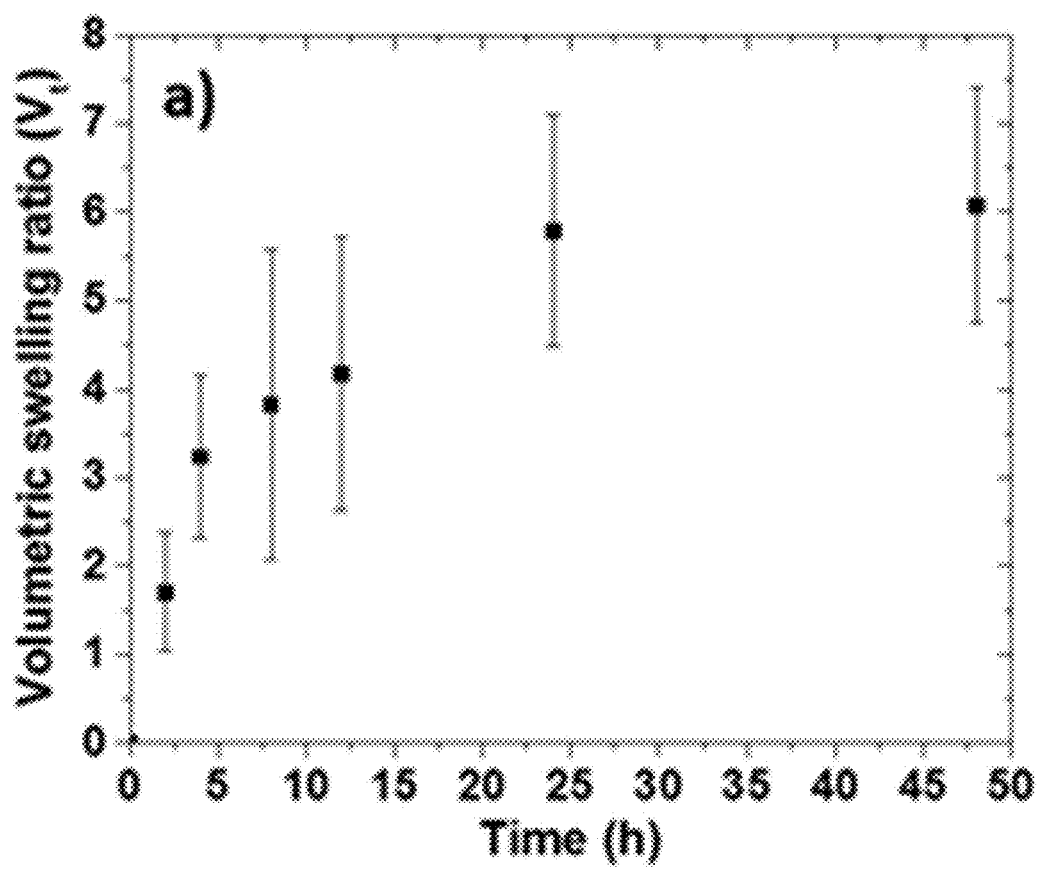
FIG. 35 is a graph showing the volumetric swelling ratio kinetics for organogels immersed in 0.9 acetone volume fraction (0.9 A).
Figure 36:
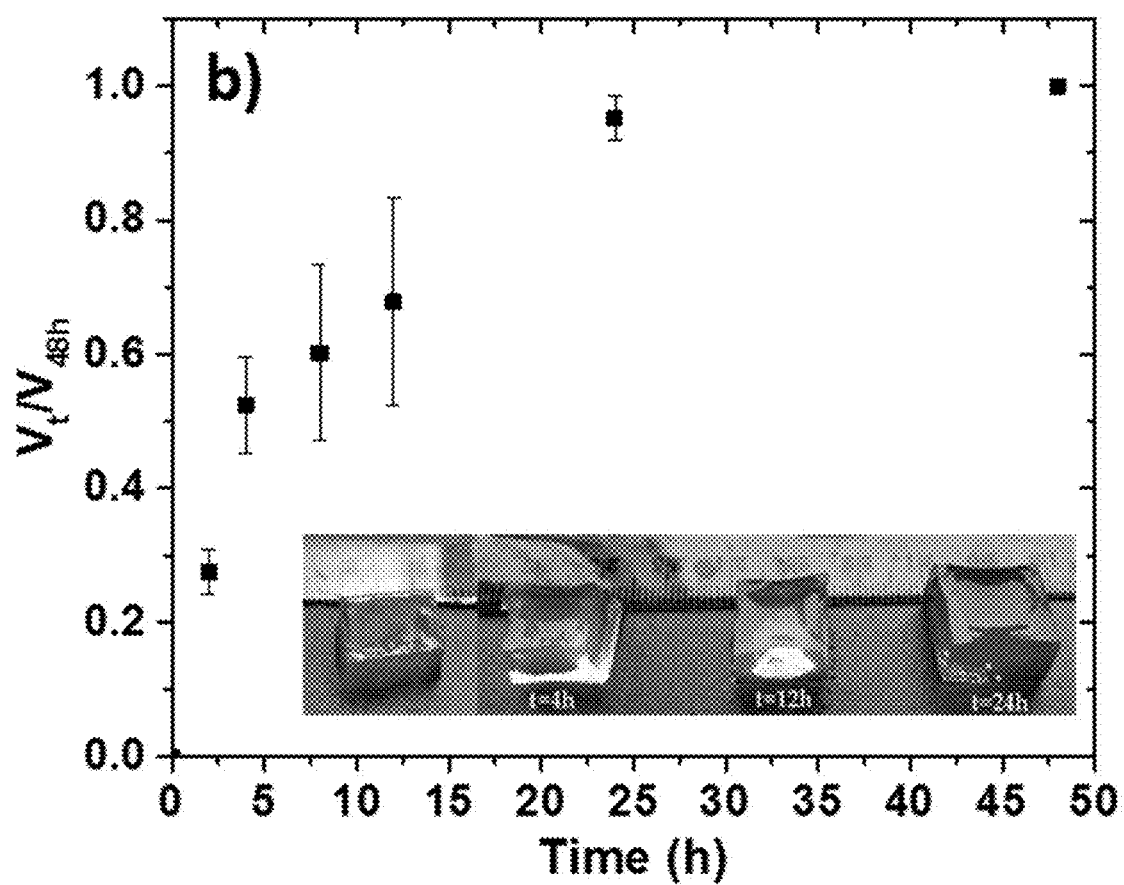
FIG. 36 is a graph showing the swelling ratio normalized with maximum swelling observed at 48 h for cross-linked organogels immersed in 0.9 acetone volume fraction (inset shows images of organogel over time).
Figure 37:
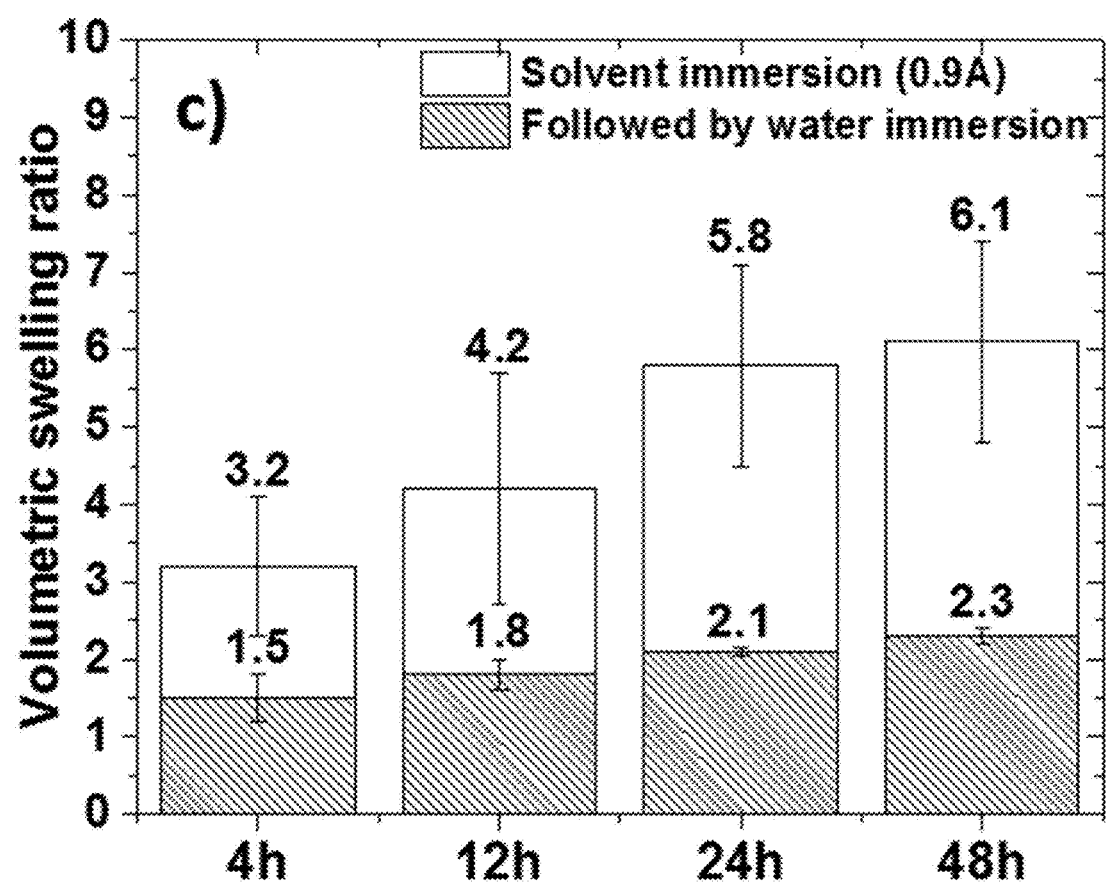
FIG. 37 is a graph showing the swelling ratio of gels measured after immersing in water for 72 h (following swelling in 0.9 acetone volume fraction).
Figure 38:
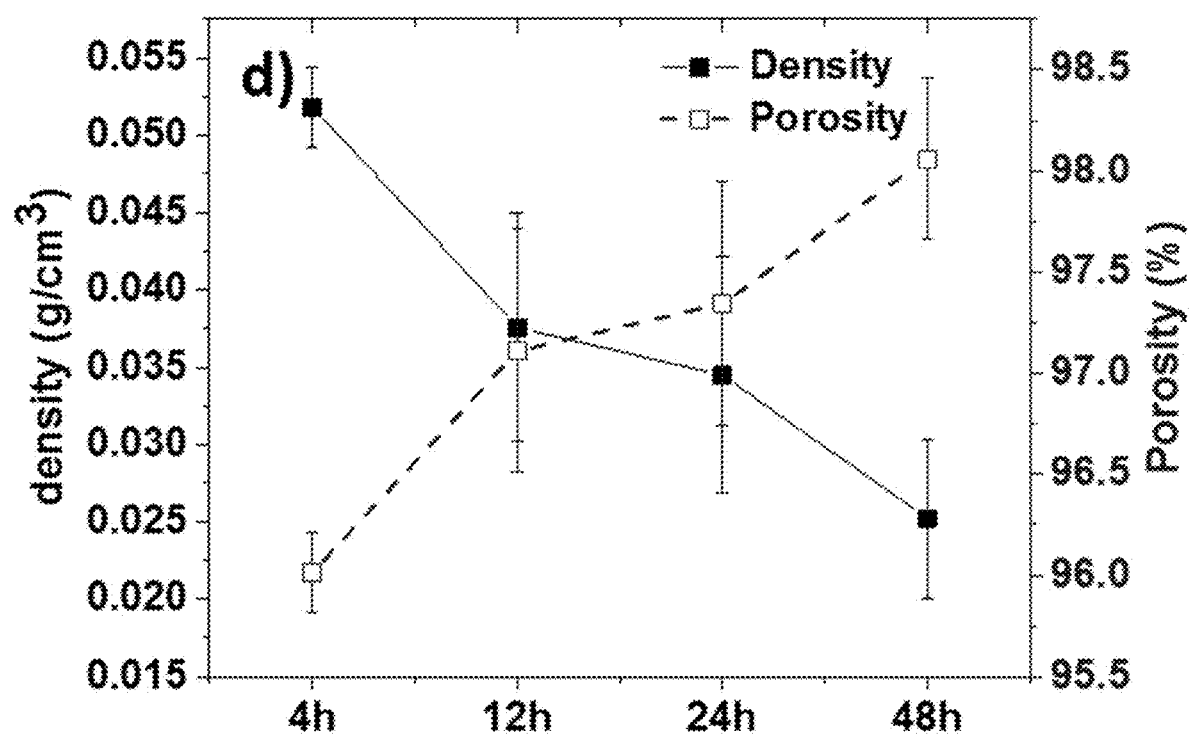
FIG. 38 is a graph showing the density and porosity of aerogels synthesized after varying solvent exchange times.

Building on the understanding that swelling characteristics of a gel influences the morphology and mechanical properties of the resulting aerogel, it can be hypothesized that the swelling kinetics of the gel (e.g., organogel and/or hydrogel) may influence the aerogel's properties. This section analyses the swelling kinetics of the gel along with the properties of the corresponding aerogels. FIG. 35 shows swelling kinetics of the organogel for a period of 48 hours, when immersed in 0.9 acetone volume fraction. The organogel reached maximum swelling ratio of about 6. The values in this figure, when normalized with the swelling ratio at 48 h, gave values in FIG. 36, which indicates that the swelling reaches an equilibrium value at 24 h. This further implies that any appreciable change in the aerogel properties is not expected after 24 h of swelling. The inset in FIG. 36 shows initial organogel (extreme left) and swelled gels after 4, 12 and 24 h respectively. When the swelled gels were immersed in pure water, a shrinking was observed, which equilibrated at the volumetric swelling ratio of around 1.5-2.3 (FIG. 37). The density and porosity of the aerogels synthesized from these hydrogels is demonstrated in FIG. 38. The density decreases as the solvent exchange time for the organogel increases and consequently, the porosity of the aerogel increases. This is due to swelling of the organogel, which increases as a function of time.

Figure 39:
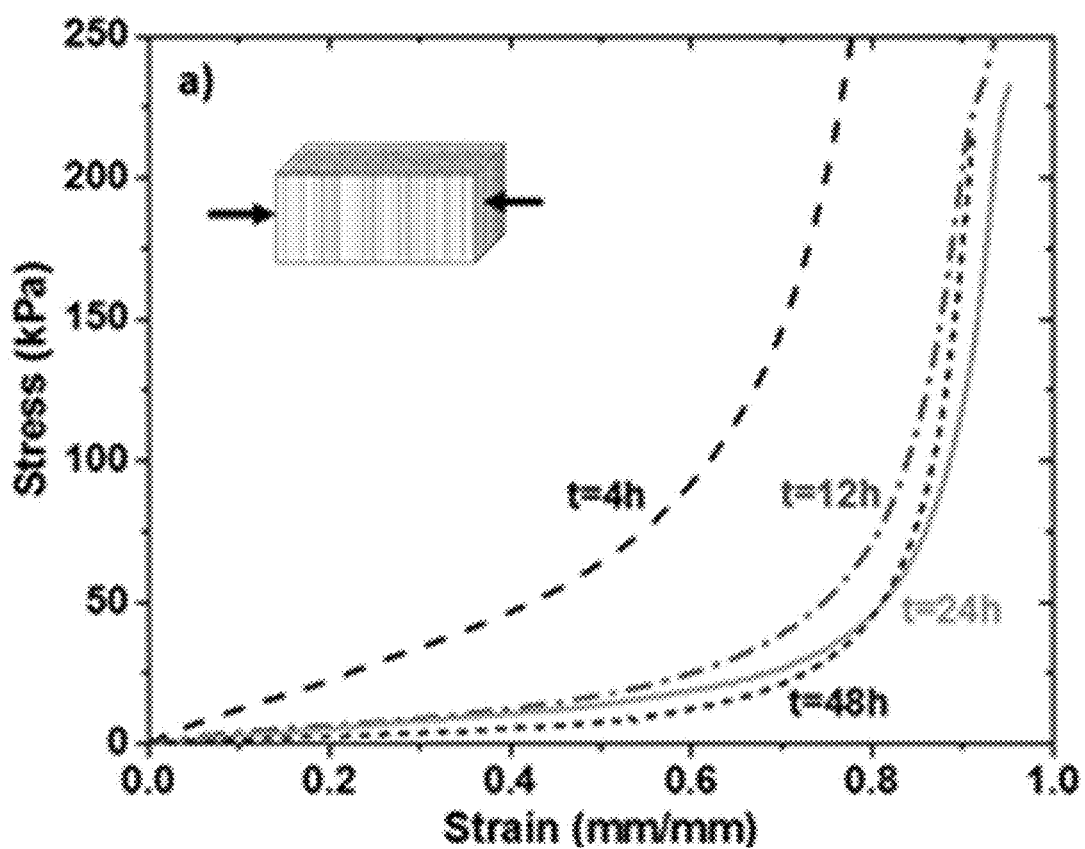
FIG. 39 is a graph showing the compressive stress vs strain curves for aerogels obtained after varying solvent exchange time.
Figure 44:
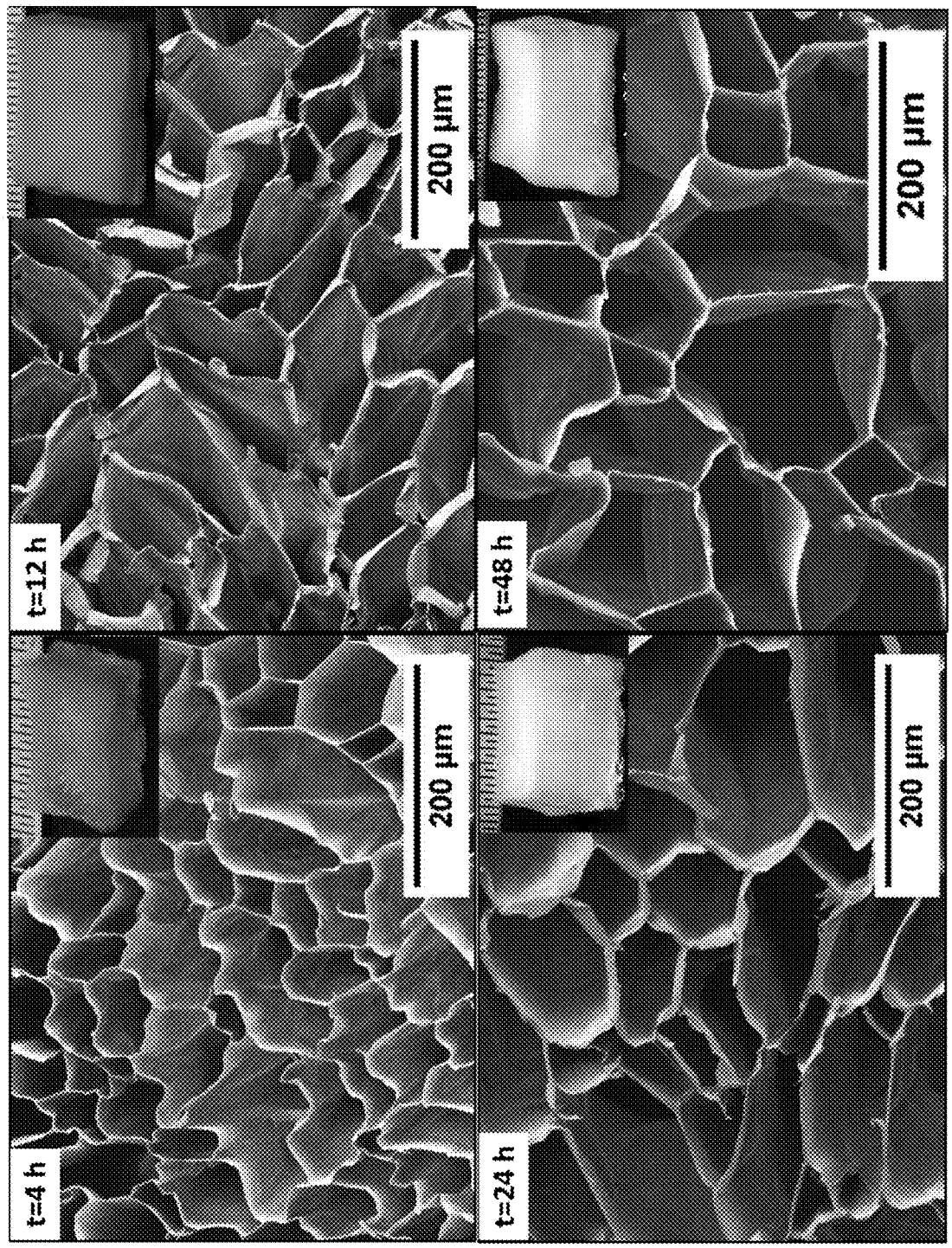
FIG. 44 is a series of SEM images of the out-of-plane axis of aerogels when solvent exchange time is varied. Inset shows camera image of the bulk aerogels.

The compressive stress vs strain curve generated from out-of-plane compression of the aerogels is shown in FIG. 39. A similar curve is observed as found in the previous section, with short linear elastic region, a long plateau region followed by densification region. It is noteworthy that the stress-strain curve for the aerogels obtained after 24 h of solvent exchange does not vary significantly. This is most likely due to the extremely low relative density (~0.02) and high porosity (98%) observed for aerogels obtained after 24 h of swelling. The swelling reaches an equilibrium within 24 h and hence the corresponding aerogels from 24 and 48 h of swelling have the highest porosity and lowest relative density, achievable by the solvent exchange approach for this polymer concentration. The SEM micrographs of the out-of-plane view for the aerogels obtained after varying solvent exchange time is shown in FIG. 44. All the samples show a honeycomb pattern. The comparison of the mechanical properties of the aerogels is listed in Table 7. It is evident from the values in the table that the properties of aerogels can be fine-tuned to a great degree by varying the time period for solvent exchange. The compression modulus ranges from 13-160 kPa, energy of absorption ranges from 4-35 kPa, and the compressive strength ranges from 22-151 kPa. A wide densification strain is also observed ranging from 65-88%. These wide range of values for mechanical properties of the aerogels again demonstrate that the aerogels of the desired mechanical properties (stiffness, toughness and strength) can be synthesized via novel solvent exchange approach.

TABLE 7

Properties of the aerogels obtained after varying time period for solvent exchange

|  | 4 h | 12 h | 24 h | 48 h |
|---|---|---|---|---|
| Density, pa (g/cm$^3$) | 0.049 | 0.038 | 0.030 | 0.025 |
| Porosity (%) | 96.2 | 97.1 | 97.7 | 98.1 |
| Relative density ($\rho_a/\rho_{CA}$) | 0.038 | 0.029 | 0.023 | 0.019 |
| Compression Modulus (kPa) | 160 | 54 | 13 | 14 |
| Energy of Absorption (kPa) | 35 | 10 | 7 | 4 |
| Compressive strength (kPa) | 151 | 40 | 26 | 22 |
| Densification strain (%) | 65 | 82 | 88 | 86 |

Figure 40:
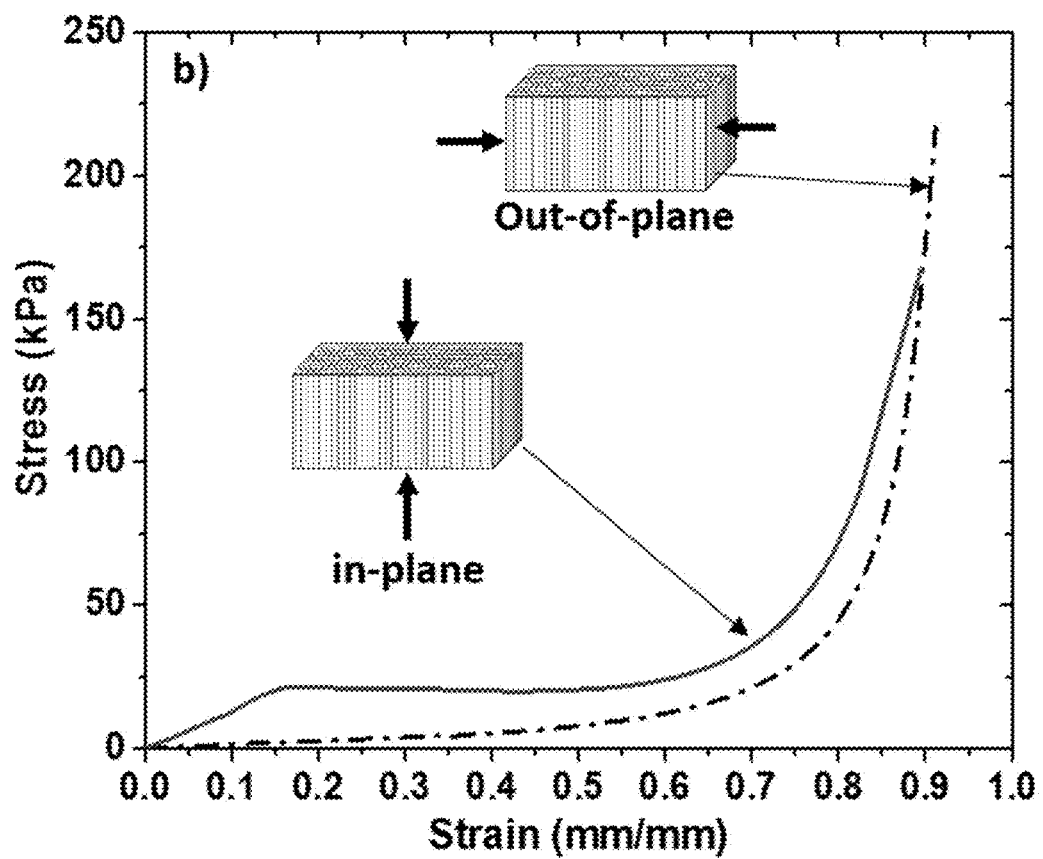
FIG. 40 is a graph showing the compressive stress vs strain curves for 0.9 A aerogels when compressed in-plane and out-of-plane.
Figure 41:
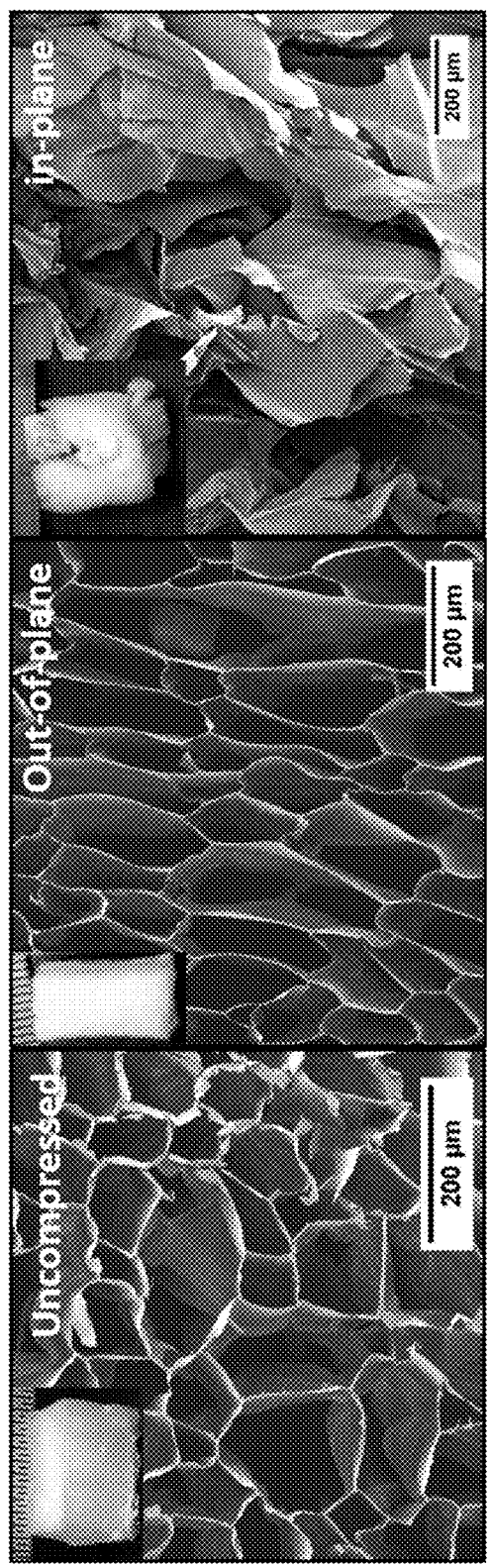
FIG. 41 is a series of SEM images showing out-of-plane views of 0.9 A aerogels when, uncompressed (left), compressed out-of-plane (middle) and compressed in-plane (right). Inset shows the camera image of bulk aerogel samples.

The pore alignment of these aerogels due to unidirectional freezing gives them an anisotropic behavior. FIG. 40 compares the compressive stress vs strain curve of 0.9 A aerogel in two planes, namely out-of-plane and in-plane. The in-plane compression which is in direction of the pore axis shows a very distinct elastic regime followed by a plateau and densification regime. The aerogel exhibits a yielding behavior (at around 15% strain), which is a characteristic of plastic foams. The pore walls when compressed along the axis elastically buckle until 15% strain and collapse when strained further resulting in a yielding and a constant stress of around 20 kPa. The out-of-plane view of SEM micrographs of the uncompressed and compressed (out-of-plane, in-plane) 0.9 A aerogel sample is shown in FIG. 41. The samples were compressed till 85% strain. The out-of-plane compressed image mainly shows pore walls bending at the hinges. There are few pore walls that are cracked under the strain. The in-plane compression, in contrast shows a complete structural collapse with loss of pore morphology. As can be seen from inset images, out-of-plane compression allows aerogels to bounce back whereas, in-plane compression causes a structural failure, when compressed till 85%. The compression modulus for in-plane compression is 112 kPa compared to 14 kPa for out-of-plane compression. The energy of absorption is 14 kPa while compressive strength is 35 kPa for in-plane compression, compared to 4 kPa and 22 kPa when the same aerogel is compressed out-of-plane. The densification strain is 74% for in-plane compression and 86% for out-of-plane compression. This data indicates highly anisotropic behavior of these aerogels, which can behave as elastic foam and plastic foam based on the axis it is compressed.

A novel approach to synthesize ultralight, anisotropic aerogels with tunable mechanical properties is demonstrated in this example. The use of solubility parameter theory to control swelling behavior of the gels gave a tremendous control over the final mechanical performance of the aerogels. The solvent exchange approach allowed for the synthesis of aerogels with densities as low as 0.025 g/cm$^3$ without lowering the polymer concentration, which resulted in aerogels with wide range of mechanical properties, such as stiffness (13-340 kPa), toughness (4-103 kPa), strength (22-373 kPa) and compressibility (35-88%). Furthermore, a unidirectional and controlled freezing approach introduced anisotropy in the aerogels inducing both elastic and plastic nature, based on the axis in which the property is measured. With tunable mechanical properties along with anisotropy, these aerogels can potentially be used as shock absorbers, or in thermal and acoustic insulation.

Example 4: Synthesis and Characterization of CAP & CAB Aerogels

Figure 45:
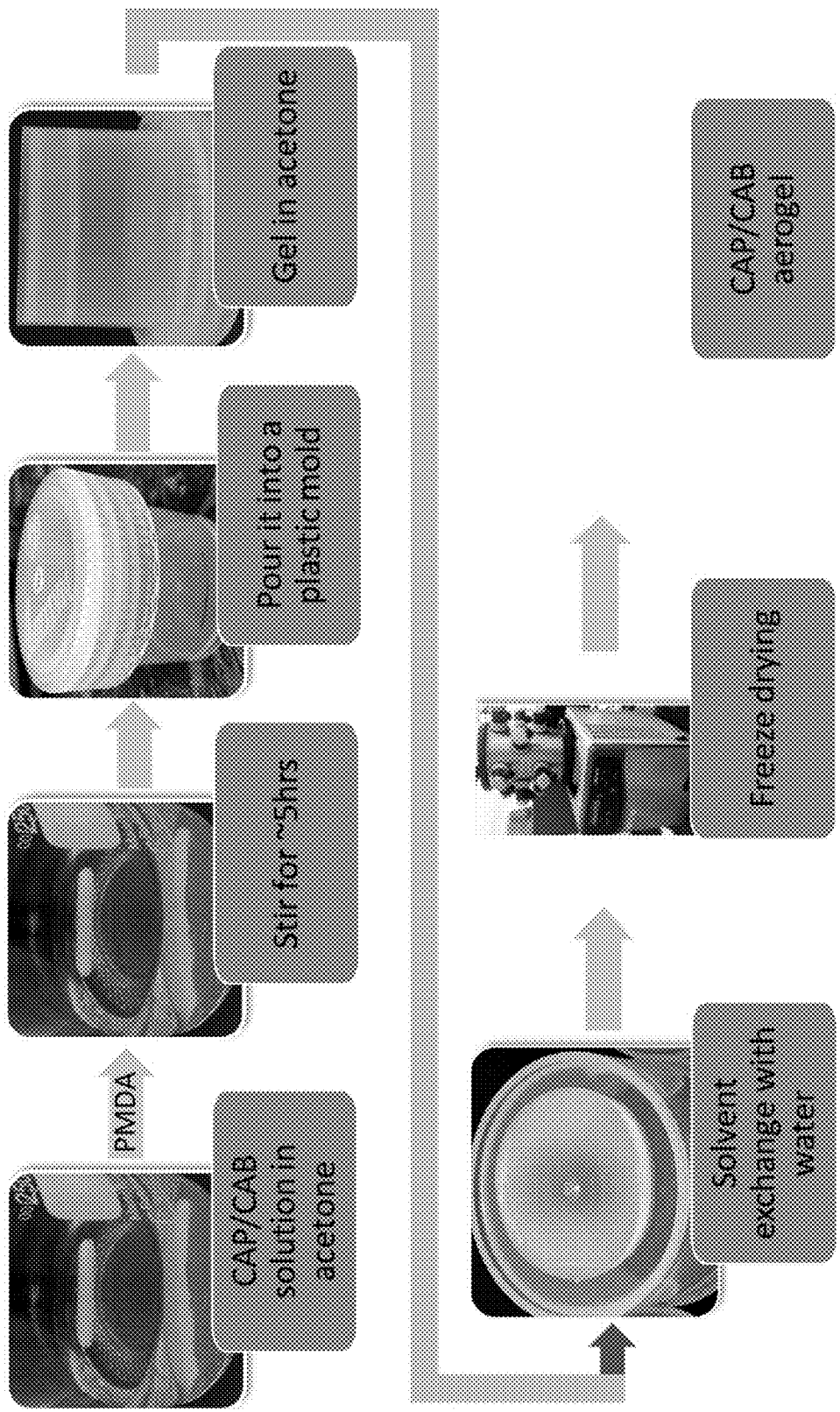
FIG. 45 is a schematic of a method used to prepare cellulose ester aerogels, namely CDA, cellulose acetate propionate (CAP) and cellulose acetate butyrate (CAB) aerogels.
Figure 46:
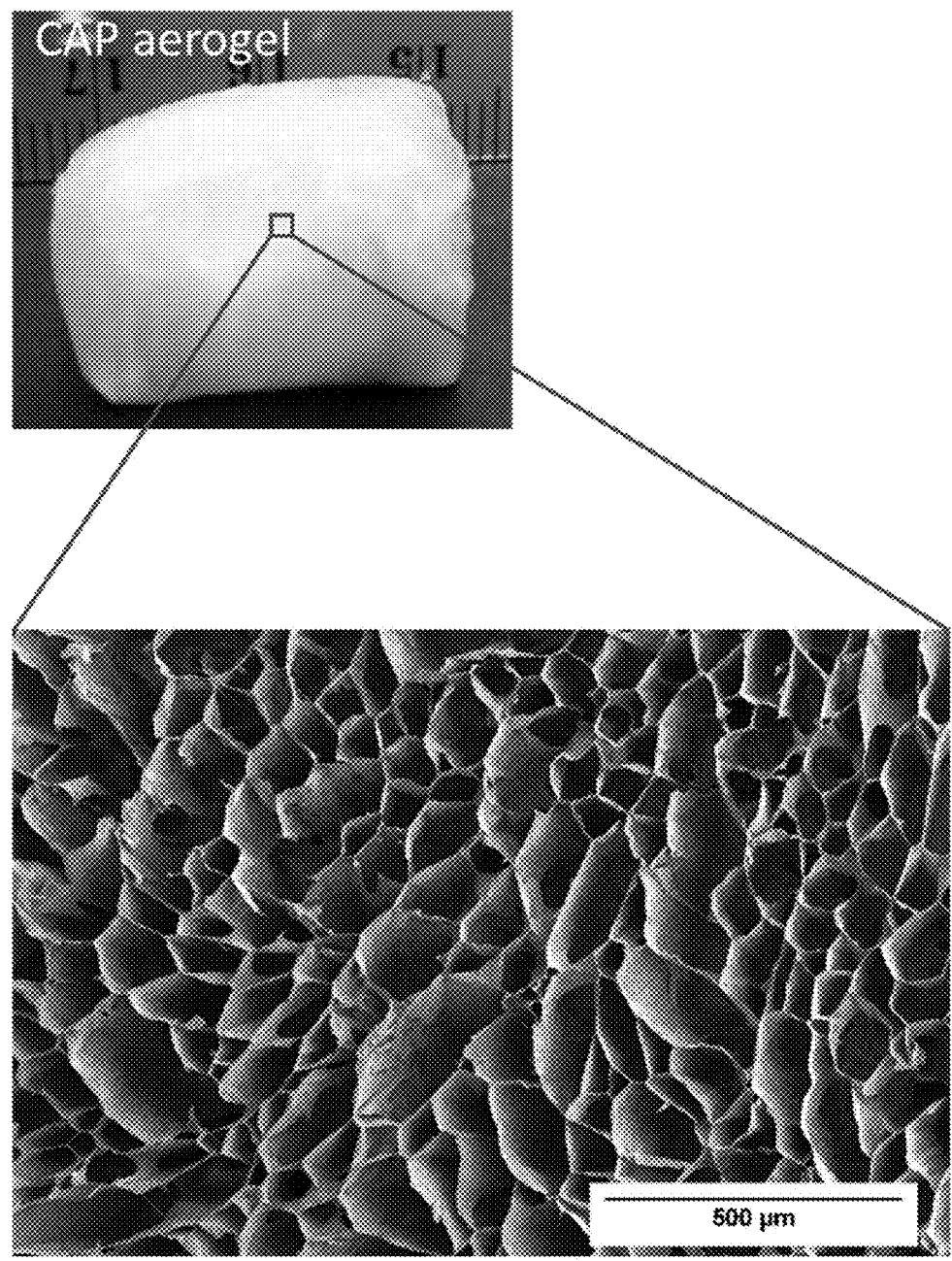
FIG. 46 is a pair of images showing the pore structure of a CAP aerogel.
Figure 47:
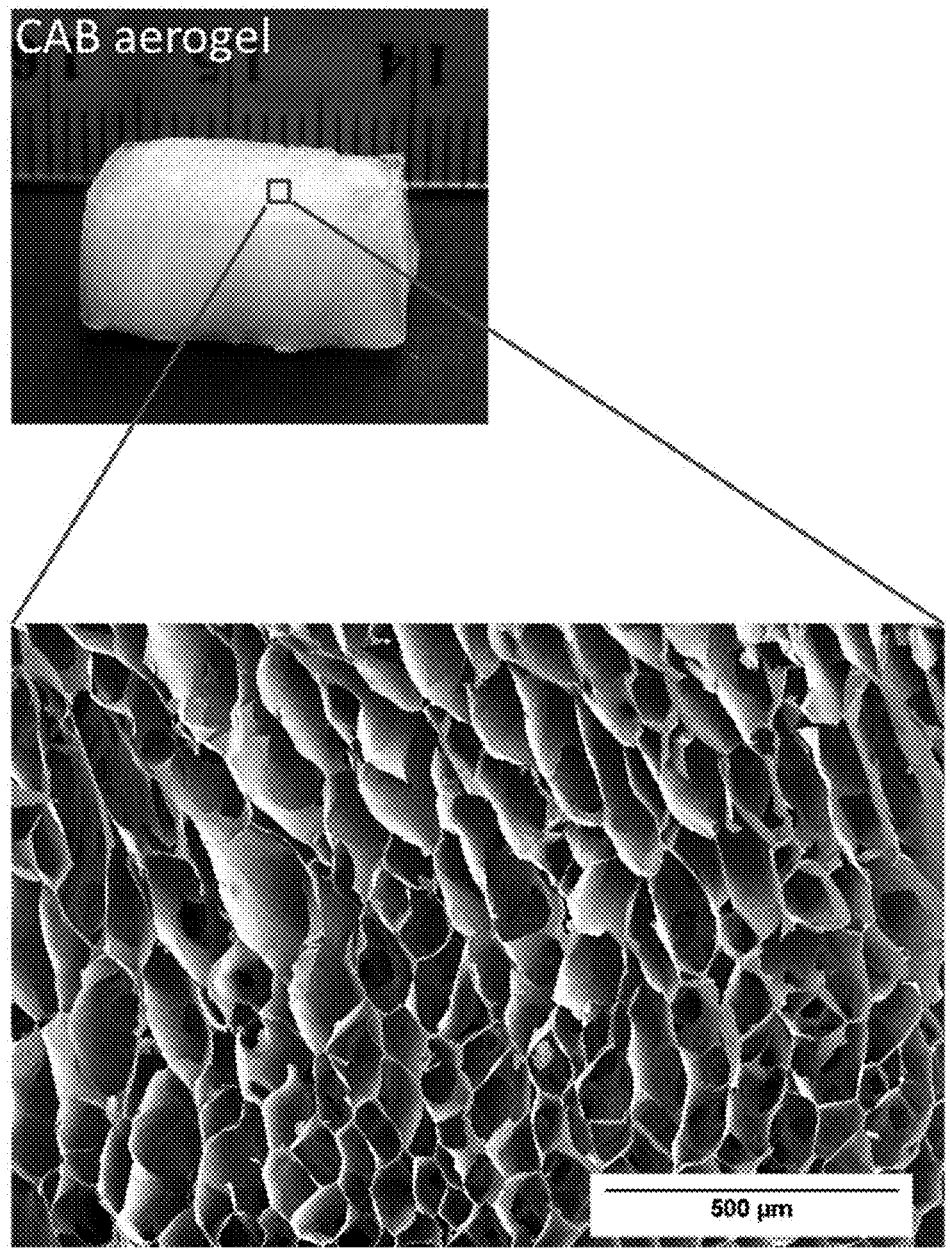
FIG. 47 is a pair of images showing the pore structure of a CAB aerogel.
Figure 48:
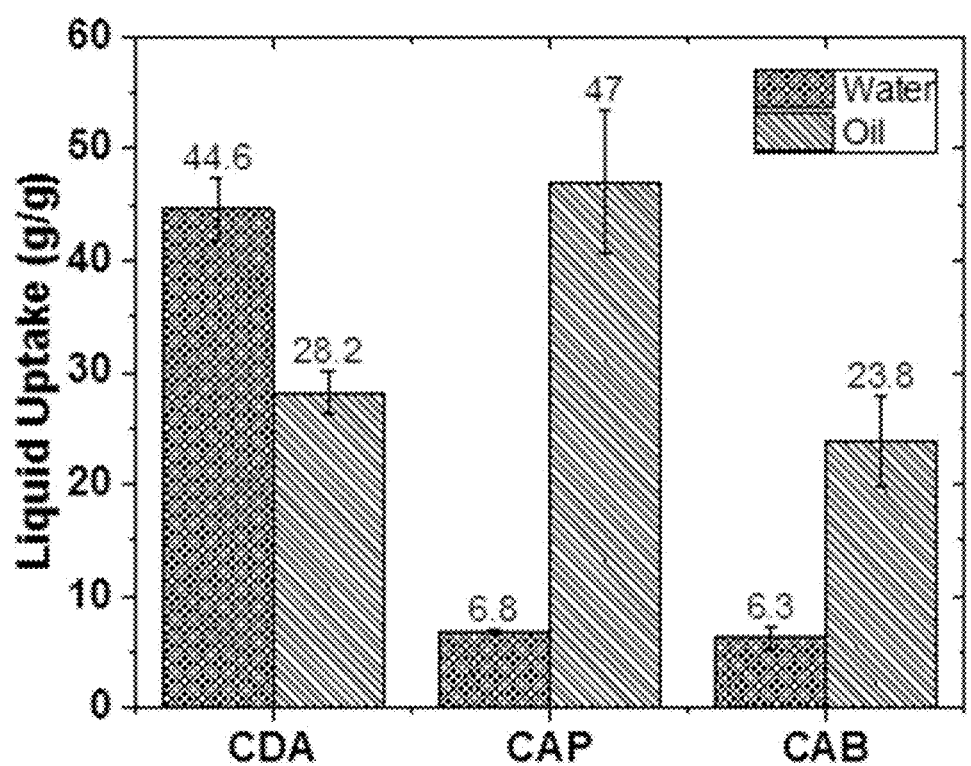
FIG. 48 is a graph showing the liquid uptake of CDA, CAP and CAB aerogels.
Figure 49:
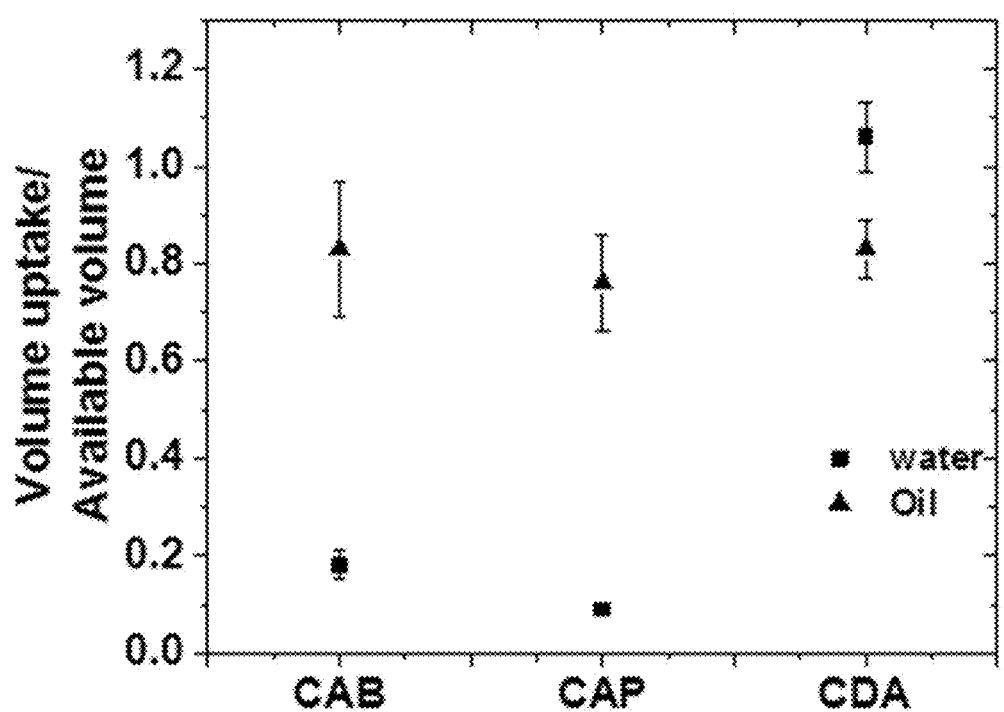
FIG. 49 is a graph showing the volume uptake per available volume of CDA, CAP and CAB aerogels.

Cellulose acetate propionate (CAP; Eastman catalog no. CAP-504-0.2) and cellulose acetate butyrate (CAB; Eastman catalog no. CAB-553-0.4) aerogels were synthesized using the same approach as described for CDA aerogels, and as shown in FIG. 45. CAP and CAB aerogels were characterized via SEM and for their capacity to sorb different liquids, as shown in FIGS. 46-49.

CAP aerogels had a density of 13±0.9 mg/ml and a porosity of 99±0.10%. CAB aerogels had a density of 27.9±3.2 mg/ml and a porosity of 97.7±0.3%. From the adsorption characterization, it can be seen that water uptake for CAP and CAB aerogels is substantially lower relative to CDA aerogels. Additionally, these results suggest that CAP aerogels may be better suited for oil-cleanup due to high oil uptake and low water uptake (without any modification).

REFERENCES

B. Maher, S. Smith, E. Moretti, and T. Clancy, "HBO report on the lasting effects of the BP oil spill," HBO, USA, 2015.
F. Aguilera, J. Méndez, E. Pásaroa, and B. Laffona, "Review on the effects of exposure to spilled oils on human health," J. Appl. Toxicol., vol. 30, no. 4, pp. 291-301, 2010.
N. H. K. Burton, A. J. Musgrove, M. M. Rehfisch, and N. A. Clark, "Birds of the Severn Estuary and Bristol Channel: Their current status and key environmental issues," Mar. Pollut. Bull., vol. 61, no. 1-3, pp. 115-123, 2010.
M. Fingas, "Oil Spill Science and Technology," Elsevier, Amsterdam, vol. A, 2011.
M. Fingas, "'In-situ burning' in Oil Spill Science and Technology," in Elsevier, Gulf Publishing Company, New York NY, 2011, pp. 737-903.
J. Michel, E. E. Adams, Y. Addassi, T. Copeland, M. Greeley, B. James, B. McGee, C. Mitchelmore, Y. Onishi, J. Payne, D. Salt, and B. Wreen, "Oil Spill Dispersants. Efficacy and Effects," Washington, D C, 2005.
P. I. Rosales, M. T. Suidan, and A. D. Venosa, "A laboratory screening study on the use of solidifiers as a response tool to remove crude oil slicks on seawater," Chemosphere, vol. 80, no. 4, pp. 389-395, 2010.
M. Correa, E. Padron, and I. Petkoff, "The San Rafael De Laya oil spill: A Case of cleanup and remediation in Venezuela," in International Oil Spill Conference, 1997, pp. 932-935.
P. Aldhous and J. Hecht, "Beware long-term damage when cleaning up oil spills," New Sci., vol. 10, no. 206, p. 2765, 2010.
B. Graham, W. K. Reilly, F. Beinecke, D. F. Boesch, T. D. Garcia, and C. A. Murray, Deep Water: The Gulf Oil Disaster and the Future of Offshore Drilling. 2011.
C. Teas, S. Kalligeros, F. Zanikos, S. Stournas, E. Lois, and G. Anastopoulos, "Investigation of the effectiveness of absorbent materials in oil spills clean up," Desalination, vol. 140, no. 3, pp. 259-264, 2001.
M. O. Adebajo, R. L. Frost, J. T. Kloprogge, O. Carmody, and S. Kokot, "Porous Materials for Oil Spill Cleanup: A Review of Synthesis," J. Porous Mater., no. 10, pp. 159-170, 2003.
O. Carmody, R. Frost, Y. Xi, and S. Kokot, "Adsorption of hydrocarbons on organo-clays—Implications for oil spill remediation," J. Colloid Interface Sci., vol. 305, no. 1, pp. 17-24, 2007.
J. G. Reynolds, P. R. Coronado, and L. W. Hrubesh, "Hydrophobic aerogels for oil-spill clean up—Synthesis and characterization," J. Non. Cryst. Solids, vol. 292, pp. 127-137, 2001.
Q. Ma, Y. Liu, Z. Dong, J. Wang, and X. Hou, "Hydrophobic and nanoporous chitosan-silica composite aerogels for oil absorption," J. Appl. Polym. Sci., vol. 132, no. 15, 2015.
Y. Zhao, C. Hu, Y. Hu, H. Cheng, G. Shi, and L. Qu, "A versatile, ultralight, nitrogen-doped graphene framework," Angew. Chemie—Int. Ed., vol. 51, no. 45, pp. 11371-11375, 2012.
H. Sun, Z. Xu, and C. Gao, "Multifunctional, ultra-flyweight, synergistically assembled carbon aerogels," Adv. Mater., vol. 25, no. 18, pp. 2554-2560, 2013.
H. Sehaqui, M. Salajková, Q. Zhou, and L. A. Berglund, "Mechanical performance tailoring of tough ultra-high porosity foams prepared from cellulose I nanofiber suspensions," Soft Matter, vol. 6, p. 1824, 2010.
H. Sehaqui, Q. Zhou, and L. A. Berglund, "High-porosity aerogels of high specific surface area prepared from nanofibrillated cellulose (NFC)," Compos. Sci. Technol., vol. 71, no. 13, pp. 1593-1599, 2011.
H. Jin, M. Kettunen, A. Laiho, H. Pynnönen, J. Paltakari, A. Marmur, O. Ikkala, and R. H. A. Ras, "Superhydrophobic and superoleophobic nanocellulose aerogel membranes as bioinspired cargo carriers on water and oil," Langmuir, vol. 27, no. 14, pp. 1930-1934, 2011.
J. T. Korhonen, M. Kettunen, R. H. A. Ras, and O. Ikkala, "Hydrophobic nanocellulose aerogels as floating, sustainable, reusable, and recyclable oil absorbents," ACS Appl. Mater. Interfaces, vol. 3, pp. 1813-1816, 2011.
N. T. Cervin, C. Aulin, P. T. Larsson, and L. Wågberg, "Ultra porous nanocellulose aerogels as separation medium for mixtures of oil/water liquids," Cellulose, vol. 19, pp. 401-410, 2012.
F. Jiang and Y.-L. Hsieh, "Super water absorbing and shape memory nanocellulose aerogels from TEMPO-oxidized cellulose nanofibrils via cyclic freezing-thawing," J. Mater. Chem. A, vol. 2, pp. 350-359, 2014.
F. Jiang and Y.-L. Hsieh, "Amphiphilic superabsorbent cellulose nanofibril aerogels," J. Mater. Chem. A, vol. 2, pp. 6337-6342, 2014.
X. Yang and E. D. Cranston, "Chemically Cross-Linked Cellulose Nanocrystal Aerogels with Shape Recovery and Superabsorbent Properties," Chem. Mater., vol. 35, no. 2, pp. 6016-6025, 2014.
W. Zhang, Y. Zhang, C. Lu, and Y. Deng, "Aerogels from crosslinked cellulose nano/micro-fibrils and their fast shape recovery property in water," J. Mater. Chem., vol. 22, no. 2, p. 11642, 2012.
F. Fischer, A. Rigacci, R. Pirard, S. Berthon-Fabry, and P. Achard, "Cellulose-based aerogels," Polymer (Guildf)., vol. 47, pp. 7636-7645, 2006.

A. Rigacci, "Cellulosic aerogels for energy applications," American Chemical Society, 2008 Fall National Meeting, August 2008, Philadelphia, United States <hal-00805294>.

C. Tan, B. M. Fung, J. K. Newman, and C. Vu, "Organic aerogels with very high impact strength," Adv. Mater., vol. 13, no. 9, pp. 644-646, 2001.

V. A. Oliveira, T. C. Veloso, V. A. Leao, C. G. Dos Santos, and V. R. Botaro, "Hydrogels of cellulose acetate cross-linked with pyromellitic dianhydride: Part I: Synthesis and swelling kinetics," Quim. Nova, vol. 36, no. 1, pp. 102-106, 2013.

A. G. Cunha, C. Freire, A. Silvestre, C. P. Neto, A. Gandini, M. N. Belgacem, D. Chaussy, and D. Beneventi, "Preparation of highly hydrophobic and lipophobic cellulose fibers by a straightforward gas-solid reaction," J. Colloid Interface Sci., vol. 344, no. 2, pp. 588-595, 2010.

T. Mohan, R. Kargl, K. E. Tradt, M. R. Kulterer, M. Braćić, S. Hribemik, K. Stana-Kleinschek, and V. Ribitsch, "Antifouling Coating of Cellulose Acetate Thin Films with Polysaccharide Multilayers," Carbohydr. Polym., vol. 116, pp. 149-158, 2014.

J. L. Gurav, I.-K. Jung, H.-H. Park, E. S. Kang, and D. Y. Nadargi, "Silica Aerogel: Synthesis and Applications," J. Nanomater., vol. 2010, pp. 1-11, 2010.

X. Xu, H. Li, Q. Zhang, H. Hu, Z. Zhao, J. Li, J. Li, and Y. Qiao, "3D Graphene/Iron Oxide Aerogel Elastomer Deformable in a Magnetic Field," pp. 3969-3977, 2015.

Z.-Y. Wu, C. Li, H.-W. Liang, J.-F. Chen, and S.-H. Yu, "Ultralight, flexible, and fire-resistant carbon nanofiber aerogels from bacterial cellulose.," Angew. Chem. Int. Ed. Engl., vol. 52, no. 10, pp. 2925-9, Mar. 2013.

Z. W. and W. Zisman, "Relation of the Equilibrium Contact Angle to Liquid and Solid Constitution," Contact Angle, Wettability, Adhes., vol. 43, no. 43, pp. 1-51, 1964.

V. H. Newman, F. H. Searle, The General Properties of Matter, fifth ed. Longmans, London, 1957.

E. Rojo, M. S. Peresin, W. W. Sampson, I. C. Hoeger, J. Vartiainen, J. Lame, and O. J. Rojas, "Comprehensive elucidation of the effect of residual lignin on the physical, barrier, mechanical and surface properties of nanocellulose film," Green, pp. 1853-1866, 2015.

Various features and advantages of the invention are set forth in the following claims.

The invention claimed is:

1. An aerogel comprising a cross-linked cellulose ester having a degree of substitution of from about 1.0 to about 2.8, and further comprising a hydrophobic agent,
   wherein the aerogel has a bulk density of from about 15 mg/cc to about 85 mg/cc, and
   wherein the cellulose ester is a $(C_1-C_{10})$alkyl-C(O)-functionalized cellulose.

2. The aerogel of claim 1, wherein the degree of substitution of the cellulose ester is from about 1.8 to about 2.6.

3. The aerogel of claim 1, wherein the cellulose ester is cellulose acetate, cellulose acetate propionate, cellulose acetate butyrate or a combination thereof.

4. The aerogel of claim 1, wherein the cellulose ester is cross-linked via an ester, ether or urethane linkage.

5. The aerogel of claim 4, comprising a cross-linking agent at from about 1 wt. % to about 15 wt. %.

6. The aerogel of claim 4, comprising the cellulose ester at from about 85 wt. % to about 99 wt. %.

7. The aerogel of claim 5, wherein the cross-linking agent is selected from at least one of a $C_7-C_{20}$ aromatic anhydride, a $(C_5-C_{20})$cycloalkyl anhydride, a bis(halo$(C_1-C_3)$alkyl)-$(C_5-C_{20})$aromatic, a bis(halo$(C_1-C_3)$alkyl)$(C_3-C_7)$cycloalkyl, a bis(isocyanato$(C_1-C_3)$alkyl)$(C_5-C_{20})$aromatic, or a bis(isocyanato$(C_1-C_3)$alkyl)$(C_3-C_7)$cycloalkyl.

8. The aerogel of claim 7, wherein the cross-linking agent is pyromellitic dianhydride (PMDA).

9. The aerogel of claim 1, wherein the aerogel has the capacity to absorb at least about 20 grams of water per gram of aerogel.

10. The aerogel of claim 1, wherein the hydrophobic agent is selected from at least one of a $C_2-C_{20}$alkyl silane, a $C_3-C_7$cycloalkyl silane, an aromatic silane, an $(C_2-C_{20})$alkyl, a $(C_3-C_7)$cycloalkyl, an $(C_2-C_{20})$alkyl urethane, a $(C_3-C_7)$cycloalkyl urethane, an $(C_2-C_{20})$alkyl ester, a $(C_3-C_7)$cycloalkyl ester, an $(C_2-C_{20})$alkyl carbonate, a $(C_3-C_7)$ cycloalkyl carbonate or any mixture thereof.

11. The aerogel of claim 10, wherein the hydrophobic agent is a $C_5-C_{10}$alkyl silane.

12. The aerogel of claim 1, wherein the aerogel exhibits at least one of the following:
   (a) a porosity equal to or greater than 90%,
   (b) a maximum compressive stress of from about 50 kPa to about 400 kPa,
   (c) a maximum strain of from about 15% to about 100%,
   (d) a compression modulus of from about 20 kPa to about 500 kPa,
   (e) a pore size average diameter of from about 20 μm to about 100 μm,
   (f) a Brunauer-Emmett-Teller (BET) of from about 2 m$^2$/g to about 5 m$^2$/g, and
   (g) a surface tension of from about 30 mN/m to about 60 mN/m.

13. The aerogel of claim 1, wherein the aerogel adsorbs at least about 20 grams of oil per gram of aerogel.

14. The aerogel of claim 13, wherein the aerogel adsorbs at least about 10 grams of oil per gram of aerogel after 5 cycles of adsorption and compression.

15. The aerogel of claim 13, wherein the ratio of oil:water capable of being adsorbed per gram of aerogel is from about 1:5 to about 1:50.

16. An aerogel comprising:
   a cross-linked cellulose ester, wherein the cellulose ester is cellulose acetate, cellulose acetate propionate, cellulose acetate butyrate or a combination thereof;
   a cross-linking agent; and
   a hydrophobic agent,
   wherein the aerogel has a bulk density of from about 1 mg/cc to about 500 mg/cc, and wherein the aerogel has a BET of from about 2 m$^2$/g to about 5 m$^2$/g, an average diameter pore size of from about 20 um to about 100 um, or a combination thereof.

17. The aerogel of claim 16, wherein the hydrophobic agent is selected from at least one of a $C_2-C_{20}$ alkyl silane, a $C_3-C_7$ cycloalkyl silane, an aromatic silane, an $(C_2-C_{20})$ alkyl, a $(C_3-C_7)$cycloalkyl, an $(C_2-C_{20})$alkyl urethane, a $(C_3-C_7)$cycloalkyl urethane, an $(C_2-C_{20})$alkyl ester, a $(C_3-C_7)$cycloalkyl ester, an $(C_2-C_{20})$alkyl carbonate, a $(C_3-C_7)$ cycloalkyl carbonate or any mixture thereof.

* * * * *